US008318830B2

(12) United States Patent
Kohli Steck et al.

(10) Patent No.: US 8,318,830 B2
(45) Date of Patent: Nov. 27, 2012

(54) PHOTOLATENT CATALYSTS BASED ON ORGANOMETALLIC COMPOUNDS

(75) Inventors: Rachel Kohli Steck, Basel (CH); Caroline Lordelot, Mannheim (DE); Thomas Vogel, Haltingen (DE); Gisele Baudin, Allschwil (CH); Paul Brown, Binzen (DE); Kurt Dietliker, Allschwil (CH); Rinaldo Huesler, Rheinfelden (CH); Tunja Jung, Freinsheim (DE); Peter Simmendinger, Birsfelden (CH); Katia Studer, Rixheim (FR); Antoine Carroy, Marlioz (FR)

(73) Assignee: BASF SE, Ludwigshafen (DE)

( * ) Notice: Subject to any disclaimer, the term of this patent is extended or adjusted under 35 U.S.C. 154(b) by 279 days.

(21) Appl. No.: 12/738,362

(22) PCT Filed: Oct. 10, 2008

(86) PCT No.: PCT/EP2008/063608
§ 371 (c)(1),
(2), (4) Date: Apr. 16, 2010

(87) PCT Pub. No.: WO2009/050115
PCT Pub. Date: Apr. 23, 2009

(65) Prior Publication Data
US 2010/0234485 A1    Sep. 16, 2010

(30) Foreign Application Priority Data

Oct. 17, 2007   (EP) .................................... 07118662
Dec. 14, 2007   (EP) .................................... 07123189

(51) Int. Cl.
*C08G 18/32* (2006.01)
*C08G 18/22* (2006.01)
*C08G 18/24* (2006.01)
*C07F 5/06* (2006.01)
*C07F 7/00* (2006.01)
*C07F 7/22* (2006.01)
*C07F 7/24* (2006.01)
*C07F 9/94* (2006.01)

(52) U.S. Cl. ................ 522/33; 522/37; 522/39; 522/42; 522/44; 522/66; 522/134; 522/146; 522/174; 528/65; 556/51; 556/70; 556/81; 556/170

(58) Field of Classification Search .................... 522/29, 522/66, 146, 174, 134, 33, 37, 39, 42, 44, 522/46, 53, 63; 528/56, 58, 65; 556/83, 556/88, 94, 90, 89, 87, 37, 77, 78, 54, 55, 556/56, 182, 51, 70, 81, 170
See application file for complete search history.

(56) References Cited

U.S. PATENT DOCUMENTS

| | | | |
|---|---|---|---|
| 4,292,252 A | | 9/1981 | Collins et al. |
| 4,549,945 A | * | 10/1985 | Lindstrom ..................... 522/66 |
| 4,575,330 A | | 3/1986 | Hull |
| 4,740,577 A | * | 4/1988 | DeVoe et al. ................... 528/51 |
| 4,960,746 A | | 10/1990 | Husler et al. |
| 5,238,744 A | | 8/1993 | Williams et al. |
| 5,545,600 A | | 8/1996 | Knudsen et al. |
| 5,846,897 A | * | 12/1998 | Blank et al. .................. 502/150 |
| 2001/0053828 A1 | | 12/2001 | Nishiguchi et al. |
| 2005/0131193 A1 | | 6/2005 | Garner et al. |
| 2005/0282700 A1 | | 12/2005 | Feldman et al. |
| 2006/0052472 A1 | | 3/2006 | Hansen et al. |

FOREIGN PATENT DOCUMENTS

| | | |
|---|---|---|
| DE | 42 28 514 | 3/1994 |
| DE | 199 35 471 | 2/2001 |
| EP | 0 007 086 | 1/1980 |
| EP | 0 076 102 | 4/1983 |
| EP | 0 399 682 | 11/1990 |
| EP | 0 636 669 | 2/1995 |
| EP | 0 803 540 | 10/1997 |
| EP | 1 072 326 | 1/2001 |
| GB | 2 444 255 | 6/2008 |
| JP | 6 49346 | 2/1994 |
| JP | 8 305019 | 11/1996 |
| JP | 9 179299 | 7/1997 |
| JP | 9 325209 | 12/1997 |
| WO | 93 17060 | 9/1993 |
| WO | 2004 058849 | 7/2004 |
| WO | 2006 136211 | 12/2006 |
| WO | 2007 003966 | 1/2007 |
| WO | 2007 117552 | 10/2007 |
| WO | 2007 147851 | 12/2007 |

OTHER PUBLICATIONS

U.S. Appl. No. 12/308,355, filed Jun. 20, 2007, Van Den Berg, et al.
Dietliker, K. "A Compilation of Photoinitiators Commercially Available for UV Today", SITA Technology Limited, Total pp. 5, (2002).
Crivello, J. V. et al., "Photoinitiators for Free Radical Cationic & Anionic Photopolymerisation" 2nd Edition, SITA Technology Limited, vol. III, pp. i-ix, (1998).

* cited by examiner

*Primary Examiner* — Susan W Berman
(74) *Attorney, Agent, or Firm* — Oblon, Spivak, McClelland, Maier & Neustadt, L.L.P.

(57) ABSTRACT

The present invention provides organometallic latent catalyst compounds, which are suitable as catalysts in polyaddition or polycondensation reactions which are catalysed by a Lewis acid type catalyst, in particular for the crosslinking of a blocked or unblocked isocyanate or isothiocyanate component with a polyol or polythiolto form a polyurethane (PU).

17 Claims, No Drawings

PHOTOLATENT CATALYSTS BASED ON ORGANOMETALLIC COMPOUNDS

The present invention pertains to novel photolatent catalyst compounds and their application as catalysts in particular for crosslinking 2 pot polyurethane.

It is known in the art to cure radically or cationically crosslinking components by employing photolatent compounds as catalysts, such as for example benzophenones, hydroxy or aminoketones, sulphonium or iodonium salts etc. Such compounds are for example described by Kurt Dietliker in "A compilation of photoinitiators commercially available for UV today", Sita Technology Ltd., Edinburgh and London, 2002, and by J. V. Crivello and K Dietliker in "Chemistry & Technology of UV & EB Formulation for Coatings, Inks and Paints; Photoinitiators for Free Radical, Cationic & Anionic Photopolymerization, Ed. 2, Vol. III, 1998, Sita Technology Ltd., London.

Further it is known in the art to prepare for example polyurethanes by crosslinking isocyanate components with polyols, including any hydroxyl-functional compounds and also polythiols, in the presence of an organometallic, in particular a tin, catalyst. Corresponding catalysts are known from many publications, for example US 2005/0282700-A, U.S. Pat. No. 5,545,600, U.S. Pat. No. 4,292,252, etc. The same type of organometallic catalyst can also be used in order to catalyze the crosslinking via other condensation or addition reactions, such as for example siloxane modified binders as they are used in silane crosslinking adhesives or sealings, as reported for example in WO 2006/136211.

These catalysts generally are not latent and thus the reaction between the polyol and the poly-isocyanates or other suitable components that can undergo a metal-catalyzed addition or condensation reaction starts at room temperature as soon as the catalyst is added. After a short reaction time of around 0.5 h to 2 h, depending on the concentrations and the conditions such as for example the temperature, the reaction is completed. This reaction time limits the working window during which the formulation can be processed once the mixture has been produced. Several photolatent catalysts are disclosed in WO 07/147,851, published in December 2007.

It is highly desirable to be able to trigger the reaction only on demand through an external activation such as heat or light. This allows extending the working window with the resins mixture ideally until the external trigger is turned on.

Further, in view of environmental aspects it is desirable to exchange the commonly used tin by another environmentally more friendly metal.

Thus, the present invention resides in the use of a latent catalyst compound for polyaddition or polycondensation reactions, which are catalysed by Lewis-acid type reactants, characterized in that the latent catalyst compound comprises a photoactive moiety (PI) bound to a metal, in particular to Sn, Bi, Zr, Ti or Al, and in that the polyaddition or polycondensation reactions are initiated in that the catalyst is released by exposure to electromagnetic radiation of a wavelength range of 200-800 nm.

Corresponding latent catalyst compounds are for example of the formula I or II

$$Me(PI)_{(m-x)}A_x \quad (I)$$

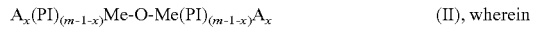

$$A_x(PI)_{(m-1-x)}Me-O-Me(PI)_{(m-1-x)}A_x \quad (II), \text{ wherein}$$

Me is Sn, Bi, Al, Zr or Ti;
m denotes an integer from 1 up to the coordination number of Me;
x is an integer from 0 to (m−1);
PI is a monovalent or divalent photoactive moiety, provided that in case (m−x) or (m−1−x) are greater than one, the PI are identical or different; and A is $C_1$-$C_{20}$alkyl, halogen, $C_7$-$C_{30}$arylalkyl, $C_1$-$C_{20}$alkoxy, $C_2$-$C_{20}$alkanoyloxy, $C_6$-$C_{18}$aryl or $C_6$-$C_{18}$aryl which is substituted by one or more $C_1$-$C_{20}$alkyl; and provided that in case x is greater than one, the A are identical or different.

The "coordination number" of the metal Me is the number of possible ligands for the corresponding metal atom, which is not necessarily, but can be the valency of the corresponding metal atom. The coordination numbers for the metals are known to the person skilled in the art, for example from the chemistry of metal complexes. A given metal atom can have different "coordination numbers" which vary, e.g. with it's oxidation state. Thus the "coordination number" refers to the total number of points of attachment to the central element (the metal atom) and usually varies from 2 to as many as 16, for example 2-8, 2-6, 2-4 or 2-3. In simple terms, the coordination number of a complex is influenced by the relative sizes of the central metal ion and the ligands and by electronic factors, such as charge which is dependent on the electronic configuration of the metal ion.

Examples of coordination numbers for Sn, Ti, Zr, Al and Bi are 2, 3, 4, 6 or 8, especially 3, 4, 6 or 8, preferably 4 or 6, in particular 4.

If the ligand has two or more possible coordination sites, e.g. oxygen atoms in a chelate complex, it may be coordinated in different ways to the metal atom. Depending on the strength of the coordinative bond, the different complexes may be stable isomers, or may interconvert from one isomer into the other at room temperature. Thus the compounds of this invention include pure metal complexes but also mixtures of stereo and regio isomers.

$C_1$-$C_{20}$alkyl is linear or branched or cyclic and is, for example, $C_1$-$C_{18}$-, $C_1$-$C_{14}$-, $C_1$-$C_{12}$-, $C_1$-$C_8$-, $C_1$-$C_6$- or $C_1$-$C_4$alkyl. Examples are methyl, ethyl, propyl, isopropyl, n-butyl, sec-butyl, isobutyl, tert-butyl, pentyl, e.g. cyclopentyl, hexyl, e.g. cyclohexyl, heptyl, 2,4,4-trimethylpentyl, 2-ethylhexyl, octyl, nonyl, decyl, dodecyl, tetradecyl, pentadecyl, hexadecyl, octadecyl and icosyl.

$C_1$-$C_{18}$alkyl, $C_1$-$C_{14}$alkyl, $C_1$-$C_{12}$alkyl, $C_1$-$C_8$alkyl, $C_1$-$C_6$alkyl and $C_1$-$C_4$alkyl have the same meanings as given above for $C_1$-$C_{20}$alkyl up to the corresponding number of C-atoms.

$C_6$-$C_{18}$aryl is for example phenyl, naphthyl, anthryl, phenanthryl or pyrenyl, in particular phenyl or naphthyl, preferably phenyl.

$C_6$-$C_{18}$aryl which is substituted by one or more $C_1$-$C_{20}$alkyl is for example substituted 1-5 times, e.g. 1-4, times or one, twice or three times with $C_1$-$C_{20}$alkyl. The alkyl substituents are for example bound in the 2,4,6-, 2,6-, 2,4-, 2,5-, 2,3,4-, 2-, 4- or 5-position of the phenyl ring.

$C_7$-$C_{30}$arylalkyl is linear or branched or cyclic alkyl as described above substituted by $C_6$-$C_{18}$aryl. Preferably the aryl in the $C_7$-$C_{30}$arylalkyl is phenyl or naphthyl, in particular phenyl. Specific examples are phenyl-$C_1$-$C_6$alkyl or phenyl-$C_1$-$C_3$alkyl, such as benzyl, phenylethyl, α-methylbenzyl, phenylpentyl, phenylhexyl or α,α-dimethylbenzyl, especially benzyl.

The photoactive moiety in the context of the present invention is a moiety, which cleaves upon irradiation with light, in particular of the wavelengths 150-800 nm, e.g. 200-800 or 200-600 nm.

Preferably the metal atom is not linked in all its coordinations to the ligands or chelates directly via a C-atom-containing radical, but through a spacer group O or (CO)O, wherein the metal is bound to the corresponding O-atoms of these groups.

Interesting are in particular latent catalyst compounds, wherein the latent catalyst compound the photoactive moiety (PI) is a moiety releasing radicals or is a moiety releasing a base.

PI is a photoactive moiety, which for example is a moiety of a photolatent radical or a photolatent base compound. Examples for moieties of photolatent radical compounds are mentioned below. Examples of moieties of photolatent bases are photolatent secondary or tertiary amines, guanidines or amidines. E.g. structures like

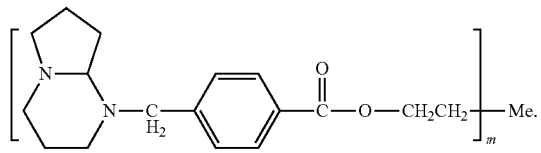

Suitable photoactive moieties PI are for example groups of the formula (Z), (B), (C), (D), (E), (F), (G), (H), (J), (K), (L) or (M)

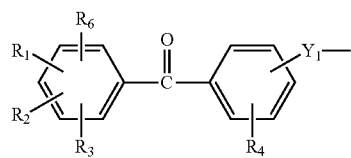
(Z)

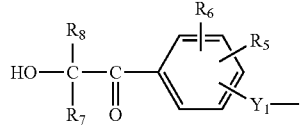
(B)

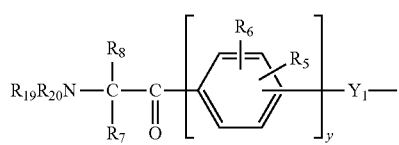
(C)

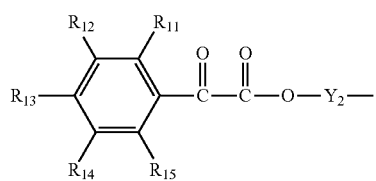
(D)

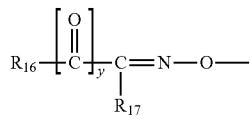
(E)

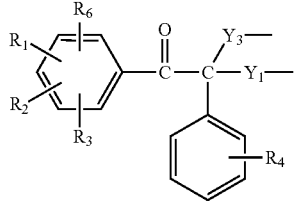
(F)

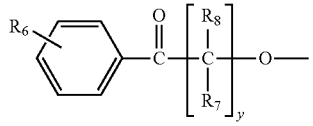
(G)

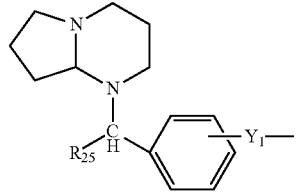
(H)

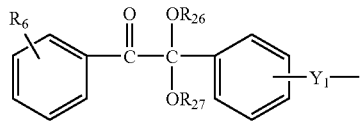
(J)

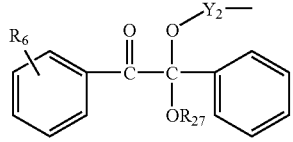
(K)

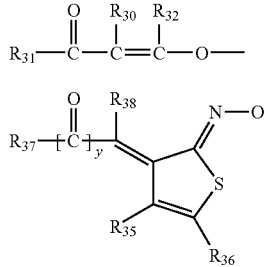
(L)

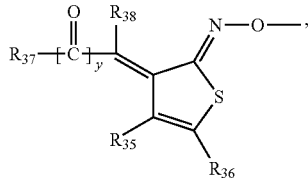
(M)

wherein y is 0 or 1;

$R_1$, $R_2$ and $R_3$ independently of one another are hydrogen, $C_1$-$C_6$-alkyl, $C_1$-$C_4$-halogenalkyl, $C_8$-$C_{18}$aryl, $C_7$-$C_{30}$aralkyl, $C_1$-$C_4$-alkoxy, $C_1$-$C_4$alkylthio, halogen, $N(C_1$-$C_4$-alkyl$)_2$, or $N(C_4$-$C_7$-cycloalkyl which optionally is interrupted by —O— or $NR_{10}$;

$R_4$ is hydrogen, $C_1$-$C_4$-alkyl, $C_1$-$C_4$-halogenalkyl, phenyl, $N(C_1$-$C_4$-alkyl$)_2$, COOCH$_3$,

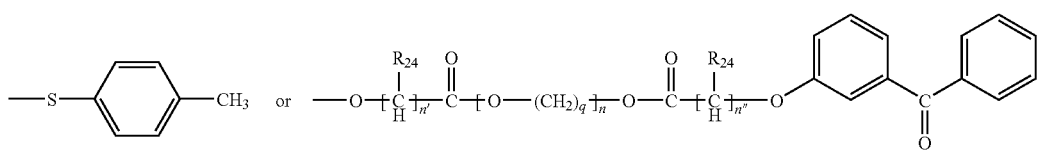

or $R_3$ and $R_4$ together are S, O, $NR_{10}$, $CH_2$ or $CHCH_3$, in particular S; and n, n' and n" independently of each other are 1-10;

q is 1-4;

$R_5$ is hydrogen or $C_1$-$C_{18}$-alkoxy;

$R_6$ is hydrogen, $C_1$-$C_{18}$-alkyl, $C_1$-$C_{12}$hydroxyalkyl, $C_1$-$C_{18}$-alkoxy, OH, —$OCH_2CH_2$—$OR_{18}$, morpholino, $C_1$-$C_{18}$alkyl-S—, HS—, —$NR_{19}R_{20}$, $H_2C$=CH—, $H_2C$=C($CH_3$)—, $H_2C$=CH—CO—, $H_2C$=CH—(CO)O—, $H_2C$=C($CH_3$)—CO—, $H_2C$=C($CH_3$)—(CO)O—

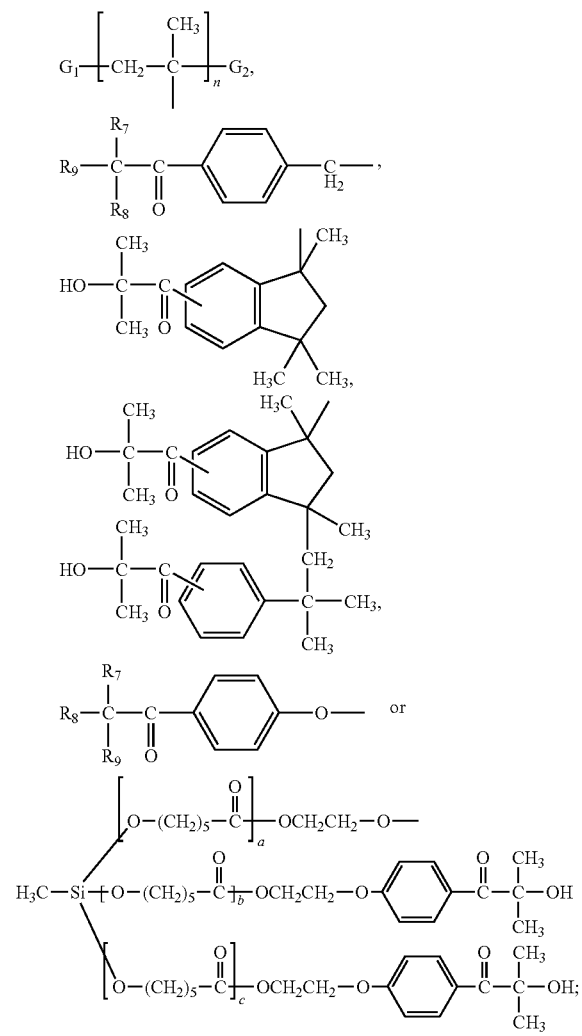

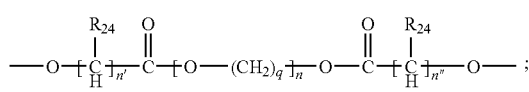

a, b and c independently of one another are 1-3;

$G_1$ and $G_2$ independently of one another are end groups of the polymeric structure, preferably hydrogen or methyl;

$Y_1$ and $Y_3$ independently of one another are a direct bond, O, (CO)O, $NR_{10}$, $C_1$-$C_{20}$alkylene, $C_1$-$C_{20}$alkylene-O—, $C_1$-$C_{20}$alkylene-(CO)O— or

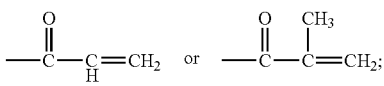

$Y_2$ is a direct bond or $C_1$-$C_{20}$alkylene;

$R_7$ and $R_8$ independently of one another are hydrogen, $C_1$-$C_6$-alkyl, unsubstituted phenyl or benzyl; or phenyl or benzyl substituted by $C_1$-$C_{12}$-alkyl; or $R_7$ and $R_8$ together with the carbon atom to which they are attached form a cyclohexyl ring;

$R_9$ is OH or $NR_{19}R_{20}$;

$R_{10}$ is hydrogen, $C_1$-$C_{18}$-alkyl, $C_2$-$C_{18}$alkenyl, $C_1$-$C_{12}$hydroxyalkyl or $C_1$-$C_{12}$halogenoalkyl;

$R_{11}$, $R_{12}$, $R_{13}$, $R_{14}$ and $R_{15}$ independently of one another are hydrogen, unsubstituted $C_1$-$C_{12}$-alkyl or $C_1$-$C_{12}$-alkyl substituted by OH, $C_1$-$C_4$-alkoxy, phenyl, naphthyl, halogen or CN; wherein the alkyl chain optionally is interrupted by one or more O; or $R_{11}$, $R_{12}$, $R_{13}$, $R_{14}$ and $R_{15}$ independently of one another are $C_1$-$C_4$-alkoxy, $C_1$-$C_4$-alkylthio, $NR_{19}R_{20}$, $H_2C$=CH—CO—, $H_2C$=CH—(CO)O—, $H_2C$=C($CH_3$)—CO— or $H_2C$=C($CH_3$)—(CO)O—;

$R_{16}$ is phenyl or naphthyl, both are unsubstituted or substituted 1 to 7 times by halogen, $C_1$-$C_{12}$alkyl, $C_3$-$C_8$cycloalkyl, benzyl, phenoxycarbonyl, $C_2$-$C_{12}$alkoxycarbonyl, $OR_{21}$, $SR_{22}$, $SOR_{22}$, $SO_2R_{22}$ and/or $NR_{19}R_{20}$, wherein the substituents $OR_{21}$, $SR_{22}$ and $NR_{19}R_{20}$ optionally form 5- or 6-membered rings via the radicals $R_{21}$, $R_{22}$, $R_{19}$ and/or $R_{20}$ with further substituents on the phenyl or naphthyl ring; or each of which is substituted by phenyl or by phenyl which is substituted by one or more $OR_{21}$, $SR_{22}$ and/or $NR_{19}R_{20}$;

or $R_{16}$ is thioxanthyl or

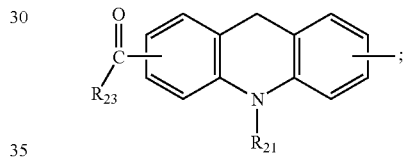

$R_{17}$ is hydrogen; unsubstituted $C_1$-$C_{20}$alkyl or $C_1$-$C_{20}$alkyl substituted by one or more halogen, $OR_{21}$ or phenyl; or is $C_3$-$C_8$cycloalkyl; or is phenyl which is unsubstituted or substituted by one or more $C_1$-$C_6$alkyl, phenyl, halogen, $OR_{21}$, $SR_{22}$ and/or $NR_{19}R_{20}$; or is $C_1$-$C_{20}$alkanoyl or benzoyl which is unsubstituted or substituted by one or more $C_1$-$C_6$alkyl, phenyl, $OR_{21}$, $SR_{22}$ and/or $NR_{19}R_{20}$; or is $C_2$-$C_{12}$alkoxycarbonyl, phenoxycarbonyl, CN, —$CONR_{19}R_{20}$, $NO_2$, $C_1$-$C_4$haloalkyl, $S(O)_d$—$C_1$-$C_6$alkyl; $S(O)_d$-phenyl, d is 1 or 2;

$R_{18}$ is hydrogen, $$-\overset{O}{\underset{}{C}}-\overset{}{\underset{H}{C}}=CH_2 \quad \text{or} \quad -\overset{O}{\underset{}{C}}-\overset{CH_3}{\underset{}{C}}=CH_2;$$

$R_{19}$ and $R_{20}$ independently of one another are hydrogen, $C_1$-$C_{20}$alkyl, $C_2$-$C_4$hydroxyalkyl, $C_2$-$C_{10}$alkoxyalkyl, $C_2$-$C_5$alkenyl, $C_3$-$C_8$cycloalkyl, phenyl-$C_1$-$C_3$alkyl, $C_1$-$C_8$alkanoyl, $C_3$-$C_{12}$alkenoyl, benzoyl; or are phenyl or naphthyl, each of which is unsubstituted or substituted by $C_1$-$C_{12}$alkyl, benzoyl or $C_1$-$C_{12}$alkoxy; or $R_{19}$ and $R_{20}$ together are $C_2$-$C_6$alkylene optionally interrupted by O or $NR_{21}$ and/or optionally substituted by OH, $C_1$-$C_4$alkoxy, $C_2$-$C_4$alkanoyloxy or benzoyloxy, or, together with the N-atom to which they are attached, are

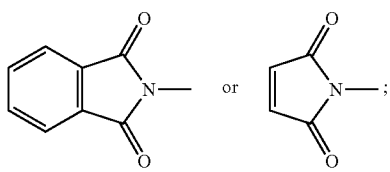

$R_{21}$ and $R_{22}$ independently of one another are hydrogen, $C_1$-$C_{20}$alkyl, $C_2$-$C_{12}$alkenyl, $C_3$-$C_8$cycloalkyl, phenyl-$C_1$-$C_3$alkyl; or are $C_1$-$C_8$alkyl which is substituted by OH, SH, CN, $C_1$-$C_8$alkanoyl, benzoyl, which is unsubstituted or substituted by one or more $C_1$-$C_6$alkyl, halogen, OH, $C_1$-$C_4$alkoxy or $C_1$-$C_4$alkylsulfanyl; or are phenyl or naphthyl, each of which is unsubstituted or substituted by halogen, $C_1$-$C_{12}$alkyl, $C_1$-$C_{12}$alkoxy, phenyl-$C_1$-$C_3$alkyloxy, phenoxy, $C_1$-$C_{12}$alkylsulfanyl, phenylsulfanyl, —N($C_1$-$C_{12}$alkyl)$_2$, diphenylamino;

$R_{23}$ is $C_1$-$C_{12}$alkyl, phenyl, 4-morpholinophenyl, $C_1$-$C_{12}$alkylphenyl or phenyl substituted with $C_3$-$C_8$cycloalkyl which optionally is interrupted by O; and $R_{24}$ is hydrogen, methyl or ethyl;

$R_{25}$ is hydrogen or $C_1$-$C_4$alkyl;

$R_{26}$ and $R_{27}$ independently of each other are $C_1$-$C_{20}$alkyl which is unsubstituted or is substituted by $C_1$-$C_4$alkoxy or phenyl, or $R_{26}$ and $R_{27}$ together are $C_2$-$C_4$alkylene;

$R_{30}$ is hydrogen, $C_1$-$C_4$alkyl, $C_2$-$C_5$alkanoyl, ($C_1$-$C_4$alkoxy)carbonyl, or is alkyl which is substituted by phenyl, benzoyl or by benzoylphenyl; or is phenyl or phenyl substituted by one or more $R_{34}$;

$R_{31}$ is $C_1$-$C_{12}$alkyl, $C_1$-$C_4$alkoxy, N($C_1$-$C_4$alkyl)$_2$, phenyl or phenyl substituted by one or more $R_{33}$;

$R_{32}$ is $C_1$-$C_{12}$alkyl, $C_1$-$C_4$alkoxy, phenyl or phenyl substituted by one or more $R_{33}$;

$R_{33}$ is $C_1$-$C_4$alkyl, $C_1$-$C_8$alkoxy, $C_1$-$C_6$thioalkyl, N($C_1$-$C_4$alkyl)$_2$, benzoyl or benzoyl substituted by one or more $R_{34}$; and $R_{34}$ is $C_1$-$C_4$alkyl, $C_1$-$C_4$alkoxy, $C_1$-$C_4$thioalkyl or N($C_1$-$C_4$alkyl)$_2$;

$R_{35}$ and $R_{36}$ independently of each other are hydrogen, halogen, $C_1$-$C_4$alkyl, $C_1$-$C_4$alkoxy, $C_1$-$C_4$thioalkyl, $C_1$-$C_4$haloalkyl, CN, NO$_2$, $C_2$-$C_6$alkanoyl, benzoyl, phenyl, —S-phenyl, phenoxy, $C_2$-$C_6$alkoxycarbonyl, phenoxycarbonyl, or $R_{35}$ and $R_{36}$ together are —C($R_{39}$)=C($R_{40}$)—C($R_{41}$)=C($R_{42}$)—;

$R_{37}$ is phenyl, naphthyl, anthracyl, phenanthryl or $C_4$-$C_{20}$heteroaryl, wherein the phenyl, naphthyl, anthracyl, phenanthryl or $C_4$-$C_{20}$heteroaryl are unsubstituted or are substituted by one or more $C_1$-$C_{12}$alkyl, $C_1$-$C_4$haloalkyl, halogen, phenyl, OR$_{21}$, SR$_{22}$ and/or NR$_{19}$R$_{20}$ and/or —S-phenyl, it being possible for the substituents OR$_{21}$, SR$_{22}$ and/or NR$_{19}$R$_{20}$ to form 5- or 6-membered rings, via the radicals $R_{21}$, $R_{22}$, $R_{20}$ and/or $R_{19}$, with further substituents on the phenyl, naphthyl, anthracyl, phenanthryl or $C_4$-$C_{20}$heteroaryl ring or with one of the carbon atoms of the phenyl, naphthyl, anthracyl, phenanthryl or $C_4$-$C_{20}$heteroaryl ring, or, if y is 0, $R_{37}$ additionally is $C_2$-$C_6$alkoxycarbonyl, phenoxycarbonyl or CN;

or $R_{37}$ is hydrogen or $C_1$-$C_{12}$alkyl, provided that $R_{38}$ is not simultaneously hydrogen or $C_1$-$C_{12}$alkyl;

$R_{38}$ has one of the meanings of $R_{37}$ or is unsubstituted or CN-substituted phenyl, $C_2$-$C_6$-alkanoyl, benzoyl that is unsubstituted or substituted by $C_1$-$C_6$alkyl, phenyl, OR$_{21}$, SR$_{22}$ and/or NR$_{19}$R$_{20}$, or $R_{38}$ is phenoxycarbonyl, NO$_2$, $C_1$-$C_4$haloalkyl, or $R_{37}$ and $R_{38}$ together with the CO group, form a 5- or 6-membered ring which is unsubstituted or substituted by $C_1$-$C_6$alkyl, phenyl, OR$_{21}$, SR$_{22}$ and/or NR$_{19}$R$_{20}$, and said ring optionally is interrupted by O, S, NR$_{10}$ and/or by CO, and optionally to said ring one or more benzo radicals are fused;

$R_{39}$, $R_{40}$, $R_{41}$ and $R_{42}$ independently of each another are hydrogen, $C_1$-$C_4$alkyl, halogen, phenyl, $C_1$-$C_4$alkkoxy, $C_1$-$C_4$thioalkyl, —S-phenyl, phenoxy, $C_2$-$C_6$alkoxycarbonyl, phenoxycarbonyl, CN, NO$_2$ or $C_1$-$C_4$haloalkyl.

$C_1$-$C_{12}$Halogenoalkyl is alkyl as described above, which is mono- or poly-substituted by halogen, up to the exchange of all H-atoms by halogen. Examples are chloromethyl, trichloromethyl, trifluoromethyl or 2-bromopropyl, especially trifluoromethyl or trichloromethyl.

$C_1$-$C_{12}$hydroxyalkyl for example alkyl as described above, however mono- or poly-substituted by OH. For example 1 to 6, e.g. 1 to 4, or one or two OH-substituents are positioned at the alkyl. Examples are hydroxymethyl, hydroxyethyl, dihydroxypropyl, hydroxypropyl, dihydroxyethyl, in particular hydroxyethyl.

Unsubstituted $C_1$-$C_{12}$-alkyl or substituted $C_1$-$C_{12}$-alkyl, wherein the alkyl chain optionally is interrupted by one or more O is for example interrupted 1-9, 1-7 or once or twice by O. In case the groups are interrupted by more than one O, said O-atoms are separated from one another by at least one methylene group, i.e. the O-atoms are non-consecutive. Examples are the following structural units —CH$_2$—O—CH$_3$, —CH$_2$CH$_2$—O—CH$_2$CH$_3$, —[CH$_2$CH$_2$O]$_2$—CH$_3$, —(CH$_2$CH$_2$O)$_3$CH$_2$CH$_3$, —CH$_2$—CH(CH$_3$)—O—CH$_2$—CH$_2$CH$_3$, or —CH$_2$—CH(CH$_3$)—O—CH$_2$CH$_3$.

$C_3$-$C_8$cycloalkyl is for example cyclopropyl, cyclopentyl, cyclohexyl or cyclooctyl, especially cyclopentyl and cyclohexyl, preferably cyclohexyl.

$C_3$-$C_8$cycloalkyl in the context of the present application is to be understood as alkyl which at least comprises one ring, accordingly also for example methyl-cyclopentyl, methyl- or dimethylcyclohexyl, are also meant to be covered by the definition. Further examples are structures like

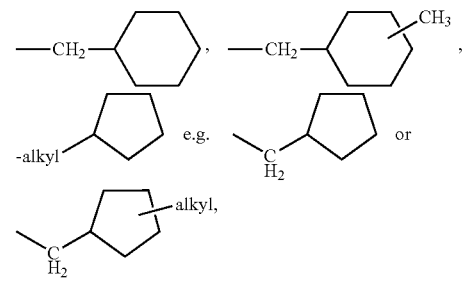

as well as bridged or fused ring systems, e.g.

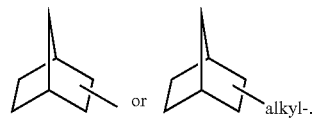

$C_2$-$C_{18}$alkenyl radicals are mono or polyunsaturated, linear or branched or cyclic and are for example $C_2$-$C_8$-, $C_2$-$C_6$- or $C_2$-$C_4$alkenyl. Examples are allyl, methallyl, vinyl, 1,1-dimethylallyl, 1-butenyl, 3-butenyl, 2-butenyl, 1,3-pentadienyl, 5-hexenyl or 7-octenyl, especially allyl or vinyl.

$C_1$-$C_{18}$-alkoxy is linear or branched and is for example $C_1$-$C_{16}$-, $C_1$-$C_{12}$-, $C_1$-$C_8$-, $C_1$-$C_6$— or $C_1$-$C_4$-alkoxy. Examples are methoxy, ethoxy, propoxy, isopropoxy, n-butyloxy, sec-butyloxy, iso-butyloxy, tert-butyloxy, pentyloxy, hexyloxy, heptyloxy, 2,4,4-trimethylpentyloxy, 2-ethylhexyloxy, octyloxy, nonyloxy, decyloxy, dodecyloxy, hexadecyloxy, octadecyloxy or icosyloxy, in particular methoxy, ethoxy, propoxy, isopropoxy, n-butyloxy, sec-butyloxy, isobutyloxy, tert-butyloxy, especially methoxy.

$C_1$-$C_{20}$alkylene is linear or branched alkylene, for example methylene, ethylene, propylene, 1-methylethylene 1,1-dimethylethylene, butylene, 1-methylpropylene, 2-methyl-propylene, pentylene, hexylene, heptylene, octylene, nonylene, decylene, dodecylene, tetradecylene, hexadecylene or octadecylene or. In particular, X is $C_1$-$C_{12}$alkylene, for example ethylene, decylene or for example

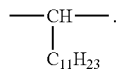

$C_2$-$C_{12}$alkoxycarbonyl is linear or branched and is, for example $C_2$-$C_6$- and $C_2$-$C_4$alkoxycarbonyl, e.g. methoxycarbonyl, ethoxycarbonyl, propoxycarbonyl, n-butyloxycarbonyl, isobutyloxycarbonyl, 1,1-dimethylpropoxycarbonyl, pentyloxycarbonyl, hexyloxycarbonyl, heptyloxycarbonyl, octyloxycarbonyl, nonyloxycarbonyl, decyloxycarbonyl or dodecyloxycarbonyl, especially methoxycarbonyl, ethoxycarbonyl, propoxycarbonyl, n-butyloxycarbonyl or iso-butyloxycarbonyl, preferably methoxycarbonyl.

$C_1$-$C_{20}$alkanoyl is linear or branched and is, for example, $C_1$-$C_{18}$-, $C_1$-$C_{14}$-, $C_1$-$C_{12}$-, $C_1$-$C_8$-, $C_1$-$C_6$- or $C_1$-$C_4$alkanoyl or $C_4$-$C_{12}$- or $C_4$-$C_8$alkanoyl. Examples are formyl, acetyl, propionyl, butanoyl, isobutanoyl, pentanoyl, hexanoyl, heptanoyl, octanoyl, nonanoyl, decanoyl, dodecanoyl, tetradecanoyl, pentadecanoyl, hexadecanoyl, octadecanoyl, icosanoyl, preferably acetyl.

$C_3$-$C_{12}$alkenoyl is mono or polyunsaturated and is for example propenoyl, 2-methylpropenoyl, butenoyl, pentenoyl, 1,3-pentadienoyl, 5-hexenoyl.

$C_2$-$C_4$alkanoyloxy is linear or branched, for example acetyloxy, propionyloxy, butanoyloxy, isobutanoyloxy, preferably acetyloxy.

$C_1$-$C_{12}$alkylsulfanyl (=$C_1$-$C_{12}$alkylthio) is $C_1$-$C_{12}$alkyl, which at the "yl" moiety bears one-S-atom. $C_1$-$C_{12}$alkyl has the same meanings as given above for $C_1$-$C_{20}$alkyl up to the corresponding number of C-atoms. $C_1$-$C_4$alkylsulfanyl is linear or branched or cyclic, for example, methylsulfanyl, ethylsulfanyl, propylsulfanyl, isopropylsulfanyl, n-butylsulfanyl, sec-butylsulfanyl, isobutylsulfanyl, tert-butylsulfanyl.

Phenylsulfanyl is phenylthio.

Phenyl-$C_1$-$C_3$alkyloxy has meanings corresponding to phenyl-$C_1$-$C_3$alkyl as given above in the definition of $C_7$-$C_{30}$arylalkyl, wherein an additional O-atom is present as "oxy" group at the link of the group to the rest of the molecule. Examples are benzyloxy, phenylethyloxy, α-methylbenzyloxy, especially benzyloxy.

$C_2$-$C_{10}$alkoxyalkyl is $C_2$-$C_{10}$alkyl, which is interrupted by one O-atom. $C_2$-$C_{10}$alkyl has the same meanings as given above for $C_1$-$C_{20}$alkyl up to the corresponding number of C-atoms. Examples are methoxymethyl, methoxyethyl, methoxypropyl, ethoxymethyl, ethoxyethyl, ethoxypropyl, propoxymethyl, propoxyethyl, propoxypropyl.

Halogen denotes a fluoro, chloro, bromo or iodo radical, especially fluoro, chloro or bromo.

If $R_3$ and $R_4$ together are S, O, $NR_{10}$, $CH_2$ or $CH(CH)_3$, for example the following structures are formed

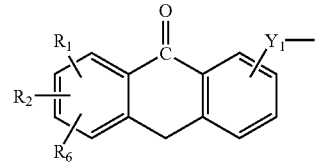

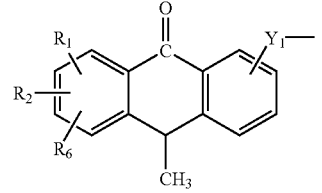

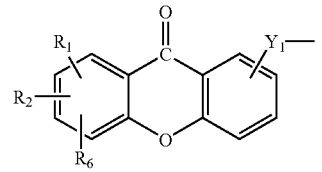

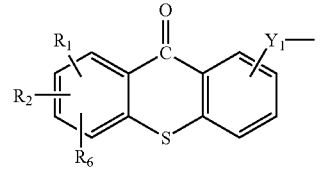

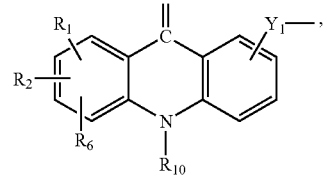

preferably the thioxanthyl moiety

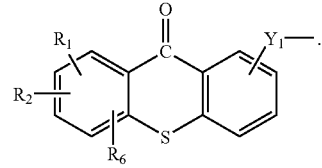

If the substituents $OR_{21}$, $SR_{22}$ and $NR_{19}R_{20}$ on a phenyl, naphthyl, benzoyl or naphthoyl ring form 5- or 6-membered rings via the radicals $R_{21}$, $R_{22}$, $R_{19}$ and/or $R_{20}$ with further substituents on the phenyl, naphthyl, benzoyl or naphthoyl ring, structures comprising two or three rings (inclusive the phenyl, naphthyl, benzoyl or naphthoyl ring) are obtained. Examples are

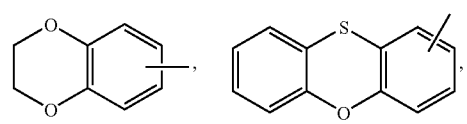

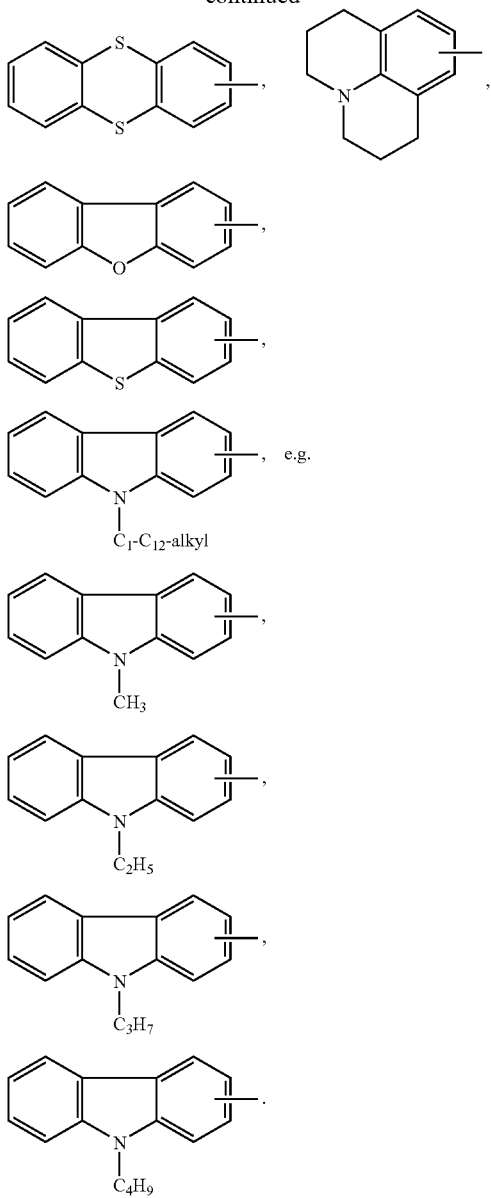

Preferably a carbazol moiety is formed.

If $R_{19}$ and $R_{20}$ together are $C_2$-$C_6$alkylene optionally interrupted by O or $NR_{21}$, they together with the N-atom to which they are linked, form a 5-, 6- or 7-membered ring which optionally is interrupted by O or by $NR_{21}$, thereby forming saturated or unsaturated rings, for example aziridine, pyrrole, pyrrolidine, oxazole, pyridine, 1,3-diazine, 1,2-diazine, piperidine or morpholine, preferably morpholine.

If more than one radicals "A" are present in the catalyst compounds of the formula I or II of the present invention, said radicals are identical or different.

The terms "and/or" or "or/and" in the present context are meant to express that not only one of the defined alternatives (substituents) may be present, but also several of the defined alternatives (substituents) together, namely mixtures of different alternatives (substituents).

The term "at least" is meant to define one or more than one, for example one or two or three, preferably one or two.

The term "optionally substituted" means that the radical to which it refers is either unsubstituted or substituted.

Throughout this specification and the claims which follow, unless the context requires otherwise, the word "comprise", or variations such as "comprises" or "comprising", will be understood to imply the inclusion of a stated integer or step or group of integers or steps but not the exclusion of any other integer or step or group of integers or steps.

The term "(meth)acrylate" in the context of the present application is meant to refer to the acrylate as well as to the corresponding methacrylate.

The preferences referring to the latent catalyst compounds in general (and in particular of the formula I and II) as given hereinbefore and in the context of the whole text, are intended not to refer to the compounds as such only, but to all categories of the claims. That is to the compositions, comprising the latent catalyst compounds, as well as the use or process claims in which said compounds are employed.

The person skilled in the art is familiar with this kind of complex formation of diketo compounds. The keto groups with the metal atom form a chelate complex, via the enol form of a keto group, while the second bond is a coordinative link. For example the photoactive moiety (PI as group (L) can form such chelates, e.g.

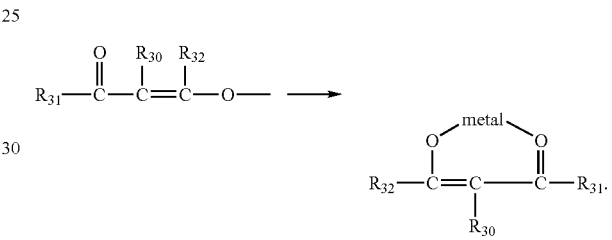

In case that Me is Zr, the compounds of the invention for example have a coordination central atom Zr to ligands L as follows: $ZrL_4$, $ZrL_2L'_2$, wherein the ligands L optionally are divalent.

Further examples are ketoamides as for example described in WO 2007/003966, the disclosure of which hereby is incorporated by reference.

The compounds of the present invention can be prepared by known methods, e.g. by reacting the corresponding alcohol or acid of the photoactive moiety with an organyl metal oxide, an organyl alkoxide or an aryl-metal (for example triphenyl bismuth, tetraphenyl tin); or by reacting the corresponding halide of the photoactive moiety with an organyl metal halogenide or by reacting the photoactive moiety with a metal halide (for example aluminium trichloride or titanium teratrachloride). The compounds with oxime ester groups are for example prepared by reacting the corresponding oxime of the photoactive moiety with an organyl metal oxide or -alkoxide. Such reactions in general are known to the person skilled in the art and are published for example in textbooks of chemistry, such as Alwyn G. Davies, "*Organotin Chemistry*", *Ed.* 2, 2004, Wiley-VCH, Weinheim; Michel Pereyre, Jean-Paul Quinford, Alain Rahm, "*Tin in organic Synthesis*", 1987, Butterworths, London.

Method 1

Accordingly, compounds of the formula I according to the present invention with a "C—O-metal" linkage, a "C—(CO)—O-metal" linkage or a "C=N—O-metal" linkage are for example obtained by reacting a compound of the formula (Xa), (Xb) or (Xc) with a metal oxide or a metal alkoxide (XIa) or (XIb):

m-x PI'-OH (Xa)

m-x PI'-COOH (Xb)

m-x PI'-C(R$_{17}$)=N—OH (Xc)

+

$(O)_{(m-x)/2}$MeA$_x$ (XIa)

$(AO)_{m-x}$MeA$_x$ (XIb)

→

$(PI'-O)_{m-x}$-MeA$_x$ $(PI'-COO)_{m-x}$-MeA$_x$ $(PI'-C(R_{17})=N-O)_{m-x}$-MeA$_x$, (I')

wherein R$_{17}$, m, x, Me and A are as defined above and PI' is a group (A'), (B'), (C'), (D), (D'), (E'), (F'), (G'), (H), (J'), (K) or (L)

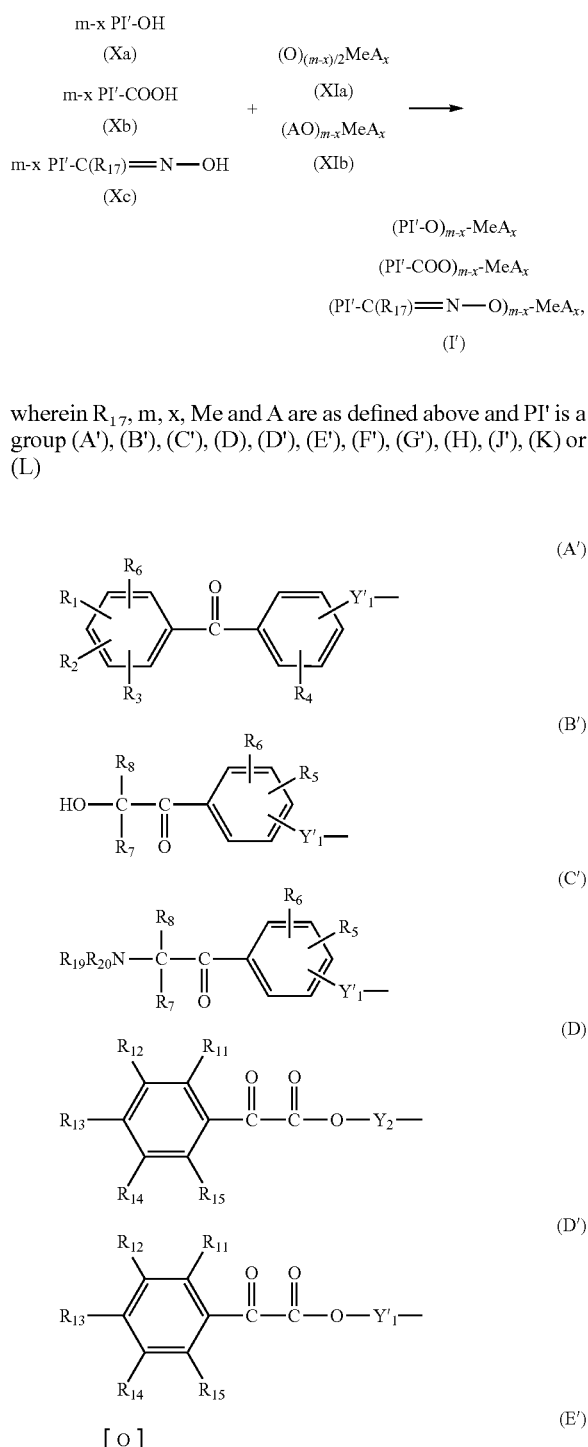

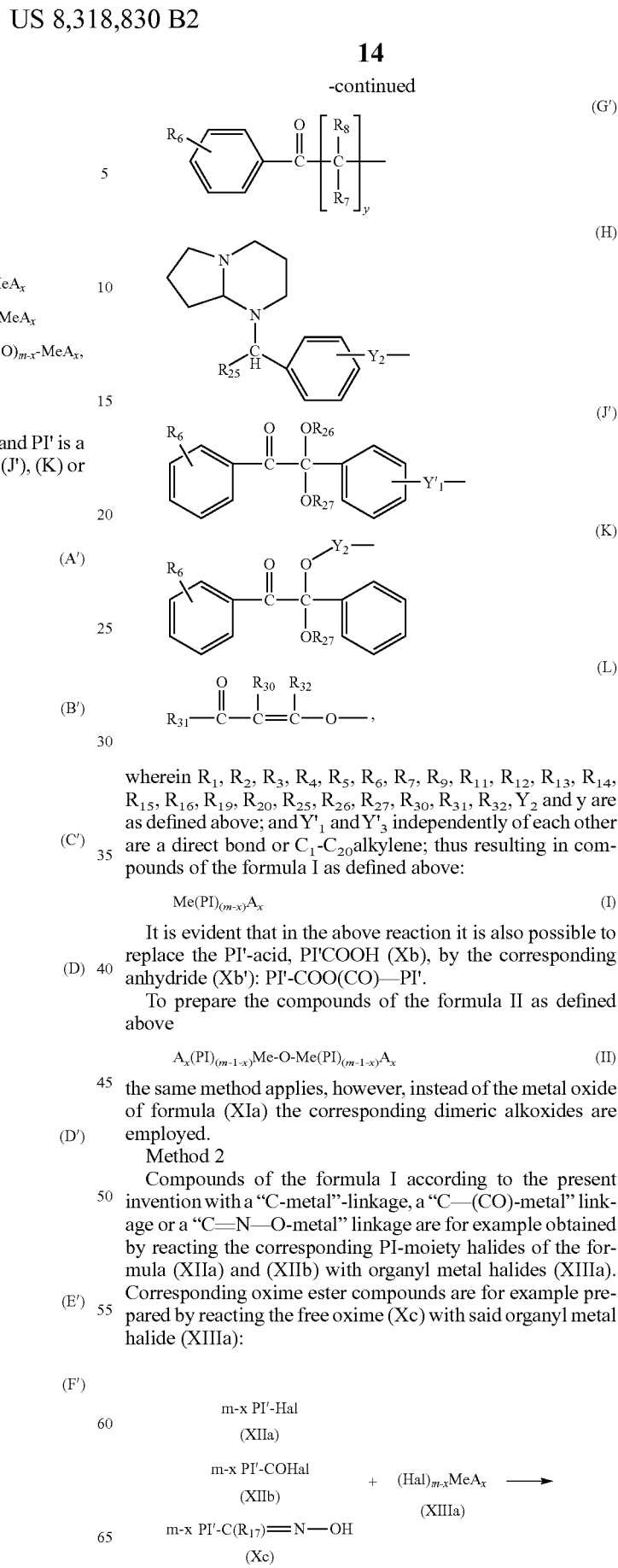

wherein R$_1$, R$_2$, R$_3$, R$_4$, R$_5$, R$_6$, R$_7$, R$_9$, R$_{11}$, R$_{12}$, R$_{13}$, R$_{14}$, R$_{15}$, R$_{16}$, R$_{19}$, R$_{20}$, R$_{25}$, R$_{26}$, R$_{27}$, R$_{30}$, R$_{31}$, R$_{32}$, Y$_2$ and y are as defined above; and Y'$_1$ and Y'$_3$ independently of each other are a direct bond or C$_1$-C$_{20}$alkylene; thus resulting in compounds of the formula I as defined above:

Me(PI)$_{(m-x)}$A$_x$ (I)

It is evident that in the above reaction it is also possible to replace the PI'-acid, PI'COOH (Xb), by the corresponding anhydride (Xb'): PI'-COO(CO)—PI'.

To prepare the compounds of the formula II as defined above

A$_x$(PI)$_{(m-1-x)}$Me-O-Me(PI)$_{(m-1-x)}$A$_x$ (II)

the same method applies, however, instead of the metal oxide of formula (XIa) the corresponding dimeric alkoxides are employed.

Method 2

Compounds of the formula I according to the present invention with a "C-metal"-linkage, a "C—(CO)-metal" linkage or a "C=N—O-metal" linkage are for example obtained by reacting the corresponding PI-moiety halides of the formula (XIIa) and (XIIb) with organyl metal halides (XIIIa). Corresponding oxime ester compounds are for example prepared by reacting the free oxime (Xc) with said organyl metal halide (XIIIa):

m-x PI'-Hal (XIIa)

m-x PI'-COHal (XIIb)

+ (Hal)$_{m-x}$MeA$_x$ (XIIIa) → m-x PI'-C(R$_{17}$)=N—OH (Xc)

-continued $$(PI')_{m-x}\text{-MeA}_x$$

$$(PI'\text{-CO})_{m-x}\text{-MeA}_x$$

$$(PI'\text{-C}(R_{17})\!\!=\!\!N\!-\!O)_{m-x}\text{-MeA}_x, \quad (I')$$

wherein Hal is a halogen atom, in particular Cl or Br. $R_{17}$, m, x, Me and A are as defined above and PI' is as defined above.

Compounds of the formula II of the present invention are for example obtained by exchanging the organyl halide (XIIIa) in the above reactions by an organyl halide (XIIIb):

$$\begin{array}{cc} (\text{Hal})_{m-1-x} & (\text{Hal})_{m-1-x'} \\ | & | \\ A_x\text{-Me}\!-\!\!\text{O}\!-\!\!\text{Me-A}_x \end{array} \quad (\text{XIIIb})$$

In the above reactions for example Zn may be employed as a catalyst.

Method 3

Further, the above reaction may be conducted by reacting an acid or anhydride of the photoactive moiety PI'-COOH (Xb) or PI'-COO(CO)—PI' (Xb'), as defined above, with an organyl metal halide $(\text{Hal})_{m-x}\text{MeA}_x$ (XIIIa) as defined above.

Method 4

Another method of preparation of the compound of the present invention resides in the reaction of an acid (or anhydride) of the photoinitiator moiety, for example a compound of the formula Xb as defined above, with an (aryl)(alkyl) metal, for example dibutyl-diphenyl tin or triphenyl bismuth:

$$m\text{-}x\text{PI'-COOH(Xb)}+\text{Me(A)}_m \rightarrow (\text{PI'-COO})_{m-x}\text{-MeA}_x \quad (I'),$$

PI', m, x, Me and A are as defined above, wherein, however, not all A in the molecule $\text{Me(A)}_m$ are identical and at least one of the radicals A denote aryl.

Method 5

Compounds of the present invention wherein at least one photoactive moiety (PI) is the group (L) are for example prepared by reacting an appropriate 1,3-diketone compound with a corresponding metal alkoxide compound, e.g. 1-benzoylacetone with dimethoxy-dibutyl tin.

Method 6

Compounds of the present invention wherein at least one photoactive moiety (PI) is the group (L) are for example prepared by reacting an appropriate 1,3-diketone compound with a corresponding metal halogenide compound, e.g. 1-benzoylacetone with zirconium tetrachloride.

Method 7

Compounds of the present invention wherein at least one photoactive moiety (PI) is the group (L) are for example prepared by reacting tetra-acetylacetonate metal compound with a PI—COOH compound, e.g. 1-benzoylacetone with zirconium tetra acetylacetonate.

Compounds of the formula I or II, wherein $Y_1$ is $NR_{10}$ are for example prepared according to the method 1 as given above, by exchanging the alcohol by corresponding amine or the acid by the corresponding amide.

The person skilled in the art is familiar with conditions and precautions which have to be taken in such organometallic reactions.

It is, for example, advantageous to work under an inert reaction atmosphere as in principle the organometallic intermediates (metal alkoxides, e.g. tin alkoxides, metal enolates, e.g. tin enolates, metal esters, e.g. α-stannyl esters) are very sensitive to moisture. Accordingly, the reaction advantageously is conducted under argon gas flow by advantageously inertizing the corresponding reaction apparatus prior to the reaction by the usual methods, for example by heating followed by evacuation.

The organometallic carboxylates are for example most readily prepared by reacting corresponding carboxylic acids (or anhydrides) with organo metal oxides, e.g. organo tin oxides, or hydroxides, usually with azeotropic removal of the water which is formed in said reaction.

In the isolation and working-up of the products of the present invention, it is also necessary to take corresponding appropriate precautions, depending on the stability against moisture and oxygen.

With respect to tin as the metal atom generally the carbonic acid esters and the tetraorganyl tin compounds can be handled easily without special treatment, while tin alkoxides are more sensitive. The sensitivity towards hydrolysis of such compounds may be reduced by electron-drawing groups, such as keto groups, nitrile groups, ester groups $CF_3$ groups etc.

Suitable solvents in the preparation processes for the compounds according to the present invention are for example aprotic solvents, in particular toluene, xylene, dioxane and tetrahydrofurane (THF).

The reaction temperature range for example from room temperature (e.g. 20° C.) up to about 200° C., or room temperature to 150° C., preferably 50-150° C.

The pressure for example ranges from normal pressure (760 Torr) to 10 mmHg, preferably a slight vacuum is used.

A lot of tin compounds, that may be used as intermediates in the above reactions are commercially available, in particular butyl-tin derivatives substituted with alkoxy or halogen, as well as a lot of Bi-, Zr-, Al- and Ti-complexes or -organometallic compounds.

Subject of the present invention also are those latent catalyst compounds which are novel. Interesting therefore is a latent catalyst compound, which is of the formula I or II, $$\text{Me(PI)}_{(m-x)}A_x \quad (I)$$

$$A_x(\text{PI})_{(m-1-x)}\text{Me-O-Me(PI)}_{(m-1-x)}A_x \quad (II), \text{ wherein}$$

Me is Sn, Bi, Al, Zr or Ti;
m denotes an integer from 1 up to the coordination number of Me;
x is an integer from 0 to (m−1);
A is $C_1$-$C_{20}$alkyl, $C_7$-$C_{30}$arylalkyl, $C_1$-$C_{20}$alkoxy, $C_2$-$C_{20}$alkanoyloxy, $C_6$-$C_{18}$aryl or $C_6$-$C_{18}$aryl which is substituted by one or more $C_1$-$C_{20}$alkyl; or, if x is 1, A additionally is halogen; provided that in case x is greater than one, the A are identical or different.
PI independently of each other are a group of the formula (Z), (B), (C), (D), (F), (G), (H), (J), (K) or (M)

(Z)

(B)

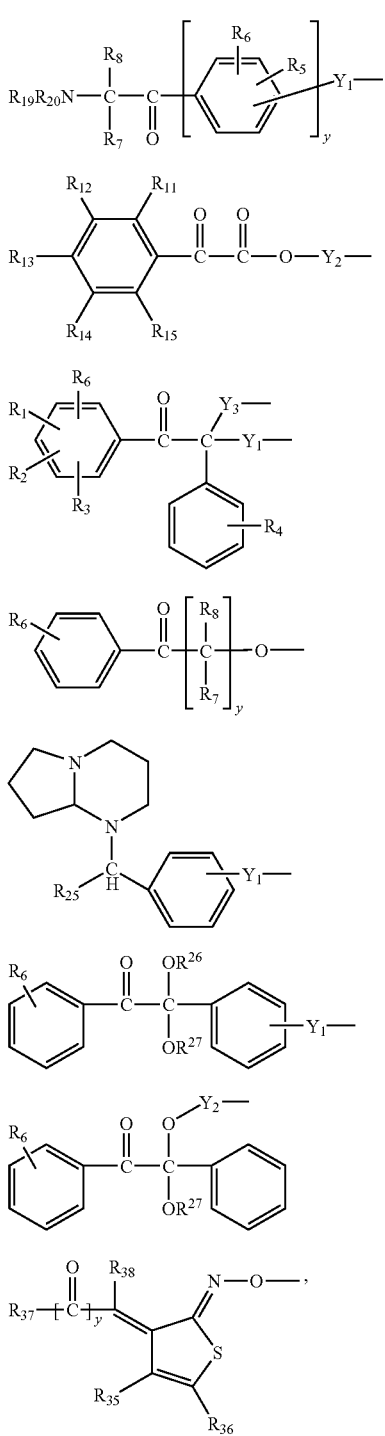

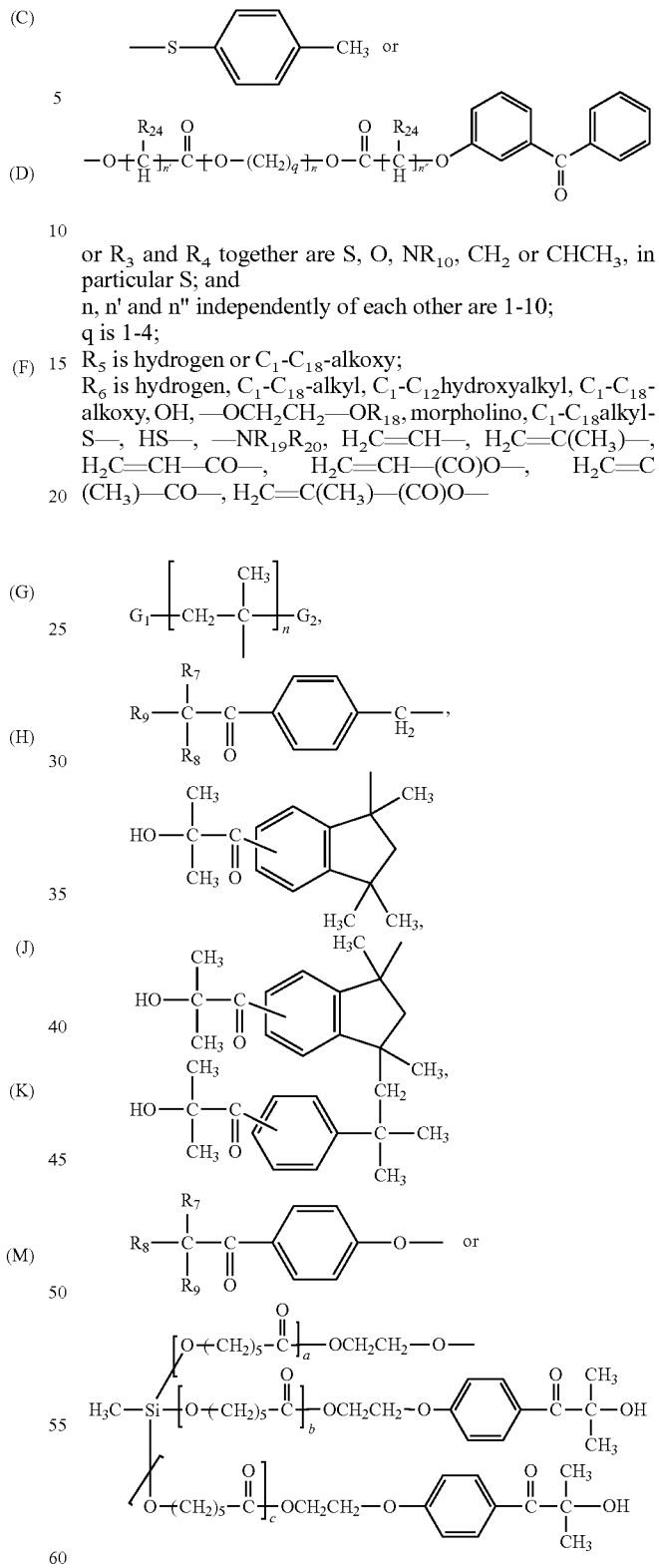

wherein
y is 0 or 1;
$R_1$, $R_2$ and $R_3$ independently of one another are hydrogen, $C_1$-$C_6$-alkyl, $C_1$-$C_4$-halogenalkyl, $C_6$-$C_{18}$aryl, $C_7$-$C_{30}$aralkyl, $C_1$-$C_4$-alkoxy, $C_1$-$C_4$alkylthio, halogen, $N(C_1$-$C_4$-alkyl$)_2$, or $N(C_4$-$C_7$-cycloalkyl which optionally is interrupted by —O— or $NR_{10}$;
$R_4$ is hydrogen, $C_1$-$C_4$-alkyl, $C_1$-$C_4$-halogenalkyl, phenyl, $N(C_1$-$C_4$-alkyl$)_2$, $COOCH_3$, or $R_3$ and $R_4$ together are S, O, $NR_{10}$, $CH_2$ or $CHCH_3$, in particular S; and
n, n' and n" independently of each other are 1-10;
q is 1-4;
$R_5$ is hydrogen or $C_1$-$C_{18}$-alkoxy;
$R_6$ is hydrogen, $C_1$-$C_{18}$-alkyl, $C_1$-$C_{12}$hydroxyalkyl, $C_1$-$C_{18}$-alkoxy, OH, —$OCH_2CH_2$—$OR_{18}$, morpholino, $C_1$-$C_{18}$alkyl-S—, HS—, —$NR_{19}R_{20}$, $H_2C$=CH—, $H_2C$=C($CH_3$)—, $H_2C$=CH—CO—, $H_2C$=CH—(CO)O—, $H_2C$=C($CH_3$)—CO—, $H_2C$=C($CH_3$)—(CO)O— a, b and c independently of one another are 1-3;
$G_1$ and $G_2$ independently of one another are end groups of the polymeric structure, preferably hydrogen or methyl;
$Y_1$ and $Y_3$ independently of one another are a direct bond, O, (CO)O, $NR_{10}$, $C_1$-$C_{20}$alkylene, $C_1$-$C_{20}$alkylene-O—, $C_1$-$C_{20}$alkylene-(CO)O— or

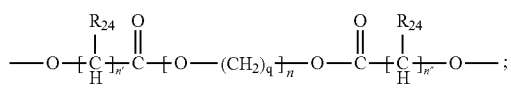

$Y_2$ is a direct bond or $C_1$-$C_{20}$alkylene;

$R_7$ and $R_8$ independently of one another are hydrogen, $C_1$-$C_6$-alkyl, unsubstituted phenyl or benzyl; or phenyl or benzyl substituted by $C_1$-$C_{12}$-alkyl; or $R_7$ and $R_8$ together with the carbon atom to which they are attached form a cyclohexyl ring;

$R_9$ is OH or $NR_{19}R_{20}$;

$R_{10}$ is hydrogen, $C_1$-$C_{18}$-alkyl, $C_2$-$C_{18}$alkenyl, $C_1$-$C_{12}$hydroxyalkyl or $C_1$-$C_{12}$halogenoalkyl;

$R_{11}$, $R_{12}$, $R_{13}$, $R_{14}$ and $R_{15}$ independently of one another are hydrogen, unsubstituted $C_1$-$C_{12}$-alkyl or $C_1$-$C_{12}$-alkyl substituted by OH, $C_1$-$C_4$-alkoxy, phenyl, naphthyl, halogen or CN; wherein the alkyl chain optionally is interrupted by one or more O; or $R_{11}$, $R_{12}$, $R_{13}$, $R_{14}$ and $R_{15}$ independently of one another are $C_1$-$C_4$-alkoxy, $C_1$-$C_4$-alkylthio, $NR_{19}R_{20}$, $H_2C=CH-CO-$, $H_2C=CH-(CO)O-$, $H_2C=C(CH_3)-CO-$, r $H_2C=C(CH_3)-(CO)O-$;

$R_{18}$ is hydrogen,

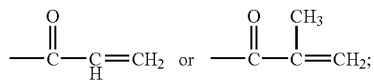

$R_{19}$ and $R_{20}$ independently of one another are hydrogen, $C_1$-$C_{20}$alkyl, $C_2$-$C_4$hydroxyalkyl, $C_2$-$C_{10}$alkoxyalkyl, $C_2$-$C_5$alkenyl, $C_3$-$C_8$cycloalkyl, phenyl-$C_1$-$C_3$alkyl, $C_1$-$C_8$alkanoyl, $C_3$-$C_{12}$alkenoyl, benzoyl; or are phenyl or naphthyl, each of which is unsubstituted or substituted by $C_1$-$C_{12}$alkyl, benzoyl or $C_1$-$C_{12}$alkoxy; or $R_{19}$ and $R_{20}$ together are $C_2$-$C_6$alkylene optionally interrupted by O or $NR_{21}$ and/or optionally substituted by OH, $C_1$-$C_4$alkoxy, $C_2$-$C_4$alkanoyloxy or benzoyloxy, or, together with the N-atom to which they are attached, are

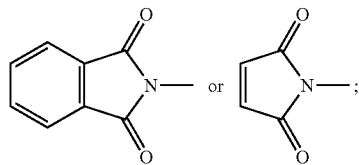

$R_{21}$ and $R_{22}$ independently of one another are hydrogen, $C_1$-$C_{20}$alkyl, $C_2$-$C_{12}$alkenyl, $C_3$-$C_8$cycloalkyl, phenyl-$C_1$-$C_3$alkyl; or are $C_1$-$C_8$alkyl which is substituted by OH, SH, CN, $C_1$-$C_8$alkanoyl, benzoyl, which is unsubstituted or substituted by one or more $C_1$-$C_6$alkyl, halogen, OH, $C_1$-$C_4$alkoxy or $C_1$-$C_4$alkylsulfanyl; or are phenyl or naphthyl, each of which is unsubstituted or substituted by halogen, $C_1$-$C_{12}$alkyl, $C_1$-$C_{12}$alkoxy, phenyl-$C_1$-$C_3$alkyloxy, phenoxy, $C_1$-$C_{12}$alkylsulfanyl, phenylsulfanyl, —N($C_1$-$C_{12}$alkyl)$_2$, diphenylamino;

$R_{23}$ is $C_1$-$C_{12}$alkyl, phenyl, 4-morpholinophenyl, $C_1$-$C_{12}$alkylphenyl or phenyl substituted with $C_3$-$C_8$cycloalkyl which optionally is interrupted by O; and $R_{24}$ is hydrogen, methyl or ethyl;

$R_{25}$ is hydrogen or $C_1$-$C_4$alkyl;

$R_{26}$ and $R_{27}$ independently of each other are $C_1$-$C_{20}$alkyl which is unsubstituted or is substituted by $C_1$-$C_4$alkoxy or phenyl, or $R_{26}$ and $R_{27}$ together are $C_2$-$C_4$alkylene;

$R_{35}$ and $R_{36}$ independently of each other are hydrogen, halogen, $C_1$-$C_4$alkyl, $C_1$-$C_4$alkoxy, $C_1$-$C_4$thioalkyl, $C_1$-$C_4$haloalkyl, CN, $NO_2$, $C_2$-$C_6$alkanoyl, benzoyl, phenyl, —S-phenyl, phenoxy, $C_2$-$C_6$alkoxycarbonyl, phenoxycarbonyl, or $R_{35}$ and $R_{36}$ together are —C($R_{39}$)=C($R_{40}$)—C($R_{41}$)=C($R_{42}$)—;

$R_{37}$ is phenyl, naphthyl, anthracyl, phenanthryl or $C_4$-$C_{20}$heteroaryl, wherein the phenyl, naphthyl, anthracyl, phenanthryl or $C_4$-$C_{20}$heteroaryl are unsubstituted or are substituted by one or more $C_1$-$C_{12}$alkyl, $C_1$-$C_4$haloalkyl, halogen, phenyl, $OR_{21}$, $SR_{22}$, $NR_{19}R_{20}$ and/or —S-phenyl, it being possible for the substituents $OR_{21}$, $SR_{22}$ and/or $NR_{19}R_{20}$ to form 5- or 6-membered rings, via the radicals $R_{21}$, $R_{22}$, $R_{20}$ and/or $R_{19}$, with further substituents on the phenyl, naphthyl, anthracyl, phenanthryl or $C_4$-$C_{20}$heteroaryl ring or with one of the carbon atoms of the phenyl, naphthyl, anthracyl, phenanthryl or $C_4$-$C_{20}$heteroaryl ring, or, if y is 0, $R_{37}$ additionally is $C_2$-$C_6$alkoxycarbonyl, phenoxycarbonyl or CN;

or $R_{37}$ is hydrogen or $C_1$-$C_{12}$alkyl, provided that $R_{38}$ is not simultaneously hydrogen or $C_1$-$C_{12}$alkyl;

$R_{38}$ has one of the meanings of $R_{37}$ or is unsubstituted or CN-substituted phenyl, $C_2$-$C_6$-alkanoyl, benzoyl that is unsubstituted or substituted by $C_1$-$C_6$alkyl, phenyl, $OR_{21}$, $SR_{22}$ and/or $NR_{19}R_{20}$, or $R_{38}$ is phenoxycarbonyl, $NO_2$, $C_1$-$C_4$haloalkyl, or $R_{37}$ and $R_{38}$ together with the CO group, form a 5- or 6-membered ring which is unsubstituted or substituted by $C_1$-$C_6$alkyl, phenyl, $OR_{21}$, $SR_{22}$ and/or $NR_{19}R_{20}$, and said ring optionally is interrupted by O, S, $NR_{10}$ and/or by CO, and optionally to said ring one or more benzo radicals are fused;

$R_{39}$, $R_{40}$, $R_{41}$ and $R_{42}$ independently of each another are hydrogen, $C_1$-$C_4$alkyl, halogen, phenyl, $C_1$-$C_4$alkkoxy, $C_1$-$C_4$thioalkyl, —S-phenyl, phenoxy, $C_2$-$C_6$alkoxycarbonyl, phenoxycarbonyl, CN, $NO_2$ or $C_1$-$C_4$haloalkyl.

Me in the compounds of the formula I or II is for example is Sn, Bi, Zr or Ti, e.g. Bi, Zr or Ti, or is for example Bi or Zr, preferably Zr.

PI in the compounds of the formula I or II is for example
a group (Z), (B), (C), (D), (E), (F), (G), (H), (J), (K), or (M) as defined above,
e.g. a group (Z), (B), (C), (D), (E), (F), (G), (H), (J), (K), or (M);
or a group (Z), (B), (C), (D), (F), (G), (H), (J), (K), (L) or (M);
or a group (Z), (B), (C), (D), (F), (G), (J), (K) or (M);
or a group (Z), (B), (C), (D), (F), (G), (H), (J), (K) or (L);
or a group (Z), (B), (C), (D), (F), (G), (J) or (K);
or a group (Z), (B), (C), (D), (E), (F), (G), (L) or (M);
or a group (Z), (B), (C), (D), (F) or (G);
or a group a group (Z), (B), (C), (D), (F) or (G);
or a group (Z) or (L);
or a group (Z), (B), (C), (D), (F), (G) or (L);
preferred is the group (Z).

Examples of interesting photoactive moieties "PI", in particular in the case where Me is Bi, are groups of the formula (Z) as defined above, for example such, wherein $R_3$ and $R_4$ are hydrogen, and $R_1$ is hydrogen, halogen, $C_1$-$C_4$alkoxy or $C_1$-$C_4$alkylthio.

Further interesting, in particular in the case where Me is Bi and Zr, are 2-3 ligands PI—(CO)O-linked to the metal atom.

If the compounds of the present invention comprise a group (L) as a photoactive moiety PI and x is 0, interesting compounds are such, in which at least one of the radicals $R_{30}$, $R_{31}$ or $R_{32}$ comprises an aromatic group, e.g. phenyl or benzyl.

Further interesting are such compounds of the invention, wherein x is 0 and which comprise a group (L) as a photoactive moiety PI, which in addition to the photoactive moiety (L) comprise a further photoactive moiety, other than (L), selected from the groups as defined above.

Interesting is a latent catalyst compound of formula I or II, wherein

Me is Sn, Bi, Al, Zr or Ti;

m denotes an integer from 1 up to the coordination number of Me;

x is an integer from 0 to (m−1);

A is $C_1$-$C_{20}$alkyl, halogen, $C_1$-$C_{20}$alkoxy, $C_2$-$C_{20}$alkanoyloxy or $C_6$-$C_{18}$aryl;

PI independently of each other are a group of the formula (Z), (B), (C), (D), (E), (F), (G), (L) or (M);

y is 0 or 1;

$R_1$, $R_2$ and $R_3$ independently of one another are hydrogen or $C_1$-$C_6$-alkyl;

$R_4$ is hydrogen, or $R_3$ and $R_4$ together are S;

$R_5$ is hydrogen;

$R_6$ is hydrogen;

$Y_1$ and $Y_3$ independently of one another are O, (CO)O, $C_1$-$C_{20}$alkylene, $C_1$-$C_{20}$alkylene-O— or $C_1$-$C_{20}$alkylene-(CO)O—;

$Y_2$ is a direct bond;

$R_7$ and $R_8$ independently of one another are $C_1$-$C_6$-alkyll; or $R_7$ and $R_8$ together with the carbon atom to which they are attached form a cyclohexyl ring;

$R_{11}$, $R_{12}$, $R_{13}$, $R_{14}$ and $R_{15}$ are hydrogen;

$R_{16}$ is phenyl;

$R_{17}$ is CN;

$R_{19}$ and $R_{20}$ together with the N-atom to which they are attached, are

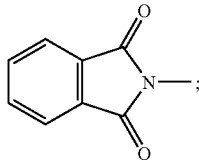

$R_{30}$ is hydrogen, $C_1$-$C_4$alkyl, or is alkyl which is substituted by phenyl or by benzoylphenyl;

$R_{31}$ is $C_1$-$C_{12}$alkyl, phenyl or phenyl substituted by one or more $R_{33}$;

$R_{32}$ is $C_1$-$C_{12}$alkyl, $C_1$-$C_4$alkoxy, phenyl or phenyl substituted by one or more $R_{33}$;

$R_{33}$ is $C_1$-$C_8$alkoxy or benzoyl;

$R_{37}$ is phenyl, unsubstituted or are substituted by one or more $C_1$-$C_{12}$alkyl, or, if y is 0, $R_{37}$ additionally is CN; and $R_{38}$ has one of the meanings of $R_{37}$.

x is for example an integer from 0 to (m−1), which is for example from 0 to 6; 0 to 4; or is 0, 1, 2, 3 or 4.

In Case that the metal (Me) is Sn, x is for example preferably 0, 2 or 3, in particular 2 or 3.

In case that the metal (Me) is Bi, x is for example preferably 0, 1 or 2, in particular 0 or 1.

In case that the metal (Me) is Zr, x is for example 0 or 1, in particular 0.

In case that the metal (Me) is Al, x is preferably 0.

In case that the metal (Me) is Ti, x is for example preferably 0 or 1 or 2.

Me is for example Sn, Bi, Al, Zr or Ti; or is Sn, Bi, Al or Zr; or is Sn, Bi, Al, or Ti; or is Sn, Bi, Zr or Ti; or is, Bi, Al, Zr or Ti; or is Bi, Zr or Ti; or is Bi or Zr. Preferred are Sn, Bi, Zr, in particular Bi and Zr.

A is for example $C_1$-$C_{20}$alkyl, halogen, $C_7$-$C_{30}$arylalkyl, $C_1$-$C_{20}$alkoxy, $C_2$-$C_{20}$alkanoyloxy, $C_6$-$C_{18}$aryl or $C_6$-$C_{18}$aryl which is substituted by one or more $C_1$-$C_{20}$alkyl;

or is for example $C_1$-$C_{20}$alkyl, halogen, $C_1$-$C_{20}$alkoxy, $C_2$-$C_{20}$alkanoyloxy or $C_6$-$C_{18}$aryl, in particular $C_1$-$C_{12}$alkyl or phenyl, especially $C_1$-$C_{12}$alkyl.

In case that A is halogen, x is for example 1 or 2.

It is evident, that if more than one group A are present in the molecule said groups are identical or different (within the above given definitions of A).

$R_1$, $R_2$, $R_3$ for example are independently of one another hydrogen, $C_1$-$C_6$-alkyl, $C_1$-$C_4$-halogenalkyl, $C_6$-$C_{18}$aryl, $C_7$-$C_{30}$aralkyl, $C_1$-$C_4$-alkoxy, $C_1$-$C_4$alkylthio, halogen, $N(C_1$-$C_4$-alkyl)$_2$, or $N(C_4$-$C_7$-cycloalkyl) which optionally is interrupted by —O— or $NR_{10}$;

or for example are independently of one another hydrogen, $C_1$-$C_6$-alkyl, $C_1$-$C_4$-halogenalkyl, $C_6$-$C_{18}$aryl, $C_1$-$C_4$-alkoxy, $C_1$-$C_4$alkylthio, $N(C_1$-$C_4$-alkyl)$_2$, or $N(C_4$-$C_7$-cycloalkyl) which optionally is interrupted by —O— or $NR_{10}$;

or for example are independently of one another hydrogen, $C_1$-$C_6$-alkyl, $C_6$-$C_{18}$aryl, $C_1$-$C_4$-alkoxy, $C_1$-$C_4$alkylthio, $N(C_1$-$C_4$-alkyl)$_2$, or $N(C_4$-$C_7$-cycloalkyl) which optionally is interrupted by —O— or $NR_{10}$;

or for example are independently of one another hydrogen, $C_1$-$C_6$-alkyl, $C_1$-$C_4$-alkoxy, $C_1$-$C_4$alkylthio, $N(C_1$-$C_4$alkyl)$_2$, or morpholinyl; or for example are independently of one another hydrogen or $C_1$-$C_6$-alkyl.

$R_4$ is for example hydrogen, $C_1$-$C_4$-alkyl, $C_1$-$C_4$-halogenalkyl, phenyl or $N(C_1$-$C_1$alkyl)$_2$, or $R_3$ and $R_4$ together are S, O, $NR_{10}$, $CH_2$ or $CHCH_3$, in particular S;

or $R_4$ is for example hydrogen, $C_1$-$C_4$-alkyl or $C_1$-$C_4$-halogenalkyl, or $R_3$ and $R_4$ together are S, $CH_2$ or $CHCH_3$, in particular S;

or $R_4$ is for example hydrogen or $C_1$-$C_4$-alkyl, or $R_3$ and $R_4$ together are S.

$R_5$ is hydrogen or $C_1$-$C_{18}$-alkoxy, in particular hydrogen.

$R_6$ is for example hydrogen, $C_1$-$C_{18}$-alkyl, $C_1$-$C_{12}$hydroxyalkyl, $C_1$-$C_{18}$-alkoxy, OH, —OCH$_2$CH$_2$—OR$_{18}$, morpholino, $C_1$-$C_{18}$alkyl-S—, HS—, —NR$_{19}$R$_{20}$, H$_2$C=CH—, H$_2$C=C(CH$_3$)—, H$_2$C=CH—(CO)O—, H$_2$C=C(CH$_3$)—CO—, H$_2$C=C(CH$_3$)—(CO)O—,

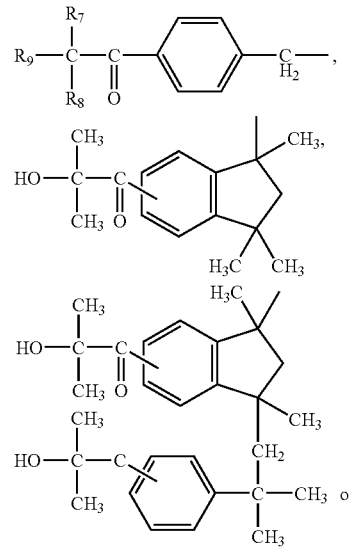

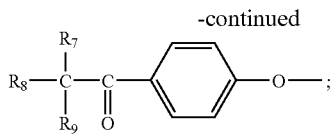

or R$_6$ is for example hydrogen, C$_1$-C$_{18}$-alkyl, C$_1$-C$_{12}$hydroxyalkyl, C$_1$-C$_{18}$-alkoxy, OH, —OCH$_2$CH$_2$—OR$_{18}$, morpholino, C$_1$-C$_{18}$alkyl-S—, HS—, —NR$_{19}$R$_{20}$, H$_2$C=CH—, H$_2$C=C(CH$_3$)—, H$_2$C=CH—CO—, H$_2$C=CH—(CO)O—, H$_2$C=C(CH$_3$)—CO— or H$_2$C=C(CH$_3$)—(CO)O—;

or R$_6$ is for example hydrogen, C$_1$-C$_{18}$-alkyl, C$_1$-C$_{12}$hydroxyalkyl, C$_1$-C$_{18}$-alkoxy, OH, H$_2$C=CH—, H$_2$C=C(CH$_3$)—, H$_2$C=CH—CO—, H$_2$C=CH—(CO)O—, H$_2$C=C(CH$_3$)—CO— or H$_2$C=C(CH$_3$)—(CO)O—;

or R$_6$ is for example hydrogen, C$_1$-C$_{18}$-alkyl, C$_1$-C$_{12}$hydroxyalkyl, C$_1$-C$_{18}$-alkoxy or OH;

or R$_6$ is for example hydrogen or C$_1$-C$_{18}$-alkyl, in particular hydrogen.

Y$_1$ and Y$_3$ for example independently of one another are a direct bond, O, (O)O, NR$_{10}$, C$_1$-C$_{20}$alkylene, C$_1$-C$_{20}$alkylene-O— or C$_1$-C$_{20}$alkylene-(CO)O—;

or Y$_1$ and Y$_3$ for example independently of one another are O, (CO)O, C$_1$-C$_{20}$alkylene, C$_1$-C$_{20}$alkylene-O— or C$_1$-C$_{20}$alkylene-(CO)O—;

Y$_2$ is a direct bond or C$_1$-C$_{20}$alkylene; in particular a direct bond.

R$_7$ and R$_8$ for example independently of one another are hydrogen, C$_1$-C$_6$-alkyl, unsubstituted phenyl or benzyl; or phenyl or benzyl substituted by C$_1$-C$_{12}$-alkyl; or R$_7$ and R$_8$ together with the carbon atom to which they are attached form a cyclohexyl ring;

or R$_7$ and R$_8$ for example independently of one another are C$_1$-C$_6$-alkyl, benzyl, or benzyl substituted by C$_1$-C$_{12}$-alkyl; or R$_7$ and R$_8$ together with the carbon atom to which they are attached form a cyclohexyl ring;

or R$_7$ and R$_8$ for example independently of one another are C$_1$-C$_6$-alkyl, benzyl, or R$_7$ and R$_8$ together with the carbon atom to which they are attached form a cyclohexyl ring;

or R$_7$ and R$_8$ independently of one another are C$_1$-C$_6$-alkyl or R$_7$ and R$_8$ together with the carbon atom to which they are attached form a cyclohexyl ring.

R$_{10}$ for example is hydrogen, C$_1$-C$_{18}$-alkyl, C$_2$-C$_{18}$alkenyl, C$_1$-C$_{12}$hydroxyalkyl or C$_1$-C$_{12}$halogenoalkyl;

or R$_{10}$ for example is hydrogen, C$_1$-C$_{18}$-alkyl or C$_2$-C$_{18}$alkenyl;

or R$_{10}$ for example is hydrogen or C$_1$-C$_{18}$-alkyl, in particular C$_1$-C$_4$alkyl.

R$_{11}$, R$_{12}$, R$_{13}$, R$_{14}$ and R$_{15}$ for example independently of one another are hydrogen, unsubstituted C$_1$-C$_{12}$-alkyl or C$_1$-C$_{12}$-alkyl substituted by OH, C$_1$-C$_4$-alkoxy, phenyl, naphthyl, halogen or CN; wherein the alkyl chain optionally is interrupted by one or more O; or independently of one another are C$_1$-C$_4$-alkoxy, C$_1$-C$_4$-alkylthio, NR$_{10}$R$_{20}$, H$_2$C=CH—CO—, H$_2$C=CH—(CO)O—, H$_2$C=C(CH$_3$)—CO— or H$_2$C=C(CH$_3$)—(CO)O—;

or R$_{11}$, R$_{12}$, R$_{13}$, R$_{14}$ and R$_{15}$ for example independently of one another are hydrogen, C$_1$-C$_{12}$-alkyl, C$_1$-C$_4$-alkoxy, C$_1$-C$_4$-alkylthio, NR$_{10}$R$_{20}$, H$_2$C=CH—CO—, H$_2$C=CH—(CO)O—, H$_2$C=C(CH$_3$)—CO— or H$_2$C=C(CH$_3$)—(CO)O—;

or R$_{11}$, R$_{12}$, R$_{13}$, R$_{14}$ and R$_{15}$ for example independently of one another are hydrogen or C$_1$-C$_{12}$-alkyl, in particular hydrogen.

R$_{16}$ for example is phenyl or naphthyl, both are unsubstituted or substituted 1 to 7 times by halogen, C$_1$-C$_{12}$alkyl, phenoxycarbonyl, C$_2$-C$_{12}$alkoxycarbonyl, OR$_{21}$, SR$_{22}$ and/or NR$_{10}$R$_{20}$, wherein the substituents OR$_{21}$, SR$_{22}$ and NR$_{10}$R$_{20}$ optionally form 5- or 6-membered rings via the radicals R$_{21}$, R$_{22}$, R$_{19}$ and/or R$_{20}$ with further substituents on the phenyl or naphthyl ring; or each of which is substituted by phenyl or by phenyl which is substituted by one or more OR$_{21}$, SR$_{22}$ and/or NR$_{19}$R$_{20}$, or is thioxanthyl or

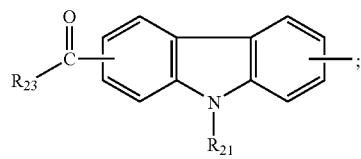

or R$_{16}$ for example is phenyl unsubstituted or substituted 1 to 7 times by halogen, C$_1$-C$_{12}$alkyl, phenoxycarbonyl, C$_2$-C$_{12}$alkoxycarbonyl, OR$_{21}$, SR$_{22}$ and/or NR$_{19}$R$_{20}$, or is thioxanthyl or

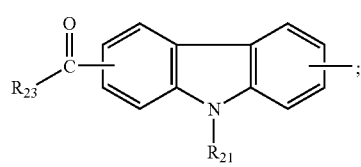

or R$_{16}$ for example is phenyl unsubstituted or substituted by halogen, C$_1$-C$_{12}$alkyl and/or SR$_{22}$, or is thioxanthyl or

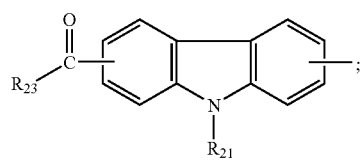

in particular R$_{16}$ is phenyl.

R$_{17}$ for example is hydrogen; unsubstituted C$_1$-C$_{20}$alkyl or C$_1$-C$_{20}$alkyl substituted by one or more halogen, OR$_{21}$ or phenyl; or is C$_3$-C$_8$cycloalkyl; or is phenyl which is unsubstituted or substituted by one or more C$_1$-C$_6$alkyl, phenyl, halogen, OR$_{21}$, SR$_{22}$ and/or NR$_{19}$R$_{20}$; or is C$_1$-C$_{20}$alkanoyl or benzoyl which is unsubstituted or substituted by one or more C$_1$-C$_6$alkyl, phenyl, OR$_{21}$, SR$_{22}$ and/or NR$_{19}$R$_{20}$; or is C$_2$-C$_{12}$alkoxycarbonyl, phenoxycarbonyl, CN, —CONR$_{19}$R$_{20}$, NO$_2$ or C$_1$-C$_4$haloalkyl;

or R$_{17}$ for example is hydrogen, C$_1$-C$_{20}$alkyl, C$_1$-C$_{20}$alkyl substituted by one or more halogen, or is phenyl, C$_1$-C$_{20}$alkanoyl, benzoyl, C$_2$-C$_{12}$alkoxycarbonyl, phenoxycarbonyl, CN, —CONR$_{19}$R$_{20}$, NO$_2$ or C$_1$-C$_4$haloalkyl;

or R$_{17}$ for example is hydrogen, C$_1$-C$_{20}$alkyl, C$_1$-C$_{20}$alkyl substituted by one or more halogen, or is CN;

R$_{17}$ in particular is, C$_1$-C$_{20}$alkyl substituted by one or more halogen or is CN, especially CN.

R$_{19}$ and R$_{20}$ for example independently of one another are hydrogen, C$_1$-C$_{20}$alkyl, C$_2$-C$_4$hydroxyalkyl, C$_2$-C$_{10}$alkoxyalkyl, C$_2$-C$_5$alkenyl, C$_3$-C$_8$cycloalkyl, phenyl-C$_1$-C$_3$alkyl, C$_1$-C$_8$alkanoyl, C$_3$-C$_{12}$alkenoyl, benzoyl; or are phenyl which is unsubstituted or substituted by C$_1$-C$_{12}$alkyl, benzoyl or $C_1$-$C_{12}$alkoxy; or $R_{19}$ and $R_{20}$ together are $C_2$-$C_6$alkylene optionally interrupted by O or $NR_{21}$, or, together with the N-atom to which they are attached, are

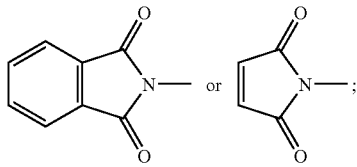

or $R_{19}$ and $R_{20}$ for example independently of one another are hydrogen, $C_1$-$C_{20}$alkyl, $C_2$-$C_4$hydroxyalkyl, phenyl-$C_1$-$C_3$alkyl, $C_1$-$C_8$alkanoyl, phenyl which is unsubstituted or substituted by $C_1$-$C_{12}$alkyl; or $R_{19}$ and $R_{20}$ together are morpholinyl, or, together with the N-atom to which they are attached, are

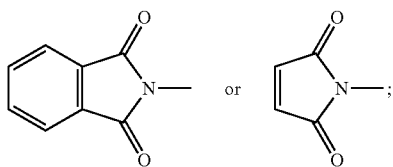

or $R_{19}$ and $R_{20}$ for example independently of one another are hydrogen, $C_1$-$C_{20}$alkyl, $C_2$-$C_4$hydroxyalkyl, phenyl-$C_1$-$C_3$alkyl or phenyl; or $R_{19}$ and $R_{20}$ together are morpholinyl, or, together with the N-atom to which they are attached, are

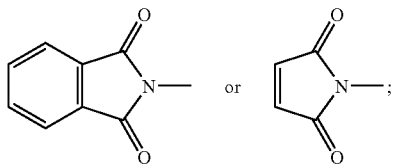

in particular $R_{19}$ and $R_{20}$ together with the N-atom to which they are attached, are

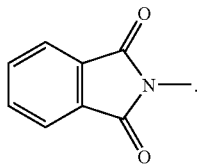

$R_{21}$ and $R_{22}$ for example independently of one another are hydrogen, $C_1$-$C_{20}$alkyl, $C_2$-$C_{12}$alkenyl, $C_3$-$C_8$cycloalkyl, phenyl-$C_1$-$C_3$alkyl, benzoyl, phenyl or naphthyl;
or $R_{21}$ and $R_{22}$ for example independently of one another are hydrogen, $C_1$-$C_{20}$alkyl, benzyl, benzoyl or phenyl; in particular hydrogen or $C_1$-$C_{20}$alkyl.
$R_{23}$ for example is $C_1$-$C_{12}$alkyl, phenyl, 4-morpholinophenyl, $C_1$-$C_{12}$alkylphenyl or phenyl substituted with $C_3$-$C_8$cycloalkyl which optionally is interrupted by O;
or $R_{23}$ for example is $C_1$-$C_{12}$alkyl, phenyl, 4-morpholinophenyl, or $C_1$-$C_{12}$alkylphenyl;
or $R_{23}$ for example is 4-morpholinophenyl or $C_{12}$alkylphenyl.
$R_{26}$ and $R_{27}$ for example independently of each other are $C_1$-$C_{20}$alkyl which is unsubstituted or is substituted by $C_1$-$C_4$alkoxy or phenyl, or $R_{26}$ and $R_{27}$ together are $C_2$-$C_4$alkylene;
or $R_{26}$ and $R_{27}$ for example independently of each other are $C_1$-$C_{20}$alkyl which is unsubstituted or is substituted by $C_1$-$C_4$alkoxy or phenyl;

or $R_{26}$ and $R_{27}$ for example independently of each other are $C_1$-$C_{20}$alkyl.
$R_{30}$ for example is hydrogen, $C_1$-$C_4$alkyl, $C_2$-$C_5$alkanoyl, ($C_1$-$C_4$alkoxy)carbonyl, or is alkyl which is substituted by phenyl, benzoyl or by benzoylphenyl; or is phenyl or is phenyl substituted by one or more $R_{34}$;
or $R_{30}$ for example is hydrogen, $C_1$-$C_4$alkyl, alkyl which is substituted by phenyl, benzoyl or by benzoylphenyl, or phenyl;
or $R_{30}$ for example is hydrogen, $C_1$-$C_4$alkyl, alkyl which is substituted by phenyl or by benzoylphenyl.
$R_{31}$ for example is $C_1$-$C_{12}$alkyl, $C_1$-$C_4$alkoxy, $N(C_1$-$C_4$alkyl$)_2$, phenyl or phenyl substituted by one or more $R_{33}$;
or $R_{31}$ for example is $C_1$-$C_{12}$alkyl, phenyl, phenyl substituted by one or more $R_{33}$.
$R_{32}$ for example is $C_1$-$C_{12}$alkyl, $C_1$-$C_4$alkoxy, phenyl or phenyl substituted by one or more $R_{33}$;
$R_{33}$ for example is $C_1$-$C_4$alkyl, $C_1$-$C_8$alkoxy, $C_1$-$C_6$thioalkyl, $N(C_1$-$C_4$alkyl$)_2$, benzoyl or benzoyl substituted by one or more $R_{34}$;
or $R_{33}$ for example is $C_1$-$C_4$alkyl, $C_1$-$C_8$alkoxy, $C_1$-$C_6$thioalkyl, $N(C_1$-$C_4$alkyl$)_2$ or benzoyl;
or $R_{33}$ for example is $C_1$-$C_8$alkoxy, $C_1$-$C_6$thioalkyl, $N(C_1$-$C_4$alkyl$)_2$ or benzoyl;
$R_{33}$ in particular is $C_1$-$C_8$alkoxy or benzoyl.
$R_{34}$ for example is $C_1$-$C_4$alkyl, $C_1$-$C_4$alkoxy, $C_1$-$C_4$thioalkyl or $N(C_1$-$C_4$alkyl$)_2$;
in particular is $C_1$-$C_4$alkyl, $C_1$-$C_4$alkoxy or $N(C_1$-$C_4$alkyl$)_2$, especially is $C_1$-$C_4$alkyl or $C_1$-$C_4$alkoxy.
$R_{35}$ and $R_{36}$ for example independently of each other are hydrogen, halogen, $C_1$-$C_4$alkyl, $C_1$-$C_4$alkoxy, $C_1$-$C_4$thioalkyl, $C_1$-$C_4$haloalkyl, CN, $NO_2$, $C_2$-$C_6$alkanoyl, benzoyl, phenyl, —S-phenyl, phenoxy, $C_2$-$C_6$alkoxycarbonyl, phenoxycarbonyl, or together are —C($R_{39}$)=C($R_{40}$)—C($R_{41}$)=C($R_{42}$)—;
or $R_{35}$ and $R_{36}$ for example independently of each other are hydrogen, halogen, $C_1$-$C_4$alkyl or together are —C($R_{39}$)=C($R_{40}$)—C($R_{41}$)=C($R_{42}$)—;
or $R_{35}$ and $R_{36}$ for example independently of each other are hydrogen or $C_1$-$C_4$alkyl, in particular hydrogen.
$R_{37}$ for example is phenyl, naphthyl, anthracyl, phenanthryl or $C_4$-$C_{20}$heteroaryl, wherein the phenyl, naphthyl, anthracyl, phenanthryl or $C_4$-$C_{20}$heteroaryl are unsubstituted or are substituted by one or more $C_1$-$C_{12}$alkyl, $C_1$-$C_4$haloalkyl, halogen, phenyl, $OR_{21}$, $SR_{22}$, $NR_{19}R_{20}$ and/or —S-phenyl, or, if y is 0, $R_{37}$ additionally is $C_2$-$C_6$alkoxycarbonyl, phenoxycarbonyl or CN, or $R_{37}$ is hydrogen or $C_1$-$C_{12}$alkyl, provided that $R_{38}$ is not simultaneously hydrogen or $C_1$-$C_{12}$alkyl;
or $R_{37}$ for example is phenyl or naphthyl, wherein the phenyl or naphthyl are unsubstituted or are substituted by one or more $C_1$-$C_{12}$alkyl, $C_1$-$C_4$haloalkyl, halogen, phenyl, $OR_{21}$, $SR_{22}$, $NR_{19}R_{20}$ and/or —S-phenyl, or, if y is 0, $R_{37}$ additionally is $C_2$-$C_6$alkoxycarbonyl, phenoxycarbonyl or CN, or $R_{37}$ is hydrogen or $C_1$-$C_{12}$alkyl, provided that $R_{38}$ is not simultaneously hydrogen or $C_1$-$C_{12}$alkyl;
or $R_{37}$ for example is phenyl which is unsubstituted or are substituted by one or more $C_1$-$C_{12}$alkyl, $C_1$-$C_4$haloalkyl, halogen, phenyl, $OR_{21}$, $SR_{22}$, $NR_{19}R_{20}$ and/or —S-phenyl, or, if y is 0, $R_{37}$ additionally is CN, or $R_{37}$ is hydrogen or $C_1$-$C_{12}$alkyl, provided that $R_{38}$ is not simultaneously hydrogen or $C_1$-$C_{12}$alkyl.
$R_{38}$ for example has one of the meanings of $R_{37}$.
$R_{39}$, $R_{40}$, $R_{41}$ and $R_{42}$ for example independently of each another are hydrogen, $C_1$-$C_4$alkyl, halogen, phenyl, $C_1$-$C_4$alkoxy, $C_1$-$C_4$thioalkyl, —S-phenyl, phenoxy, $C_2$-$C_6$alkoxycarbonyl, phenoxycarbonyl, CN, $NO_2$ or $C_1$-$C_4$haloalkyl;

or $R_{39}$, $R_{40}$, $R_{41}$ and $R_{42}$ for example independently of each another are hydrogen, $C_1$-$C_4$alkyl, halogen, CN, $NO_2$ or $C_1$-$C_4$haloalkyl;

or $R_{39}$, $R_{40}$, $R_{41}$ and $R_{42}$ for example independently of each another are hydrogen or $C_1$-$C_4$alkyl.

Preferred are the compounds of the formula I.

Preferred further are the compounds as shown in the examples 1-59 below.

Further interesting latent catalyst compounds in all coordinations of the metal atom comprise metal-C-bonds (and no metal-O—C bonds).

Preferred as latent catalyst compounds are such compounds, which do not contain a SnButyl$_3$ moiety.

The present compositions, and the process for making them crosslinked, are useful as encapsulants, sealants, adhesives, foams, printing plates and coatings, especially transportation (automotive) and industrial coatings. As transportation coatings, the present compositions are useful as both OEM (original equipment manufacturer) and automotive refinish coatings. They may also be used as primer coatings. They often cure under ambient conditions to tough hard coatings and may be used as base coat, intermediate coating and top coat, either clear or pigmented. This makes them particularly useful for repainting of transportation vehicles in the field.

This invention provides (photo)latent compounds as catalysts for polyaddition or polycondensation reactions, that are catalysed by Lewis-acid type reactants. Especially preferred is the reaction of polyols with isocyanates.

Accordingly, subject of the invention also is the use of a latent catalyst compound as described above as a catalyst for polyaddition or polycondensation reactions, that are catalysed by Lewis-acid type reactants, in particular for the crosslinking of a blocked or unblocked isocyanate or isothiocyanate component with a polyol to form a polyurethane (PU); as well as a polymerizable composition comprising (a) at least one blocked or unblocked isocyanate or isothiocyanate,
(b) at least one polyol; and
(c) at least one latent catalyst compound as described above.

The photopolymerizable compositions generally comprise 0.001 to 15% by weight, e.g. 0.05 to 15% by weight, preferably 0.01 to 5% by weight, most preferably 0.1 to 5% of the latent catalyst compound, based on the total composition.

The invention also encompasses other polyaddition or polycondensation crosslinking processes catalysed by a metal catalyst or mixtures of various metal catalysts. The use of metal catalyst mixtures for room temperature curing silicon rubbers is e.g. described by P. Scholey et al in EP803540. Examples for its application are siloxane modified binders used in silane crosslinking adhesives or sealings, as reported for example in WO2006136211 and WO 2007117552. Other examples of metal catalyzed crosslinking reactions are for example the reaction of siloxane-terminated oligomers with epoxides used in the fabrication of abrasion and weather resistant coatings (M. Priesch in DE19935471), the reaction of epoxy resins with hydroxyl-terminated poly(dimethyloxysilanes) and an aminopropyltriethoxysilane crosslinker (M. Alagar et al. Eur. Polym. J. 2000, 36, 2449), or the reaction of polyethers terminated by hydrolizable silyl groups with epoxy silanes and ketimines (Y. Murayama, JP 06049346) or oximo-ethoxy functional sealants as described by H. M. Haugsby et al in EP 399682. The use of room temperature vulcanizing (RTV) siloxane rubbers for biofouling protection is reported by J. M. Delehanty et al, GB 2444255. Sol-gel reactions catalysed by a metal catalyst are for example described by J. Mendez-Vivar, J. of Sol-Gel Sci. Technol. 2006, 38(2), 159.

Some of the metal catalysts mentioned here have been claimed for use as photolatent catalysts. However they are used in different resin systems which do not undergo polyaddition or polycondensation reactions as those claimed in this application. Furthermore they require mandatory a co-catalyst. As an example, aluminium chelat compounds are claimed as catalyst for the photopolymerization of epoxides by S. Hayase et al. in EP76102. However an α-ketosilyl compound is required as a co-catalyst. Moreover, besides epoxide homopolymerization, no other crosslinking processes such as for example the addition of polyols to isocyanates is mentioned in the aforementioned patent application.

Another subject of the invention is a process for polymerizing compounds, which are capable to crosslink in the presence of a Lewis acid, characterized in that a compound according to anyone of claims 1-6 is added to said compounds and the resulting mixture is irradiated with electromagnetic radiation of a wavelength range of 200-650 nm; in particular a process wherein the component which is capable to crosslink in the presence of a Lewis acid is a mixture of (a) a blocked or unblocked isocyanate or isothiocyanate component and (b) a polyol.

Further subjects of the invention are a process as described above for the preparation of adhesives, coatings, sealings, potting components, printing inks, printing plates, foams, moulding compounds, or photostructured layers, as well as the use of the polymerizable composition as described above for the preparation of adhesives, coatings, sealings, potting components, printing inks, printing plates, foams, moulding compounds, or photostructured layers. Another subject is a coated substrate coated on at least one surface with a composition as described above and a polymerized or crosslinked composition as described above.

Polyols (component (b)) are generally defined as polymeric or oligomeric organic species with at least two hydroxy functionalities.

Examples of suitable polyols include trimethylol propane, trimethylol ethane, glycerol, 1,2,6-hexanetriol, ethylene glycol, 1,2-propylene glycol, 1,3-propylene glycol, 2-methylpropane-1,3-diol, neopentyl glycol, 2-butyl-2-ethyl-1,3-propane diol, cyclohexane-1,4-dimethylol, the monoester of neopentyl glycol and hydroxypivalic acid, hydrogenated Bisphenol A, 1,5-pentane diol, 3-methyl-pentane diol, 1,6-hexane diol, 2,2,4-trimethyl pentane-1,3-diol, dimethylol propionic acid, pentaerythritol, di-trimethylol propane, dipentaerythritol, etc., and mixtures thereof.

The hydroxyl-functional compound comprising at least two hydroxyl-functional groups may for example also be selected from polyester polyols, polyether polyols, e.g. poly-THF-poylol, polyacrylate polyols, polyurethane polyols, cellulose acetobutyrate, hydroxyl-functional epoxy resins, alkyds, and dendrimeric polyols such as described in WO 93/17060. Also, hydroxyl-functional oligomers and monomers, e.g. HO-functional vinyl oligomers, such as castor oil and trimethylol propane, may be included. Interesting polyols are acrylate polyols, e.g. the acrylate polyol Setalux® products available from Nuplex Resins (e.g. Setalux® 1157, Setal® 1606 BA-80), or Desmophen® products from Bayer Material Science (e.g. Desmophen® A VP LS 2350).

In the context of the present invention also polyol components which are suitable in water-borne system such as e.g. waterborne 2K polyurethane, can be employed. Such polyol components are commercially available, for example from Bayer Material Science under the trademark BAYHYDROL®, eg. BAYHYDROL® XP2470.

Suitable isocyanate components (a) are for example isocyanates—with functional groups capable of reacting with hydroxyl- and are structured as follows: $[O{=}C{=}N{-}]_{p>2}R_{70}$, wherein $R_{70}$ is a hydrocarbyl structure.

The organic (poly)isocyanate includes for example polyfunctional, preferably free polyisocyanates, with, for instance, an average NCO functionality of 2.5 to 5, and may be aliphatic, cycloaliphatic, araliphatic or aromatic in nature. Examples are di-, tri- or tetra-isocyanates. The polyisocyanate may include biuret, urethane, uretdione, and isocyanurate derivatives. Suitable polyisocyanates include polyisocyanates having isocyanurate structural units, such as, the isocyanurate of hexamethylene diisocyanate and isocyanurate of isophorone diisocyanate; the adduct of 2 molecules of a diisocyanate, such as, hexamethylene diisocyanate and a diol such as, ethylene glycol; uretidiones of hexamethylene diisocyanate; uretidiones of isophorone diisocyanate or isophorone diisocyanate; the adduct of trimethylol propane and metatetramethylxylene diisocyanates, etc.

Examples of these organic polyisocyanates include 1,6-diisocyanatohexane, isophorone diisocyanate, 2,4-toluene diisocyanate, 2,6-toluene diisocyanate, diphenyl methane-diisocyanate, 4,4'-bis(isocyanato-cyclohexyl)methane, 1,4-diisocyanatobutane, 1,5-diisocyanato-2,2-dimethyl pentane, 2,2,4-trimethyl-1,6-diisocyanatohexane, 1,10-diisocyanatodecane, 4,4-diisocyanato-cyclohexane, 2,4-hexahydrotoluene diisocyanate, 2,6-hexahydrotoluene diisocyanate, norbornane diisocyanate, 1,3-xylylen diisocyanate, 1,4-xylylen diisocyanate, 1-isocyanato-3-(isocyanato methyl)-1-methyl cyclohexane, m-α,α-α',α'-tetramethyl xylylene diisocyanate, 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, omega,omega-dipropyl ether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexylmethane-4,4'-diisocyanate, 3,3'-dimethyldicyclohexylmethane-4,4'-diisocyanate, a toluene diisocyanate, 1,3-bis(1-isocyanato-methylethyl)benzene, 1,4-bis(1-isocyanato-1-methylethyl)benzene, 1,3-bis(isocyanatomethyl)benzene, xylene diisocyanate, 1,5-dimethyl-2,4-bis(isocyanatomethyl)benzene, 1,5-dimethyl-2,4-bis(2-isocyanatoethyl)benzene, 1,3,5-triethyl-2,4-bis(isocyanatomethyl)benzene, 4,4'-diisocyanatodiphenyl, 3,3'-dichloro-4,4'-diisocyanatodiphenyl, 3,3'-diphenyl-4,4'-diisocyanatodiphenyl, 3,3'-dimethoxy-4,4'-diisocyanatodiphenyl, 4,4'-diisocyanatodiphenylmethane, 3,3'-dimethyl-4,4'-diisocyanatodiphenyl methane, a diisocyanatonaphthalene, the above-mentioned derivatives thereof, and mixtures thereof. Further examples are polyisocyanates having isocyanurate structural units, the adduct of 2 molecules of a diisocyanate, such as, hexamethylene diisocyanate or isophorone diisocyanate, and a diol such as ethylene glycol, the adduct of 3 molecules of hexamethylene diisocyanate and 1 molecule of water (e.g. as available under the trademark Desmodur®N from Bayer Corporation), the adduct of 1 molecule of trimethylol propane and 3 molecules of toluene diisocyanate (available under the trademark Desmodur®L from Bayer Corporation), the adduct of 1 molecule of trimethylol propane and 3 molecules of isophorone diisocyanate, compounds such as 1,3,5-triisocyanatobenzene and 2,4,6-triisocyanatotoluene, and the adduct of 1 molecule of pentaerythritol and 4 molecules of toluene diisocyanate.

A specific example of an isocyanate capable of reacting with hydroxyl groups is Desmodur® 3300 from Bayer. The idealized structure of Desmodur® N 3300 is given as follows (also, pentamer, heptamer and higher molecular weight species can be present):

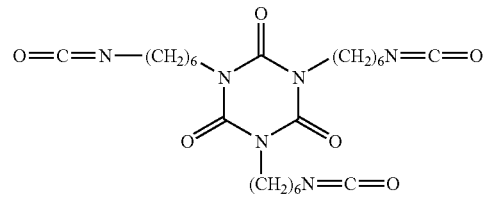

Normally, these products are liquid at ambient temperature and commercially available in a wide range. Particularly preferred isocyanate curing agents are triisocyanates and adducts. Examples thereof are 1,8-diisocyanato-4-(isocyanatomethyl) octane, the adduct of 3 moles of toluene diisocyanate to 1 mole of trimethylol propane, the isocyanurate trimer of 1,6-diisocyanatohexane, the isocyanurate trimer of isophorone diisocyanate, the uretdione dimer of 1,6-diisocyanatohexane, the biuret trimer of 1,6-diisocyanatohexane, the adduct of 3 moles of m-α,α-α',α'-tetramethyl xylene diisocyanate to 1 mole of trimethylol propane, and mixtures thereof.

In particular interesting are cyclic trimers (isocyanurates) and uretdiones of 1,6-hexane diisocyanate and isophorone diisocyanate. Usually these compounds contain small quantities of their higher homologues.

Optionally, in case the present composition is used as a water borne coating composition, it may also comprise an organic hydrophilic polyisocyanate compound substituted with non-ionic groups, such as $C_1$-$C_4$alkoxy polyalkylene oxide groups. For example 30 wt. % of non-ionic groups will be present on the total solid polyisocyanate compound, e.g. 20 wt. %, preferably 15 wt. %.

In any of the compositions herein, the polymeric materials may range from relatively low to relatively high molecular weight. It is preferred that they be of relatively low molecular weight so as to keep the viscosity of the compositions before crosslinking low, so as to avoid or minimize the need for solvent(s).

Other materials (d), which may optionally be present in the compositions include one or more solvents (and are meant to act only as solvents). These preferably do not contain groups such as hydroxyl or primary or secondary amino.

Depending on use, the compositions may contain other materials (d). Examples of ingredients, additives or auxiliaries (d), are pigments, dyes, emulsifiers (surfactants), pigment dispersion aids, levelling agents, anti-cratering agents, antifoaming agents, wetting agents, antisagging agents, heat stabilisers, UV absorbers, antioxidants and fillers.

For example, especially when used as encapsulants and sealants, the compositions may contain fillers, pigments, and/or antioxidants.

When used as coatings, the present compositions optionally contain typically added ingredients known in the art, which are described below. For example there may be other polymers (e) (especially of low molecular weight, "functionalized oligomers") which are either inert or have a functional group other than hydroxyl or isocyanate and also react with other reactive materials in the coating composition.

Representative examples of such functionalized oligomers that can be employed as components or potential crosslinking agents of the coatings are the following:

Hydroxyl oligomers: for example the reaction product of multifunctional alcohols such as pentaerythritol, hexanediol, trimethylol propane, and the like, with cyclic monomeric anhydrides such as hexahydrophthalic anhydride, methylhexahydrophthalic anhydride, and the like produce acid oligomers These acid oligomers are further reacted with monofunctional epoxies such as butylene oxide, propylene oxide, and the like to form hydroxyl oligomers.

Silane oligomers: for example the above hydroxyl oligomers further reacted with isocyanato propyltrimethoxy silane.

Epoxy oligomers: for example the diglycidyl ester of cyclohexane dicarboxylic acid, such as for example Araldite®CY-184 from Huntsman, and cycloaliphatic epoxies, such as for example Celloxide 2021 and the like from Daicel, or for example hydroxyl-terminated epoxidized polybutadiene, e.g. Poly bd 600 and 605 from Sartomer. Also suitable as reactive materials are for example oxetane derivatives, e.g. OXT 101 and 121 from Toagosei or TMPO from Perstorp.

Aldimine oligomers: for example the reaction product of isobutyraldehyde with diamines such as isophorone diamine, and the like.

Ketimine oligomers: for example the reaction product of methyl isobutyl ketone with diamines such as isophorone diamine.

Melamine oligomers: for example the commercially available melamines such as CYMEL® 1168 from Cytec Industries, and the like.

AB-functionalized oligomers: for example acid/hydroxyl functional oligomers made by further reacting the above acid oligomers with 50%, based on equivalents, of monofunctional epoxy such as butylene oxide or blends of the hydroxyl and acid oligomers mentioned above or any other blend depicted above.

CD-functionalized crosslinkers: for example epoxy/hydroxyl functional crosslinkers such as the polyglycidyl ether of Sorbitol DOE-358® from Dixie Chemical or blends of the hydroxyl oligomers and epoxy crosslinkers mentioned above or any other blend as depicted above.

Preferred functionalized oligomers have for example a weight average molecular weight not exceeding about 3,000 with a polydispersity not exceeding about 1.5; more preferred oligomers have molecular weight not exceeding about 2,500 and polydispersity not exceeding about 1.4; most preferred oligomers have molecular weight not exceeding about 2,200, and polydispersity not exceeding about 1.25.

Other additives for example also include polyaspartic esters, which are the reaction product of diamines, such as, isopherone diamine with dialkyl maleates, such as, diethyl maleate.

Optionally, a hydroxyl-functional compound comprising at least two hydroxyl-functional groups may be present in the curable material. The hydroxyl-functional compound comprising at least two hydroxyl-functional groups may for example be selected from polyester polyols, polyether polyols, polyacrylate polyols, polyurethane polyols, cellulose acetobutyrate, hydroxyl-functional epoxy resins, alkyds, and dendrimeric polyols such as described in WO 93/17060. Also, hydroxyl-functional oligomers and monomers, such as castor oil and trimethylol propane, may be included. Interesting polyols are acrylate polyols, e.g. the acrylate polyol Setalux®1157 available from Nuplex Resins.

Coating compositions may be formulated into high solids coating systems dissolved in at least one solvent. The solvent is usually organic. Preferred solvents include aromatic hydrocarbons such as petroleum naphtha or xylenes; ketones such as methyl amyl ketone, methyl isobutyl ketone, methyl ethyl ketone or acetone; esters such as butyl acetate or hexyl acetate; and glycol ether esters such as propylene glycol monomethyl ether acetate and the like.

The compositions of this invention may additionally contain a binder (e) of a noncyclic oligomer, i.e., one that is linear or aromatic. Such noncyclic oligomers can include, for instance, succinic anhydride- or phthalic anhydride-derived moieties in hydroxyl oligomers and the like. The compositions of the invention as coating compositions can for example also contain as a binder an acrylic polymer of a weight average molecular weight greater than 3,000, or a conventional polyester such as SCD®-1040 from Etna Product Inc. for improved appearance, sag resistance, flow and leveling and the like. The acrylic polymer is for example composed of typical monomers such as acrylates, methacrylates, styrene and the like and functional monomers such as hydroxy ethyl acrylate, glycidyl methacrylate, or gamma-methacrylylpropyl trimethoxysilane and the like.

The coating compositions for example can also contain a binder (e) of a dispersed acrylic component which is a polymer particle dispersed in an organic media, which particle is stabilized by what is known as steric stabilization. Hereafter, the dispersed phase or particle, sheathed by a steric barrier, will be referred to as the "macromolecular polymer" or "core". The stabilizer forming the steric barrier, attached to this core, will be referred to as the "macromonomer chains" or "arms".

The dispersed polymer contains about 10 to 90%, preferably 50 to 80%, by weight, based on the weight of the dispersed polymer, of a high molecular weight core having a weight average molecular weight of about 50,000 to 500,000. The preferred average particle size is 0.1 to 0.5 μm. The arms, attached to the core, make up about 10 to 90%, preferably 10 to 59%, by weight of the dispersed polymer, and have a weight average molecular weight of about 1,000 to 30,000, preferably 1,000 to 10,000. The macromolecular core of the dispersed polymer is for example comprised of polymerized acrylic monomer(s) optionally copolymerized with ethylenically unsaturated monomer(s). Suitable monomers include styrene, alkyl acrylate or methacrylate, ethylenically unsaturated monocarboxylic acid, and/or silane-containing monomers. Such monomers as methyl methacrylate contribute to a high Tg (glass transition temperature) dispersed polymer, whereas such "softening" monomers as butyl acrylate or 2-ethylhexylacrylate contribute to a low Tg dispersed polymer. Other optional monomers are hydroxyalkyl acrylates or methacrylates or acrylonitrile. Optionally, the macromolecular core can be crosslinked through the use of diacrylates or dimethacrylates such as allyl methacrylate or post reaction of hydroxyl moieties with polyfunctional isocyanates. The macromonomer arms attached to the core can contain polymerized monomers of alkyl methacrylate, alkyl acrylate, each having 1 to 12 carbon atoms in the alkyl group, as well as glycidyl acrylate or glycidyl methacrylate or ethylenically unsaturated monocarboxylic acid for anchoring and/or crosslinking. Typically useful hydroxy-containing monomers are hydroxy alkyl acrylates or methacrylates as described above.

Optionally, for example a ketone based chelating agent (as further additive (d)) may be added to the coating composition. Examples of these chelating agents include beta-dicarbonyls, alpha-hydroxyl ketones, fused aromatic beta-hydroxy ketones, dialkyl malonates, aceto acetic esters, alkyl lactates, and alkyl pyruvates. In particular beta-dicarbonyls such as acetyl acetone are used. The ketone based chelating agent for example is used in an amount up to 10 wt. % on solids, preferably up to 5 wt. %.

In one embodiment the coating composition additionally comprises a pot life extending agent. A pot life extending agent is particularly beneficial when the photolatent catalyst exhibits a certain degree of catalytic activity also in the latent form. It may also be the case that the photolatent catalyst contains catalytically active impurities which deteriorate the pot life of the composition. Pot life extending agents increase the pot life of the coating composition, i.e. the time between the mixing of all components and the moment when the viscosity becomes too high for the composition to be applied. Pot life extending agents can suitably be present in similar amounts as the photolatent catalysts mentioned above. Preferred pot life extending agents have only a limited or no negative impact on the drying speed of the coating composition, in particular when curing the applied coating at elevated temperature, such as 40 to 60° C. Thus, these pot life extending agents improve the balance of pot life and drying speed. The pot life extending agent can also have a beneficial effect on the appearance of the coating. Examples of suitable pot life extending agents are carboxylic acid group-containing compounds, such as acetic acid, propionic acid or pentanoic acid. Aromatic carboxylic acid group-containing compounds are preferred, in particular benzoic acid. Other suitable pot life extending agents are dicarbonyl compounds, such as 2,4-pentanedione, phenolic compounds, tertiary alcohols such as tertiary butanol and tertiary amyl alcohol, and thiol group-containing compounds. It is also possible to use a combination of the above-mentioned pot life extending agents, such as a combination of an aromatic carboxylic acid group-containing compound and a thiol group-containing compound.

The composition according to the present invention may be a water-borne composition, a solvent borne composition or a solvent-free composition. Since the composition may be composed of liquid oligomers, it is especially suitable for use as a high solids composition or a solvent-free composition. Alternatively, the coating composition of the present invention is an aqueous powder coating dispersion wherein the isocyanate reactive compound has a Tg above 20° C. The coating composition may as well be used in powder coating compositions and hot melt coatings compositions. For example the theoretical volatile organic content (VOC) in the composition is less than about 450 g/l, e.g. less than about 350 g/l, or less than about 250 g/.

The compositions of the invention, in particular as coating compositions, can for example also contain conventional additives such as pigments, stabilizers, rheology control agents, flow agents, toughening agents and fillers. Such additional additives will, of course, depend on the intended use of the (coating) composition.

The compositions according to the invention are typically applied to a substrate by conventional techniques such as spraying, electrostatic spraying, roller coating, curtain coating, dipping or brushing. The present formulations are for example useful as a clear coating for outdoor articles, such as automobile and other vehicle body parts. The substrate optionally is for example prepared with a primer and or a color coat or other surface preparation prior to coating with the present compositions.

A layer of a coating composition is for example cured under ambient conditions in the range of a few minutes to 24 hours, for example 5 minutes to 3 h, preferably in the range of 30 minutes to 8 hours (depending on the type of radiation source), after activating the latent catalyst e.g. by exposure to radiation, to form a coating on the substrate having the desired coating properties. One of skill in the art appreciates that the actual curing time depends upon several parameters, including thickness, latent catalyst concentration, ingredients in the formulation; and it depends also upon any additional mechanical aids, such as, for example fans that assist in continuously flowing air over the coated substrate to accelerate the cure rate. If desired, the cure rate may be further accelerated by heating the coated substrate at temperatures generally in the range of from about 60° C. to 150° C. for a period of for example about 15 to 90 minutes. The heating is for example performed by heating in an oven, by subjecting the samples to hot air, by IR-exposure, by microwaves or any other suitable means known in the art. The foregoing heating step is particularly useful under OEM (Original Equipment Manufacture) conditions. The cure time may also depend on other parameters such as for example the humidity of the atmosphere.

The latent catalysts of this invention can for example be used for coating applications and generally in areas where curing of polyurethane is required. For example, the compositions are suitable as clear or pigmented coatings in industrial and maintenance coating applications.

The compositions according to the invention are also suitable for use in uv-curing adhesives, e.g. in the preparation of pressure-sensitive adhesives, laminating adhesives, hot-melt adhesives, moisture-cure adhesives, silane reactive adhesives or silane reactive sealants and the like, and related applications.

Said adhesives can be hot melt adhesives as well waterborne or solvent borne adhesives, liquid solventless adhesives or 2-part reactive adhesives. In particular suitable are pressure-sensitive adhesives (PSA), for example uv-curable hot melt pressure sensitive adhesives. Said adhesives for example comprise at least one rubber component, at least one resin component as tackyfier and at least one oil component, for example in the weight ratio 30:50:20. Suitable tackyfiers are natural or synthetic resins. The person skilled in the art is aware of suitable corresponding compounds as well as of suitable oil components or rubbers.

The pre-polymerized adhesives containing the isocyanates, for example in blocked form, can for example be processed at high temperature and coated onto the substrate following the hotmelt process, afterwards full cure is achieved by an additional curing step involving the blocked isocyanates, which is realized by photoactivation of the photolatent catalyst.

Hotmelt adhesives are interesting as pressure sensitive adhesives and suitable to replace the use of solvent base compositions, which from an environmental point of view are unwanted. The hotmelt extrusion process in order to achieve the high flow viscosity necessitates high application temperatures. The compositions of the present invention comprising isocyanates are suitable as crosslinkers in the preparation of a hotmelt coating, where the crosslinkers enter into a chemical reaction with the functional comonomers of the (meth)acrylate PSA. After the coating operation, the PSAs are first crosslinked thermally, or implementing the dual crosslinking mechanism, the PSA is subsequently crosslinked with UV light. UV crosslinking irradiation takes place by means of shortwave ultraviolet radiation in a wavelength range from 200 to 400 nm, even expanding in the visible range, e.g. up to 650 nm, depending on the source of the UV radiation equipment, as well as on the photolatent metal catalyst. Such systems and processes are for example described in US 2006/0052472, the disclosure of which hereby is incorporated by reference.

The composition of the present invention is suitable for application on a variety of substrates, e.g. it is especially suitable for providing clear coatings in automotive OEM (Original Equipment Manufacture) or refinish applications typically used in coating car bodies. The coating composition of the present invention can for example be formulated in the form of a clear coating composition, pigmented composition, metallized coating composition, basecoat composition, monocoat composition or a primer. The substrate is for example prepared with a primer and or a color coat or other surface preparation prior to coating with the present compositions.

Suitable substrates for applying the coating composition of the present invention include automobile bodies (or vehicle bodies in general), any and all items manufactured and painted by automobile sub-suppliers, frame rails, commercial trucks and truck bodies, including but not limited to for example beverage bodies, utility bodies, ready mix concrete delivery vehicle bodies, waste hauling vehicle bodies, and fire and emergency vehicle bodies, as well as any potential attachments or components to such truck bodies, buses, farm and construction equipment, truck caps and covers, commercial trailers, consumer trailers, recreational vehicles, including but not limited to, motor homes, campers, conversion vans, vans, pleasure vehicles, pleasure craft snow mobiles, all terrain vehicles, personal watercraft, motorcycles, bicycles, boats, and aircraft.

The substrate further includes industrial and commercial new construction and maintenance thereof; cement and wood floors; walls of commercial and residential structures, such as for example office buildings and homes; amusement park equipment; concrete surfaces, such as parking lots and drive ways; asphalt and concrete road surface, wood substrates, marine surfaces; outdoor structures, such as bridges, towers; coil coating; railroad cars; printed circuit boards; machinery; OEM tools; signage; fiberglass structures; sporting goods; golf balls; and sporting equipment.

However, the composition of the present invention may also generally be applied on substrates like for example plastics, metals, glass, ceramics, etc. e.g. in it's function as an adhesive (but not limited thereto).

As the isocyanate to be crosslinked with the latent catalyst of the present invention also blocked isocyanates may be used. Said compounds are for example "deblocked" prior to the use in the composition, or may be deblocked during the reaction, or may take part in the reaction in the blocked form, e.g. in the course of the "activation" of the latent catalyst by heat or irradiation.

Blocked isocyanates are known in the art and for example described in a review article by D. A. Wicks, Z. W. Wicks in *Progress in Organic Coatings*, 41 (2001), 1-83, as well as by C. Gürtler, C. Homann, M. Mager, M. Schelhaas, T. Stingl, *Farbe+Lack* 2004, 110(12), 34; both documents incorporated herein by reference.

Suitable isocyanate components are for example as given above.

Suitable blocking agents for the isocyanates are the ones known in the art, for example alcohols, phenols, amines, imides, amides, guanidines, amidines, triazoles, pyrazoles, active methylene compounds, ketoximes, oximes, malonesters, alkylacetoacetates, formiates, lactams, imidazoles, triazoles, pyrazoles, CH-acidic cyclic ketones and mercaptans.

Examples are aliphatic, cycloaliphatic, aromatic, or alkyl monoalcohol or phenolic compounds such as, for example, lower aliphatic alcohols including methyl, ethyl, chloroethyl, propyl, butyl, amyl, hexyl, heptyl, octyl, nonyl, decyl and lauryl alcohols, 3,3,5-trimethylhexanol and the like. The aromatic-alkyl alcohols include for example phenylcarbinol and ethylphenylcarbinol. Glycol ethers may be employed such as ethyl glycol monoethyl ether, ethyl glycol monobutyl ether and equivalents thereof. Examples of phenolic compounds which may be employed comprise phenol, substituted phenols such as cresol, xylenol, nitrophenol, chlorophenol, ethyl phenol, t-butyl phenol and 2,5-di-t-butyl-4-hydroxy toluene.

Examples of other blocking agents that may be employed include tertiary hydroxylamines such as diethylethanolamin, lactams such as caprolactam and oximes such as methyl ethyl ketone oxime, acetone oxime and cyclohexanone oxime.

Specific examples are butanonoxime, diisoproylamine, 1,2,4-triazole, dimethyl-1,2,4-triazole, imidazole, ethylates of malonic and acetic acid, acetoneoxime, 3,5-dimethylpyrazole, epsiloncaprolactame, N-methyl-, N-ethyl, N-(iso)propyl, N-n-butyl, N-iso-butyl-, N-tert.-butylbenzylamine or, 1,1-dimethylbenzylamine, N-alkyl-N-1,1-dimethylmethylphenylamine; adducts of benzylamine and compounds with activated double bonds, such as malonic acid esters, N,N-dimethylaminopropylbenzylamine and other compounds comprising tertiary amine groups, where appropriate substituted benzylamines and/or dibenzylamine.

Use of the oximes and phenols in some instances is desirable because some specific polyisocyanates blocked with these oximes or phenols uncap at relatively low temperatures. Examples of suitable CH-acidic ketones are given in WO 04/058849 and incorporated herein by reference. Preferred are cyclopentanon-2-carboxymethylester, cyclopentanon-2-carboxyethylester, cyclopentanon-2-carboxynitrile, cyclohexanon-2-carboxymethylester, cyclohexanon-2-carboxyethylester, cyclopentanon-2-carbonylmethane, especially cyclopentanon-2-carboxymethylester, cyclopentanon-2-carboxyethylester, cyclohexanon-2-carboxymethylester and cyclohexanon-2-carboxyethylester, in particular cyclopentanon-2-carboxyethylester and cyclohexanon-2-carboxyethylester.

It is evident that also mixtures of different blocking agents may be used and a blocked isocyanate which may be employed in the presently claimed composition may have different blocking groups.

The compositions contain the blocked isocyanate in an amount, for example, of from 5 to 95% by weight, preferably from 20 to 80% by weight, based on the total composition. The ratio isocyanate to polyol for example varies from about 2:1 to 1:2, preferably from 1.2:1 to 1:1.2. The molecular weight MW of the blocked isocyanate for example ranges from about 100 to 50000, especially from 200 to 20000.

In addition to the photolatent catalyst (c) the photopolymerizable composition may include various additives (d).

Subject of the invention also is a polymerizable composition as described above, comprising in addition to components (a), (b) and (c) a further additive (d), in particular a photosensitizer compound.

Additives (d) are for example additional coinitiators or sensitizers which shift or broaden the spectral sensitivity. In general these are aromatic carbonyl compounds, for example benzophenone, thioxanthone, anthraquinone and 3-acylcoumarin derivatives or dyes such as eosine, rhodamine and erythrosine dyes which improve the overall quantum yield by means, for example, of energy transfer or electron transfer. Examples of suitable dyes which can be added as coinitiators are triarylmethanes, for example malachite green, indolines, thiazines, for example methylene blue, xanthones, thioxanthones, oxazines, acridines or phenazines, for example safranine, and rhodamines of the formula

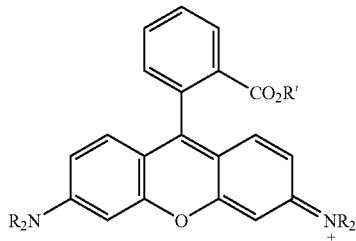

in which R is alkyl or aryl and R' is hydrogen or an alkyl or aryl radical, for example Rhodamine B, Rhodamine 6G or Violamine R, and also Sulforhodamine B or Sulforhodamine G. Likewise suitable are fluorones such as, for example, 5,7-diiodo-3-butoxy-6-fluorone.

Further specific examples of photosensitizers suitable as component (d) are

1 Thioxanthones

Thioxanthone, 2-isopropylthioxanthone, 2-chlorothioxanthone, 1-chloro-4-propoxythioxanthone, 2-dodecylthioxanthone, 2,4-diethylthioxanthone, 2,4-dimethylthioxanthone, 1-methoxycarbonylthioxanthone, 2-ethoxycarbonylthioxanthone, 3-(2-methoxyethoxycarbonyl)-thioxanthone, 4-butoxycarbonylthioxanthone, 3-butoxycarbonyl-7-methylthioxanthone, 1-cyano-3-chlorothioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfurylthioxanthone, 3,4-di-[2-(2-methoxyethoxy)ethoxycarbonyl]-thioxanthone, 1,3-dimethyl-2-hydroxy-9H-thioxanthen-9-one 2-ethylhexylether, 1-ethoxycarbonyl-3-(1-methyl-1-morpholinoethyl)-thioxanthone, 2-methyl-6-dimethoxymethyl-thioxanthone, 2-methyl-6-(1,1-dimethoxybenzyl)-thioxanthone, 2-morpholinomethylthioxanthone, 2-methyl-6-morpholinomethylthioxanthone, N-allylthioxanthone-3,4-dicarboximide, N-octylthioxanthone-3,4-dicarboximide, N-(1,1,3,3-tetramethylbutyl)-thioxanthone-3,4-dicarboximide, 1-phenoxythioxanthone, 6-ethoxycarbonyl-2-methoxythioxanthone, 6-ethoxycarbonyl-2-methylthioxanthone, thioxanthone-2-carboxylic acid polyethyleneglycol ester, 2-hydroxy-3-(3,4-dimethyl-9-oxo-9H-thioxanthon-2-yloxy)N,N,N-trimethyl-1-propanaminium chloride;

2. Benzophenones benzophenone, 4-phenyl benzophenone, 4-methoxy benzophenone, 4,4'-dimethoxy benzophenone, 4,4'-dimethyl benzophenone, 4,4'-dichlorobenzophenone 4,4'-bis(dimethylamino)benzophenone, 4,4'-bis(diethylamino)benzophenone, 4,4'-bis(methylethylamino)benzophenone, 4,4'-bis(p-isopropylphenoxy)benzophenone, 4-methyl benzophenone, 2,4,6-trimethylbenzophenone, 4-(4-methylthiophenyl)-benzophenone, 3,3'-dimethyl-4-methoxy benzophenone, methyl-2-benzoylbenzoate, 4-(2-hydroxyethylthio)-benzophenone, 4-(4-tolylthio)benzophenone, 1-[4-(4-benzoyl-phenylsulfanyl)-phenyl]-2-methyl-2-(toluene-4-sulfonyl)-propan-1-one, 4-benzoyl-N,N,N-trimethylbenzenemethanaminium chloride, 2-hydroxy-3-(4-benzoylphenoxy)-N,N,N-trimethyl-1-propanaminium chloride monohydrate, 4-(13-acryloyl-1,4,7,10,13-pentaoxamidecyl)-benzophenone, 4-benzoyl-N,N-dimethyl-N-[2-(1-oxo-2-propenyl)oxy]ethyl-benzenemethanaminium chloride;

3. Coumarins

Coumarin 1, Coumarin 2, Coumarin 6, Coumarin 7, Coumarin 30, Coumarin 102, Coumarin 106, Coumarin 138, Coumarin 152, Coumarin 153, Coumarin 307, Coumarin 314, Coumarin 314T, Coumarin 334, Coumarin 337, Coumarin 500, 3-benzoyl coumarin, 3-benzoyl-7-methoxycoumarin, 3-benzoyl-5,7-dimethoxycoumarin, 3-benzoyl-5,7-dipropoxycoumarin, 3-benzoyl-6,8-dichlorocoumarin, 3-benzoyl-6-chloro-coumarin, 3,3'-carbonyl-bis[5,7-di(propoxy)coumarin], 3,3'-carbonyl-bis(7-methoxycoumarin), 3,3'-carbonyl-bis(7-diethylamino-coumarin), 3-isobutyroyl-coumarin, 3-benzoyl-5,7-dimethoxy-coumarin, 3-benzoyl-5,7-diethoxy-coumarin, 3-benzoyl-5,7-dibutoxycoumarin, 3-benzoyl-5,7-di(methoxyethoxy)-coumarin, 3-benzoyl-5,7-di(allyloxy)coumarin, 3-benzoyl-7-dimethylaminocoumarin, 3-benzoyl-7-diethylamino-coumarin, 3-isobutyroyl-7-dimethylaminocoumarin, 5,7-dimethoxy-3-(1-naphthoyl)-coumarin, 5,7-diethoxy-3-(1-naphthoyl)-coumarin, 3-benzoylbenzo[f]coumarin, 7-diethylamino-3-thienoylcoumarin, 3-(4-cyanobenzoyl)-5,7-dimethoxycoumarin, 3-(4-cyanobenzoyl)-5,7-dipropoxycoumarin, 7-dimethylamino-3-phenylcoumarin, 7-diethylamino-3-phenylcoumarin, the coumarin derivatives disclosed in JP 09-179299-A and JP 09-325209-A, for example 7-[{4-chloro-6-(diethylamino)-S-triazine-2-yl}amino]-3-phenylcoumarin;

4. 3-(aroylmethylene)-thiazolines 3-methyl-2-benzoylmethylene-β-naphthothiazoline, 3-methyl-2-benzoylmethylene-benzothiazoline, 3-ethyl-2-propionylmethylene-β-naphthothiazoline;

5. Rhodanines 4-dimethylaminobenzalrhodanine, 4-diethylaminobenzalrhodanine, 3-ethyl-5-(3-octyl-2-benzothiazolinylidene)-rhodanine, the rhodanine derivatives, formulae [1], [2], [7], disclosed in JP 08-305019A;

6. Other Compounds acetophenone, 3-methoxyacetophenone, 4-phenylacetophenone, benzil, 4,4'-bis(dimethylamino)benzil, 2-acetylnaphthalene, 2-naphthaldehyde, dansyl acid derivatives, 9,10-anthraquinone, anthracene, pyrene, aminopyrene, perylene, phenanthrene, phenanthrenequinone, 9-fluorenone, dibenzosuberone, curcumin, xanthone, thiomichler's ketone, α-(4-dimethylamino-benzylidene) ketones, e.g. 2,5-bis(4-diethylaminobenzylidene)cyclopentanone, 2-(4-dimethylaminobenzylidene)-indan-1-one, 3-(4-dimethylamino-phenyl)-1-indan-5-yl-propenone, 3-phenylthiophthalimide, N-methyl-3,5-di(ethylthio)-phthalimide, N-methyl-3,5-di(ethylthio) phthalimide, phenothiazine, methylphenothiazine, amines, e.g. N-phenylglycine, ethyl 4-dimethylaminobenzoate, butoxyethyl 4-dimethylaminobenzoate, 4-dimethylaminoacetophenone, triethanolamine, methyldiethanolamine, dimethylaminoethanol, 2-(dimethylamino)ethyl benzoate, poly(propylenegylcol)-4-(dimethylamino) benzoate.

Particular preference is given to unsubstituted and substituted benzophenones or thioxanthones. Examples of suitable benzophenones are benzophenone, 4,4'-bis(dimethylamino) benzophenone, 4,4'-bis(diethylamino)benzophenone, 4,4'-bis(ethylmethylamino)benzophenone, 4,4'-diphenylbenzophenone, 4,4'-diphenoxybenzophenone, 4,4'-bis(p-isopropylphenoxy)benzophenone, 4-methylbenzophenone, 2,4,6-trimethylbenzophenone, 4-phenylbenzophenone, 2-methoxycarbonylbenzophenone, 4-benzoyl-4'-methyl-diphenyl sulfide, 4-methoxy-3,3'-methylbenzophenone, isopropylthioxanthone, chlorothioxanthone, 1-chloro-4-propoxythioxanthone, 2,4-dimethylthioxanthone, 2,4-diethylthioxanthone, 1,3-dimethyl-2-(2-ethylhexyloxy) thioxanthone.

Likewise preferred are mixtures of benzophenones and/or thioxanthones such as, for example, a mixture of benzophenone and 4-methylbenzophenone or of 4-methylbenzophenone and 2,4,6-trimethylbenzophenone.

Further customary additives (d), depending on the intended use, are optical brighteners, fillers, pigments, dyes, wetting agents, levelling assistants, antistatics, flow improvers and adhesion promoters, antioxidants, light stabilizers, e.g. UV-absorbers, for example those of the hydroxybenzotriazole, hydroxyphenyl-benzophenone, oxalamide or hydroxyphenyl-s-triazine type. These compounds can be used individually or in mixtures, with or without sterically hindered amines (HALS).

The compositions may also comprise dyes and/or white and colored pigments. Depending on the kind of application organic as well as an organic pigments are used. Such additives are known to the person skilled in the art, some examples are titan dioxide pigments, e.g. of the rutile type or anatas type, carbon black Russ, zinc oxide, such as zink white, iron oxide, such as iron oxide yellow, iron oxide red, chromium yellow, chromium green, nickel titanium yellow, ultramarine blue, cobalt blue, bismuth vanadate, cadmiumyellow or cadmium red. Examples of organic pigments are mono- or bisazo pigments, as well as metal complexes thereof, phthalocyanine pigments, polycyclic pigments, such as perylene-, anthraquinone-, thioindigo-, chinacridone- or triphenylmethane pigments, as well as diketo-pyrrolo-pyrole-, isoindolinone-, e.g. tetrachlorisoindolinone-, isoindoline-, dioxazin-, benzimidazolone- and chinophthalone pigments.

The pigments are employed alone or in combination in the compositions according to the invention.

Depending on the intended use the pigments are used in amount customary in the art, for example in an amount of 1-60% by weight, or 10-30% by weight, based on the whole formulation.

The compositions may also comprise organic dyes of different classes. Examples are azo dyes, methin dyes, anthraquinone dyes or metal complex dyes. Customary concentrations are for example 0.1-20%, in particular 1-5%, based on the whole formulation.

The choice of additive is made depending on the field of application and on properties required for this field. The additives described above are customary in the art and accordingly are added in amounts which are usual in the respective application.

In some cases it may be advantageous to carry out heating during or after exposure to light. In this way it is possible in many cases to accelerate the crosslinking reaction.

In the above described processes according to the invention, instead of irradiating with electromagnetic radiation the mixture comprising the latent catalyst of the invention can be subjected to a heat treatment. Another possibility, as mentioned above, is to irradiate the reaction mixture with electromagnetic radiation and simultaneously with irradiating or after the irradiation subject it to a heat treatment.

Subject of the invention therefore also is a process as described above, characterized in that instead of irradiating with electromagnetic radiation the mixture is subjected to a heat treatment, or the mixture is irradiated with electromagnetic radiation and simultaneously with or after the irradiation subjected to a heat treatment.

The compositions of the invention can be employed for various purposes, for example as printing inks, as clearcoats, as white paints, for example for wood, plastics or metal, as coatings, inter alia for paper, wood, metal or plastic, as powder coatings, as daylight-curable exterior coatings for marking buildings and roads, for photographic reproduction processes, for holographic recording materials, for image recording processes or for the production of printing plates which can be developed using organic solvents or aqueous-alkaline media, for the production of masks for screen printing, as dental filling materials, as adhesives, including pressure-sensitive adhesives and moisture curing silane modified adhesives, for sealings, as laminating resins, as etch resists or permanent resists and as solder masks for electronic circuits, for potting components, for mouldings, for the production of three-dimensional articles by mass curing (UV curing in transparent moulds) or by the stereolithography process, as is described, for example, in U.S. Pat. No. 4,575,330, for the preparation of composite materials (for example styrenic polyesters, which may contain glass fibres and/or other fibres and other assistants) and other thick-layer compositions, for the coating or encapsulation of electronic components, or as coatings for optical fibres.

In surface coatings, it is common to use mixtures of a prepolymer with polyunsaturated monomers which also contain a monounsaturated monomer. The prepolymer here is primarily responsible for the properties of the coating film, and varying it allows the skilled worker to influence the properties of the cured film. The polyunsaturated monomer functions as a crosslinker, which renders the coating film insoluble. The monounsaturated monomer functions as a reactive diluent, by means of which the viscosity is reduced without the need to use a solvent.

The compositions of the present invention are also suitable for "dual-cure" applications. Dual-cure is meant to be a system which comprises heat-crosslinking components and UV-crosslinking components as well, such as for example a 2K polyurethane (as heat-curable component) and an acrylate component (as the UV-curable component).

Said "dual-cure" compositions are cured by a combination of exposure to radiation and heating, wherein the irradiation and heating are either performed simultaneously or first the irradiation step is performed, followed by heating, or, the composition first is heated, followed by exposure to radiation.

The "dual-cure" compositions generally comprise an initiator compound for the heat-curing component and a photoactive compound according to the present invention for the photocuring step.

The compositions of the invention are suitable, for example, as coating materials for substrates of all kinds, examples being wood, textiles, paper, ceramic, glass, plastics such as polyesters, polyethylene terephthalate, polyamides, polyolefins or cellulose acetate, especially in the form of films, and also metals such as Al, Cu, Ni, Fe, Zn, Mg or Co and GaAs, Si or $SiO_2$, on which it is the intention to apply a protective coating or, by imagewise exposure, an image.

The substrates can be coated by applying a liquid composition, a solution, dispersion, emulsion or suspension to the substrate. The choice of solvent and the concentration depend predominantly on the type of composition and the coating process. The solvent should be inert: in other words, it should not undergo any chemical reaction with the components and should be capable of being removed again after the coating operation, in the drying process. Examples of suitable solvents are ketones, ethers and esters, such as methyl ethyl ketone, isobutyl methyl ketone, cyclopentanone, cyclohexanone, N-methylpyrrolidone, dioxane, tetrahydrofuran, 2-methoxyethanol, 2-ethoxyethanol, 1-methoxy-2-propanol, 1,2-dimethoxyethane, ethyl acetate, n-butyl acetate and ethyl 3-ethoxypropionate.

Using known coating processes, the solution is applied uniformly to a substrate, for example by spin coating, dip coating, knife coating, curtain coating, brushing, spraying—especially electrostatic spraying—and reverse roll coating and by electrophoretic deposition. It is also possible to apply the layer to a temporary, flexible support and then to coat the final substrate, for example a copper-clad circuit board, by means of layer transfer via lamination.

The amount applied (layer thickness) and the nature of the substrate (layer support) are functions of the desired field of application. The range of layer thicknesses generally comprises values from about 0.1 μm to more than 100 μm.

The compositions according to the invention are also suitable for use in electrodeposition paint or primer: an electrodeposition paint generally consists of a resin containing hydroxyl groups as a base resin and a polyisocyanate compound, optionally blocked with a blocking agent, as a curing agent. The electrodeposition step can be conducted, for example, under the condition of load voltage of 50-400 kV by adjusting usually to 15-35° C. the temperature of the electrodeposition bath comprising the resin composition for electrodeposition paint which has been diluted with deionized water etc. to a solid content concentration of about 5-40% by weight and adjusted pH of the system in the range of 4-9.

The film thickness of the electrodeposition coatings film formable by using the resin composition for electrodeposition paint is not particularly restricted. Preferably it generally is in the range of 10-40 μm based upon a cured film thickness. UV crosslinking irradiation takes place by means of shortwave ultraviolet radiation in a wavelength range from 200 to 650 nm, depending on the UV photoactive moiety in the catalyst according to the present invention. It is also possible to simultaneously or afterwards submit the electrodeposited paint to a thermal curing step. Examples of such paints are described in US 2005/0131193 and US 2001/0053828, both hereby are incorporated by reference.

The compositions of the present invention are also used to prepare "powder coating compositions" or "powder coatings", either thermal curing or radiation-curable curing ones. By "powder coating compositions" or "powder coatings" is meant the definition as described in "Ullmann's Encyclopedia of Industrial Chemistry, 5th, Completely Revised Edition, Vol. A 18", pages 438 to 444 (1991) in Section 3.4. That is powder coatings are formed by thermoplastic or bakable, crosslinkable polymers, which are applied in powder form to, predominantly metallic, substrates. The way in which the powder is brought into contact with the workpiece that is to be coated typifies the various application techniques, such as electrostatic powder spraying, electrostatic fluidized-bed sintering, fixed bed sintering, fluidized-bed sintering, rotational sintering or centrifugal sintering.

Preferred organic film-forming binders for the powder coating compositions are stoving systems based, for example, on epoxy resins, polyester-hydroxyalkylamides, polyester-glycolurils, epoxy-polyester resins, polyester-triglycidyl isocyanurates, hydroxy-functional polyester-blocked polyisocyanates, hydroxy-functional polyester-uretdiones, acrylate resins with hardener, or mixtures of such resins.

Radiation-curable powder coatings are for example based on solid resins and monomers containing reactive double bonds, for example maleates, vinyl ethers, acrylates, acrylamides and mixtures thereof. A UV-curable powder coating—in admixture with the composition of the present invention—can for example be formulated by mixing unsaturated polyester resins with solid acrylamides (for example methyl methylacrylamidoglycolate), acrylates, methacrylates or vinyl ethers and a free-radical photoinitiator, such formulations being as described, for example, in the paper "Radiation Curing of Powder Coating", Conference Proceedings, Radtech Europe 1993 by M. Wittig and Th. Gohmann. The powder coatings may also comprise binders as are described, for example, in DE 4228514 and in EP 636669.

The powder coatings may additionally comprise white or coloured pigments. For example, preferably rutiletitanium dioxide can be employed in concentrations of up to 50% by weight in order to give a cured powder coating of good hiding power. The procedure normally comprises electrostatic or tribostatic spraying of the powder onto the substrate, for example metal or wood, melting of the powder by heating, and, after a smooth film has formed, radiation-curing of the coating with ultraviolet and/or visible light.

The composition of the present invention for example further may be employed for the preparation of printing inks. Printing inks in general are known to the person skilled in the art, are used widely in the art and are described in the literature. They are, for example, pigmented printing inks and printing inks coloured with dyes.

The radiation-sensitive compositions of the invention can also be subjected to imagewise exposure. In this case they are used as negative resists. They are suitable for electronics (galvanoresists, etch resists and solder resists), for the production of printing plates, such as offset printing plates, flexographic and relief printing plates or screen printing plates, for the production of marking stamps, and can be used for chemical milling or as microresists in the production of integrated circuits. There is a correspondingly wide range of variation in the possible layer supports and in the processing conditions of the coated substrates.

The term "imagewise" exposure relates both to exposure through a photomask containing a predetermined pattern, for example a slide, exposure by a laser beam which is moved under computer control, for example, over the surface of the coated substrate and so generates an image, and irradiation with computer-controlled electron beams.

Following the imagewise exposure of the material and prior to developing, it may be advantageous to carry out a brief thermal treatment, in which only the exposed parts are thermally cured. The temperatures employed are generally 50-150° C. and preferably 80-130° C.; the duration of the thermal treatment is generally between 0.25 and 10 minutes.

A further field of use for photocuring is that of metal coating, for example the surface-coating of metal panels and tubes, cans or bottle tops, and photocuring on polymer coatings, for example of floor or wall coverings based on PVC.

Examples of the photocuring of paper coatings are the colourless varnishing of labels, record sleeves or book covers.

The use of the compositions of the invention for preparing shaped articles made from composite compositions is likewise of interest. The composite composition is made up of a self-supporting matrix material, for example a glass-fibre fabric, or else, for example, of plant fibres [cf. K.-P. Mieck, T. Reussmann in Kunststoffe 85 (1995), 366-370], which is impregnated with the photocuring formulation. Shaped articles which are produced from compositions according to the invention are of high mechanical stability and resistance. The compositions of the invention can also be used in moulding, impregnating and coating compositions, as are described, for example, in EP 007086. Examples of such compositions are fine coating resins on which stringent requirements are placed with respect to their curing activity and resistance to yellowing, or fibre-reinforced mouldings such as planar or longitudinally or transversely corrugated light diffusing panels.

The sensitivity of the novel compositions to radiation generally extends from about 190 nm through the UV region and into the infrared region (about 20,000 nm, in particular 1200 nm), especially from 190 nm to 650 nm (depending on the photoinitiator moiety, optionally in combination with a sensitizer as described hereinbefore) and therefore spans a very broad range. Suitable radiation is present, for example, in sunlight or light from artificial light sources. Consequently, a large number of very different types of light sources are employed. Both point sources and arrays ("lamp carpets") are suitable. Examples are carbon arc lamps, xenon arc lamps, medium-, super high-, high- and low-pressure mercury lamps, possibly with metal halide dopes (metal-halogen lamps), microwave-stimulated metal vapour lamps, excimer lamps, superactinic fluorescent tubes, fluorescent lamps, argon incandescent lamps, electronic flashlights, photographic flood lamps, electron beams and X-rays. The distance between the lamp and the substrate to be exposed in accordance with the invention may vary depending on the intended application and the type and output of lamp, and may be, for example, from 2 cm to 150 cm. Laser light sources, for example excimer lasers, such as krypton F lasers for exposure at 248 nm are also suitable. Lasers in the visible region can also be employed.

Alternatively, the actinic radiation is provided by light emitting diodes (LED) or organic light emitting diodes (OLED), e.g. UV light emitting diodes (UV-LED). Said LEDs allow instant on and off switching of the radiation source. Further, UV-LEDs generally have a narrow wavelength distribution and offer the possibility to customize the peak wavelength and also provide an efficient conversion of electric energy to UV radiation.

As mentioned above, depending on the light source used it is advantageous in many cases to employ a sensitizer, as described above, whose absorption spectrum coincides as closely as possible to the emission spectrum of the radiation source.

The examples which follow illustrate the invention in more detail, without restricting the scope of the invention to said examples only. Parts and percentages are, as in the remainder of the description and in the claims, by weight, unless stated otherwise. Where alkyl radicals having more than three carbon atoms are referred to in the examples without any mention of specific isomers, the n-isomers are meant in each case.

PREPARATION EXAMPLES

Example 1

Preparation of 2-hydroxy-1-{-4[(tributylstannyl)oxy]phenyl}-2-methyl-propan-1-one

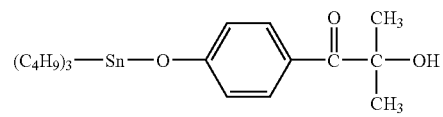

In a 50 ml dry three-neck-flask 3.0 g (16.6 mmol) 2-hydroxy-1-(4-hydroxy-phenyl)-2-methyl-propan-1-one (obtained according to the method described in EP 1072326, examples A.1, A.2, A.3) are dissolved in 15 g dry acetonitrile under argon. 5.9 g (18.3 mmol) of tri-n-butylmethoxy tin are added slowly in the course of 1 h at room temperature. After 1 h the complete conversion is confirmed by a $^1$H-NMR-spectrum. The reaction mixture is extracted twice with 8 ml of heptane and the phase of acetonitrile is concentrated. 5.6 g of a yellow crude product are obtained. This product is dissolved in 20 ml of heptane and 0.3 g of a brown oil precipitate. The clear main solution is concentrated and the precipitate thereof is dried in high vacuum. 5.2 g of the title product are obtained as a clear oil. The structure is confirmed by $^1$H-NMR and $^{13}$C-NMR spectra.

Example 2

Preparation of 4-[(tributylstannyl)oxy]-benzophenone

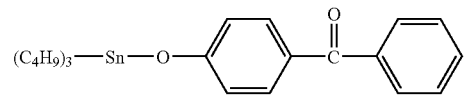

In a 50 ml dry three-neck-flask 1.5 g (7.6 mmol) of 4-hydroxy-benzophenone are suspended in 25 ml of 1,2-dichloroethane and heated to reflux under argon flow. 2.7 g (8.4 mmol) of tri-n-butylmethoxy tin are added to the solution in the course of 0.5 h. The conversion is complete according to the $^1$H-NMR-spectrum. The solution is concentrated and dried in high vacuum. 4.1 g of an orange oil crystallize. The crude product is dissolved at 90° C. in 20 ml of heptane. The solution is cooled and at about 60° C. brown crystals begin to form. After filtration, further cooling and freezing, the formation of crystals continues. The crystals are filtered, dried and analyzed. The structure is confirmed by $^1$H-NMR and $^{13}$C-NMR spectra. 3.0 g of the title product are obtained, melting at 76-82° C.

Example 3

Preparation of oxybis[dibutyl(4-benzoyl-phenyloxy)-tin]

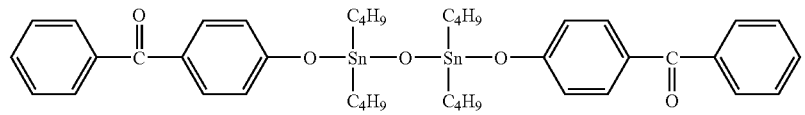

In a bulb-to-bulb distillation apparatus ("Kugelrohr") 3 g (15.1 mmol) of 4-hydroxy-benzophenone and 1.9 g (7.6 mmol) of dibutyltin oxide are slowly heated to 150° C. in high vacuum (0.009 mbar). The mixture begins to melt and at 200° C. the distillation starts and is finished after about 10 minutes. After cooling the colorless distillate is identified as 4-hydroxy-benzophenone by $^1$H-NMR spectrum. The residue (about 3.3 g) is crystallized several times from hot toluene. 2.0 g of the title product are obtained as white crystals melting at 150-159° C. The structure is further confirmed by $^1$H-NMR and $^{13}$C-NMR spectra.

Example 4

Preparation of tri-n-butyl-(4-benzoyl-benzoyloxy)-tin

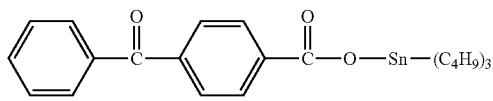

In a 50 ml dry three-neck-flask, 2.0 g (8.8 mmol) 4-benzoylbenzoic acid in 30 ml 1,2-dichlorethane are suspended under argon flow and heated to reflux. 2.8 g (8.8 mmol) tri-n-butylmethoxy tin are added slowly in the course of 0.5 h. The conversion is complete according to the $^1$H-NMR-spectrum. The slightly turbid hot solution is filtered, cooled and concentrated. 3.6 g of the crude product are obtained as yellowish oil. 2.4 g thereof are heated in a bulb-to-bulb distillation apparatus (0.03 mbar) and distilled at 190° C. 1.9 g of the title product is obtained as colorless oil. The structure is confirmed by $^1$H-NMR and $^{13}$C-NMR-spectra.

Example 5

Preparation of bis[(4-benzoyl-benzoyl)oxy]dibutylstannane

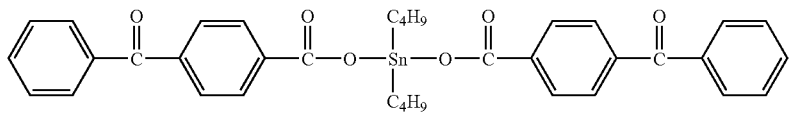

In a 50 ml dry three-neck-flask, 3.0 g (13.3 mmol) of 4-benzoylbenzoic acid and 2.8 g (6.65 mmol) dibutyldiphenyl tin are heated under argon flow. The mixture melts at about 130° C. and is stirred. Heating is continued to 150° C. and the $^1$H-NMR-spectrum confirms the completed conversion. At 120° C. 10 ml dry toluene are added, the turbid solution is filtered at 90° C. At room temperature, the filtrate becomes again turbid and is filtered once more. According to the $^1$H-NMR-spectrum the residues are 4-benzoylbenzoic acid. The filtrate is concentrated and 4.4 g of a slightly yellow oil are obtained that crystallizes. This product is recrystallized from 30 ml hot cyclohexane and a second time from 30 ml hot heptane. 2.5 g white crystals of the title product melting at 109-115° C. are obtained. The structure is further confirmed by $^1$H-NMR and $^{13}$C-NMR-spectra.

Example 6

Preparation of 2,2-dibutyl-4-benzoyl-4-phenyl-1,3,2-dioxastannolane

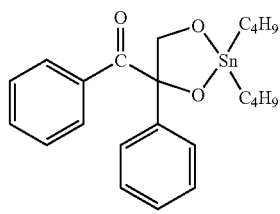

In a 50 ml dry three-neck-flask 2.1 g (8.3 mmol) of dibutyltin oxide, 2.0 g (8.3 mmol) of 2,3-dihydroxy-1,2-diphenyl-propan-1-one [prepared according to H. J. Hageman, *Macromolekulare Chemie, Rapid Communications* (1981), 2(8), 517-521] and 20 ml of toluene are heated to reflux under argon flow. A small amount of water is distilled off the clear solution. According to the $^1$H-NMR-spectrum the conversion is complete after 2 h. The solution is concentrated and the crude product (4.0 g) is recrystallized from 15 ml of cyclohexane. The white crystals (2.3 g) are recrystallized from 10 ml of heptane and 3 ml of cyclohexane. 1.6 g of the title product is obtained as a white powder melting at 140-145° C. The structure is further confirmed by $^1$H-NMR and $^{13}$C-NMR-spectra.

Example 7

Preparation of 4-[(tributylstannyl)oxymethyl]-benzophenone

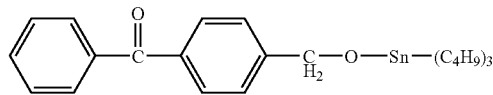

In a 50 ml dry three-neck-flask, 2.5 g (7.8 mmol) of tri-n-butylmethoxy tin are added to 1.5 g (7.1 mmol) of 4-(hydroxymethyl)-benzophenone in 15 ml of 1,2-dichlorethane at room temperature in the course of 0.5 h under argon. $^1$H-NMR-spectrum confirms the complete conversion. The solution is concentrated and the crude product, 3.6 g of a yellow oil, is distilled in a bulb-to-bulb distillation apparatus in vacuum (0.016 mbar) at 160-170° C. The resulting colorless oil (2.8 g) is distilled a second time in a bulb-to-bulb distillation apparatus (0.020 mbar). 2.0 g of the title product are obtained as a colorless oil (boiling area 294-308° C.). The structure is further confirmed by $^1$H-NMR and $^{13}$C-NMR-spectra.

Example 8

Preparation of tri-n-butyl{[4-(benzoyl)phenylacetyl]oxy}stannane

The title product is prepared according to the method as described in example 7 by reacting (4-benzoyl-phenyl)-acetic acid with tri-n-butyltin methoxide.

Distillation in the bulb-to-bulb distillation apparatus is carried out twice in vacuum (0.030 mbar) at 190° C., resulting in 3.2 g of a slightly yellow oil (boiling area according to DSC is 331-350° C.), which crystalises and melts at 50-53° C. The structure is further confirmed by $^1$H-NMR and $^{13}$C-NMR-spectra.

Example 9

Preparation of bis-n-butyl-bis{[4-(benzoyl)phenylacetyl]oxy}-stannane

In a 50 ml dry three-neck-flask, 3.0 g (12.5 mmol) of (4-benzoyl-phenyl)-acetic acid and 2.4 g (6.25 mmol) of dibutyldiphenyltin are heated to reflux under argon flow. The mixture melts at about 125° C. After 1 h the slightly yellow solution is cooled and dissolved in 3 ml of warm heptane and 30 ml of cyclohexane. The precipitated product is filtered off at room temperature and again dissolved in 20 ml of warm heptane, 5 ml of toluene and 30 ml of cyclohexane. The product crystallizes and 2.3 g of white crystals, melting at 90-96° C. (DSC), are filtered off. The structure is further confirmed by $^1$H-NMR and $^{13}$C-NMR-spectra. From the filtrate 0.7 g more product is obtained.

Example 10

Preparation of [(4-benzoyl)phenylmethyl]-tributyl-stannane 2.4 g (7.3 mmol) of tributyltin chloride in 2 ml of tetrahydrofurane (THF) are placed in a 50 ml dry three-neck-flask under nitrogen. 0.48 g (7.3 mmol) of zinc powder and a drop of a saturated ammonium chloride solution are added. 2.0 g (7.3 mmol) of (4-bromomethyl)benzophenone in 10 ml of THF are added in the course of 0.5 h. After another 0.5 h the reaction is complete and the reaction mixture is diluted with 20 ml of toluene and washed three times with a saturated solution of sodium chloride. The organic phase is dried over MgSO$_4$, filtered and concentrated. 3.3 g of a yellow oil are obtained as the crude product. Fractional distillation of 2.1 g of the crude product in a bulb-to-bulb distillation apparatus (0.010 mbar; 140-160° C.) affords 1.0 g of the colorless title product. The structure is confirmed by $^1$H-NMR and $^{13}$C-NMR-spectra. The remaining crude product also is treated in a bulb-to-bulb distillation apparatus (0.035 mbar/140-180° C.) resulting in 0.55 g of the title product. Again the $^1$H-NMR and $^{13}$C-NMR-spectra confirm the structure. The boiling area of the product is determined by DSC and is 352-410° C. $^{119}$Sn-NMR-spectrum (186 MHz) in CDCl$_3$: δ=−5.7 ppm, with tetrabutyl-stannane as the reference (δ=−11.7 ppm).

Example 11

Preparation of bis[(4-benzoyl)phenylmethyl]-dibutyl-stannane 2.2 g (7.3 mmol) of dibutyltin dichloride in 2 ml of THF, 0.98 g (15.0 mmol) zinc-powder, a drop of a saturated ammonium chloride solution and 4.0 g (14.6 mmol) of (4-bromomethyl)benzophenone are reacted according to the method as described in example 10. 3.9 g of the crude product are obtained as a yellow oil. Fractional distillation in the bulb-to-bulb distillation apparatus (0.017 mbar/100-140° C.) removes the side products (4-methylbenzophenone and (4-bromomethyl)benzophenone). According to the $^1$H-NMR-spectrum the residue, 3.4 g of a yellow oil, is bis[(4-benzoyl)phenylmethyl]-dibutyl-stannane. The residue is diluted in toluene and filtered over bleaching earth, affording 2.4 g of a slightly yellow oil. The structure of the product is confirmed by $^1$H-NMR- and $^{13}$C-NMR-spectra. $^{119}$Sn-NMR-spectrum (186 MHz) in CDCl$_3$ δ=−8.8 ppm, with tetrabutylstannane as the reference (δ=−11.7 ppm).

Example 12

Preparation of phenylglyoxyloxy-tributyl-stannane

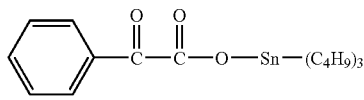

In a 50 ml dry three-neck-flask, 6.64 g (20.7 mmol) of tri-n-butylmethoxy tin are added to 3.0 g (20.0 mmol) of phenylglyoxylic acid in 20 ml of 1,2-dichlorethane at room temperature under argon in the course of 0.5 h. The reaction mixture is poured into 100 ml of pentane, the resulting precipitate is filtered off. The filtrate is concentrated obtaining 8.7 g of a yellow oil. 5.4 g of said oil are distilled in a bulb-to-bulb distillation apparatus (0.02 mbar/120-140° C.). Obtained are 2.6 g of the title product as a colorless oil, which crystallizes. The crystals melt at 47-53° C. (DSC). The structure of the product is confirmed by $^1$H-NMR- and $^{13}$C-NMR-spectra.

Example 13

Preparation of bis(phenylglyoxyloxy)dibutyl-stannane

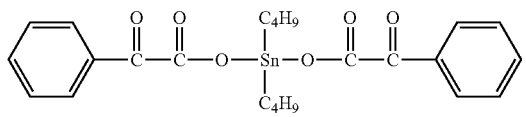

In a 50 ml dry three-neck-flask, 4.9 g (33.0 mmol) of phenylglyoxylic acid are dissolved under nitrogen in solution, of 1.45 g (36.3 mmol) of NaOH in 6 ml water at 0° C. 5.0 g (16.5 mmol) dibutyltin dichloride in 15 ml THF are added dropwise in the course of 0.5 h at 0° C. The emulsion is slowly warmed to room temperature, then heated to 40° C. and stirred for 30 min. The formed oil is separated off and the aqueous phase is extracted several times with methylene chloride. The oil and the methylene chloride phases are combined, dried over MgSO$_4$, filtered and concentrated. The resulting oil is dissolved with heating in 20 ml of pentane and 10 ml of toluene and cooled. The crystals are filtered off at 0° C., dissolved in 20 ml of acetonitrile and extracted with 10 ml of heptane. The acetonitrile solution is concentrated affording 2.6 g of the title product as a yellow oil, which is recrystallized from 10 ml of pentane and 4 ml of ortho-xylene. The white crystals melt at 82-84° C. The structure of the product is further confirmed by $^1$H-NMR- and $^{13}$C-NMR-spectra.

Example 14

Preparation of [(tributylstannyl)oxyimino]benzeneacetonitrile

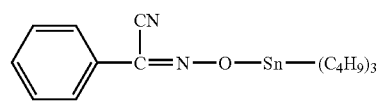

In a 50 ml dry three-neck-flask, 3.0 g (9.34 mmol) of tri-n-butylmethoxy tin are added with a syringe to 1.36 g (9.34 mmol) of (hydroxyimino)benzeneacetonitrile under argon. Slowly the mixture dissolves. The reaction apparatus is evacuated and slowly heated to 40° C. and kept at this temperature for 1 hour. 2.7 g of the resulting 3.4 g of yellow oil are fractionally distilled in a bulb-to-bulb distillation apparatus (0.02 mbar/130-220° C.). 2.0 g of the title product are obtained as a colorless oil. The structure of the product is confirmed by $^1$H-NMR- and $^{13}$C-NMR-spectra.

Example 15

Preparation of oxybis[dibutyl(phenyl-cyano-methylideneaminooxy)-tin]

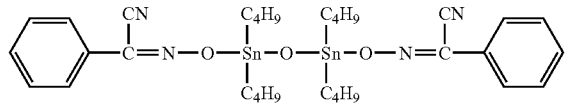

In a 50 ml dry three-neck-flask, 5.1 g (17.1 mmol) of di-n-butyldimethoxy tin are added to 5.0 g (34.2 mmol) of (hydroxyimino)benzene acetonitrile in 5 ml of toluene under argon. The resulting solution is heated at reflux (ca. 110° C.). After 2 h the solution is diluted with 10 ml of toluene and brought to crystallisation at 0° C. From the concentrated filtrate 6.9 g of brownish crystals are obtained which are re-crystallized from 30 ml of ortho-xylene. More of the product is obtained from the remaining filtrate. Oxybis[dibutyl(phenyl-cyano-methylideneaminooxy)-tin] crystallizes as fine yellow crystals melting at 62-69° C. (DSC). 2.5 g of said crystals are obtained. The structure is confirmed by $^1$H-NMR- and $^{13}$C-NMR-Spectra.

Example 16

Preparation of Bismuth(III)phenyloxo acetate

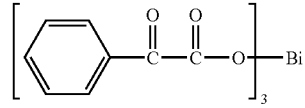

In a dry three-neck-flask, 1.5 g (3.4 mmol) triphenylbismuth dissolved in 5 ml toluene is added to 1.53 g (10.22 mmol) phenylglyoxyl acid under argon and the resulting solution is heated to 70° C. for 0.5 hours. 10 ml of THF is added to the mixture and the solution is heated to 80° C. for 1 hour. The mixture is cooled to room temperature and filtered yielding 1.2 g of the product that is recrystallized from toluene The structure is confirmed by $^1$H-NMR and $^{13}$C-NMR spectra.

$^1$H NMR (DMSO) δ [ppm]: 8.05 (m, 3×2H arom.); 7.68 (m, 3×1H arom.); 7.49 (m, 3×2H arom.). $^{13}$C NMR (DMSO) δ [ppm]: 194 (C(O)); 170 (C(O)); 133 (CH arom.); 130 (CH arom.); 129 (CH arom.).

Example 17

Preparation of

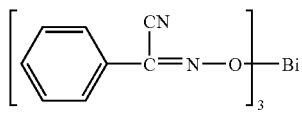

In a dry three-neck-flask, 1.5 g (3.4 mmol) triphenylbismuth dissolved in 5 ml dioxane is added to 1.49 g (10.22 mmol) (hydroxyimino)benzeneacetonitrile under argon and the resulting solution is heated to 100° C. for 24 hours. The mixture is cooled to room temperature and concentrated yielding 1.5 g of the product. The structure is confirmed by $^1$H-NMR.

$^1$H NMR (DMSO) δ [ppm]: 7.79 (m, 3×2H arom.); 7.47 (m, 3×3H arom.).

Example 18

Preparation of Bismuth(III)benzoyl benzoate

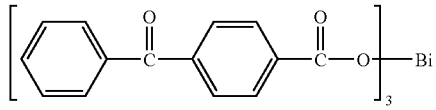

In a dry three-neck-flask, 1.5 g (3.4 mmol) triphenylbismuth dissolved in 5 ml dioxane is added to a solution of 2.31 g (10.2 mmol) benzoylbenzoic acid in 3 ml dioxane under argon and the resulting solution is heated to 110° C. for 1.5 hours. The mixture is cooled to room temperature and concentrated yielding 1.5 g of the product. The structure is confirmed by $^1$H-NMR and $^{13}$C-NMR spectra.

$^1$H NMR (CDCl$_3$) δ [ppm]: 8.02 (m, 3×2H arom.); 7.56 (m, 3×4H arom.); 7.46 (m, 3×1H arom.); 7.30 (m, 3×2H arom.).

Example 19

Preparation of

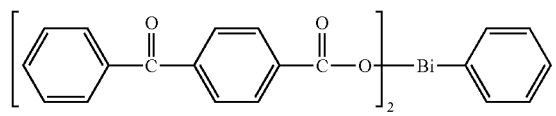

In a dry three-neck-flask, 1.5 g (3.4 mmol) triphenylbismuth dissolved in 10 ml toluene is added to a solution of 1.54 g (6.8 mmol) benzoylbenzoic acid in 10 ml toluene under argon and the resulting solution is heated to 100° C. for 3.5 hours. The mixture is cooled to room temperature and filtered yielding 2.1 g of the product. The structure is confirmed by $^1$H-NMR spectrum.

$^1$H NMR (DMSO) δ [ppm]: 8.83 (m, 2H arom., Ph); 8.07 (m, 2×2H arom., Ph-COO); 7.87 (m, 2H arom., Ph); 7.81-7.63 (m, 2×5H arom. Ph-C(O)-Ph-COO); 7.57 (m, 2×2H arom. Ph-C(O)); 7.35 (m, 1H arom. Ph). $^{13}$C NMR (DMSO) δ [ppm]: 194 (C(O)); 170 (C(O)); 133 (CH arom.); 130 (CH arom.); 129 (CH arom.).

Example 20

Preparation of

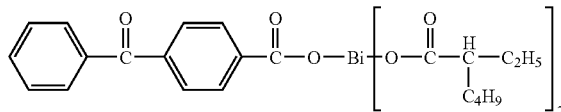

In a dry three-neck-flask, 0.92 g (6.38 mmol) 2-ethylhexanoic acid and 0.77 g (3.40 mmol) benzoylbenzoic acid are dissolved in 2 ml dioxane under argon. A solution of 1.5 g (3.40 mmol) triphenylbismuth dissolved in 5 ml of dioxane is added. The mixture is heated to 110° C. for 4 hours. The reaction mixture is cooled to room temperature, concentrated and the residue is dried under high vacuum at 70° C. yielding 2.1 g of a clear resin. The structure is confirmed by $^1$H-NMR spectrum.

Example 21

Preparation of tris(1,3-diphenyl-1,3-propandionato-κO,κO')-aluminium

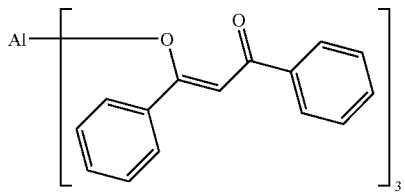

In a 100 ml three-neck-flask 3.36 g (0.015 mol) of dibenzoylmethane are dissolved in 50 g of toluene under a slight flow of argon. 0.7 g (0.005 mol) of aluminiumchloride are subsequently added to this solution. After the addition, the yellow suspension is stirred at room temperature for 20 hours. The suspension is filtered, providing 2.3 g (66%) tris(1,3-diphenyl-1,3-propandionato-κO,κO')-aluminium as a yellow solid with a melting point of 103-147° C.

Example 22

Preparation of tris(1,3-di[4-methyoxyphenyl]-1,3-propandionato-κO,κO')-aluminium from aluminium trichloride

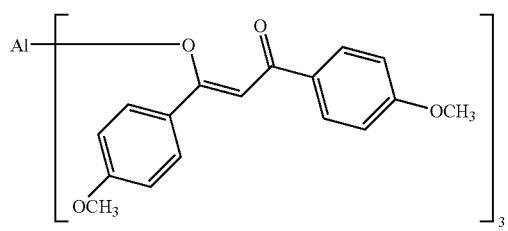

The compound of this example is prepared according to the procedure described for the compound of example 21, but using 1,3 bis(4-methoxyphenyl)-1,3-propanedione as starting material. Tris(1,3-di[4-methyoxyphenyl]-1,3-propandionato-κO,κO')-aluminium is obtained as a yellow solid with a melting point of 266-274° C.

Example 23

Preparation of tris(1-phenyl-1,3-butandionato-κO, κO')-aluminium from aluminium trichloride

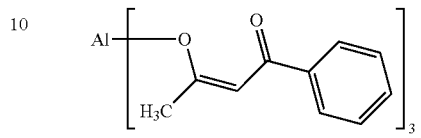

(isomeric mixture)

In a 50 ml three-neck-flask with a slight flow of argon, 1.46 g (0.009 mol) of 1-phenyl-1,3-butanedione are dissolved in 20 g of toluene. To this solution, 0.4 g (0.003 mol) of aluminiumchloride are added. After the addition, the yellow suspension is stirred at room temperature for 20 hours. The suspension is filtered and the filtrate concentrated in vacuum. The slightly yellowish crude solid turns white upon stirring with heptane. The suspension is filtered, providing 0.8 g (52%) tris(1-phenyl-1,3-butandionato-κO,κO')-aluminium as a white solid with a melting point of 224-229° C.

Examples 24-26

The compounds of the following examples 24-26 are prepared according to the method described for example 23, except that the starting materials reported in Table 1 are used instead of 1-phenyl-1,3-butanedione.

TABLE 1

Al–[R$_1$]$_3$ (isomeric mixtures)

| Ex. | starting material | R$_1$ | yield | aspect | mp [° C.] |
|---|---|---|---|---|---|
| 24 | ethylbenzoyl acetate | (structure) | 27% | white solid | 161-170 |
| 25 | ethyl-4-methoxy-benzoyl acetate | (structure) | 26% | yellow solid | 121-129 |
| 26 | 4,4-dimethyl-1-phenylpentane-1,3-dione | (structure) | 34% | white solid | 209-222 |

Example 27

Preparation of Preparation of tris(1-phenyl-1,3-butandionato-κO,κO')-aluminium from aluminium tris(isopropoxide)

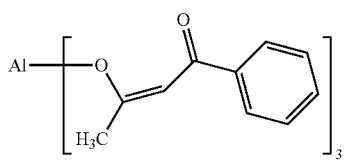

In a 100 ml dry three-neck-flask, 2.47 g (0.0152 mol) of 1-phenyl-1,3-butanedione are dissolved in 80 g of toluene. To this solution, 1.02 g (0.005 mol) of aluminiumisopropoxide are added. After the addition, the yellow suspension is heated to reflux for 6 hours. The reaction mixture is subsequently cooled to room temperature and the suspension filtered. The filtrate is concentrated in vacuum providing a slightly yellowish crude solid which turns white upon stirring in heptane. The suspension is filtered providing 1.1 g (43%) tris(1-phenyl-1,3-butandionato-κO,κO')-aluminium as a white solid with a melting point of 223-228° C.

Example 28

Preparation of tris(1,3-di[4-methyoxyphenyl]-1,3-propandionato-κO,κO')-aluminium from aluminium tris(isopropoxide)

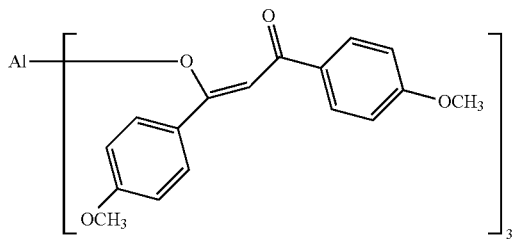

4.32 g (0.0152 mol) of 1,3 bis(4-methoxyphenyl)-1,3-propanedione and 150 g of toluene are placed In a 250 ml dry three-neck-flask. To this suspension, 1.02 g (0.005 mol) of aluminiumisopropoxide are added. After the addition, the yellow suspension is heated to reflux for 24 hours. The reaction mixture is subsequently cooled to room temperature and the suspension is filtered, providing 2.0 g (46%) tris(1,3-di[4-methyoxyphenyl]-1,3-propandionato-κO,κO')-aluminium as a white solid with a melting point of 273-281° C.

Example 29

Preparation of

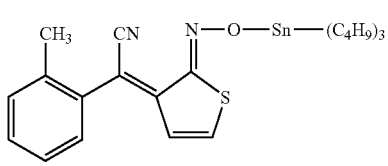

In a 25 ml dry three-neck-flask, 2.6 g (8.25 mmol) of tri-n-butylmethoxy tin are added with a syringe to 2.0 g (8.25 mmol) of [5-[(E)-Hydroxyimino]-5H-thiophen-(2E)-ylidene]-o-tolylacetonitrile under argon. The reaction apparatus is evacuated, slowly heated to 30° C. and kept at this temperature for 1 hour. The reaction mixture is dissolved in pentane and extracted with acetonitrile. The pentane is concentrated. 2.0 g of the title product are obtained as an orange oil. The structure of the product is confirmed by $^1$H-NMR- and $^{13}$C-NMR-spectra.

$^1$H-NMR (CDCl$_3$) δ [ppm]: 7.30-7.20 (m, 4H arom); 6.86 (d, 1H, S—CH═CH); 6.02 (d, 1H, S—CH═CH); 2.35 (s, 3H, CH$_3$-arom); 1.70 (m, 3×2H, CH$_2$); 1.37 (m, $\overline{12}$H, CH$_2$—CH$_2$); 0.90 (t, 9H, CH$_3$)

Example 30

Preparation of

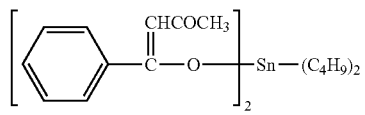

In a 25 ml dry three-neck-flask, 1.82 g (6.16 mmol) of di-n-butyldimethoxy tin are added to 2 g (12.33 mmol) of 1-benzoylacetone in 20 ml of 1,2-dichlorethane at room temperature in the course of 0.5 h under argon. Concentration of the solution gives the crude product (3.6 g) as yellow oil. This product is dissolved in pentane and extracted with acetonitrile. The pentane solution is concentrated yielding the product (2.0 g) as clear yellow oil. The structure is confirmed by $^1$H-NMR and $^{13}$C-NMR spectra. Bp>221° C. (decomposition; DSC)

$^1$H NMR (CDCl$_3$) δ [ppm]: 7.93-7.90 (d, 2H arom.); 7.49-7.41 (m, 2×3H arom.); 6.01 (s, 2H); 2.17 (s, 2×3H CH$_3$).

Example 31

Preparation of

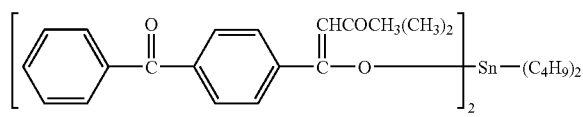

31.1 Preparation of the ligand
1-(4-benzoyl-phenyl)-4-methyl-pentane-1,3-dione

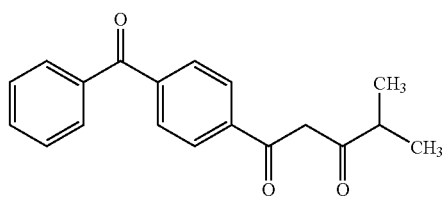

10 g (39 mmol) of benzoylbenzoic ethylester are added to a suspension of 3.94 g (35 mmol) of potassium-tert-butoxid in 60 ml of THF at 0° C. under argon. 2.82 g (33 mmol) of 3-methyl-2-butanone are added in 1 h while the temperature rises to 25° C. After 2 h at 40° C. the reaction mixture is poured into 500 ml of ice water containing 10 ml conc. HCl. Extraction with toluene and evaporation gives the crude product (8.5 g) which is purified by crystallisation in heptane yielding 3.7 g of a white solid. The structure is confirmed by $^1$H-NMR and $^{13}$C-NMR spectra. mp: 76.5-78° C.

$^1$H NMR (CDCl$_3$) δ [ppm]: 7.99-7.97 (d, 2H arom.); 7.87-7.84 (d, 2H arom.); 7.82-7.79 (d, 2H arom.); 7.62-7.59 (t, 1H arom.); 7.52-7.48 (t, 2H arom.); 6.25 (s, 1H); 2.69-2.64 (m, 1H); 1.25-1.23 (d, 2×3H CH$_3$)

31.2 Preparation of the Title Compound

In a 50 ml dry three-neck-flask, 0.75 g (2.55 mmol) of di-n-butyldimethoxy tin are added under argon to 1.5 g (5.09 mmol) of the compound obtained in example 31.1 in 20 ml of 1,2-dichlorethane at room temperature over 0.5 h. The solution is concentrated yielding the crude product (1.8 g) as an orange oil. The structure is confirmed by $^1$H-NMR and $^{13}$C-NMR spectra. mp>287° C. decomp. (DSC)

$^1$H NMR (CDCl$_3$) δ [ppm]: 8.03-8.0 (d, 2×2H arom.); 7.9-7.8 (m, 2×4H arom.); 7.65-7.60 (t, 2H arom.); 7.53-7.48 (t, 2×2H arom.); 6.0 (s, 2H); 2.61-2.57 (m, 2H); 1.25 (d, 2×2×3H CH$_3$)

Example 32

Preparation of tetra-(4-benzoyl-benzoyloxy)-tin

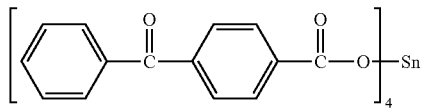

In a 25 ml dry three-neck-flask, 1.27 g (5.6 mmol) of 4-benzoyl-benzoic acid are added to 0.5 g (1.41 mmol) tetraisopropoxid tin in 5 ml of dioxane at room temperature under argon. The reaction is heated at 50° C. for 2 h. The solution is concentrated yielding 1.4 g of an orange solid. Crystallisation in toluene gives 0.6 g of a gray solid whose structure is confirmed by $^1$H-NMR and $^{13}$C-NMR spectra. mp 191-197° C. (DSC)

$^1$H NMR (CDCl$_3$) δ [ppm]: 8.27-8.25 (d, 4×2H arom.); 7.9-7.8 (m, 4×4H arom.); 7.67-7.64 (t, 4H arom.); 7.55-7.48 (t, 4×2H arom.);

Example 33

Preparation of tris-(4-benzoyl-benzyloxy)-bismuth

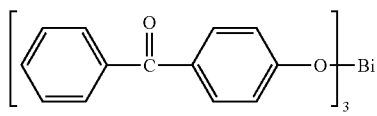

In a 50 ml dry three-neck-flask, 1.81 g (10.1 mmol) of sodiummethylate are added to 2.0 g (10.1 mmol) 4-hydroxy-benzophenone in 15 ml of THF at 0° C. under argon. The reaction is stirred for 15 min. A suspension of 1.06 g (3.36 mmol) of bismuthtrichlorid in THF is added over 30 min and the mixture is stirred for 1 h at 0° C. The reaction mixture is filtered and concentrated yielding 1.8 g of a yellow solid whose structure is confirmed by $^1$H-NMR and $^{13}$C-NMR spectra. mp 390-522° C. (DSC, decomp).

$^1$H NMR (DMSO) δ [ppm]: 7.7-7.58 (m, 3×5H arom.); 7.5-7.48 (d, 3×2H arom.); 7.76-7.73 (d, 3×2H arom.)

Example 34

Preparation of

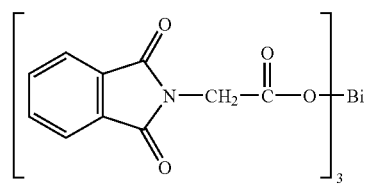

In a 25 ml dry three-neck-flask, 2.0 g (4.5 mmol) triphenylbismuth dissolved in 15 ml dioxane is added to a solution of 2.8 g (13.6 mmol) of N-phthaloylglycine in 3 ml dioxane under argon and the resulting solution is heated to 80° C. for 3.5 hours. The mixture is cooled to room temperature, filtered and concentrated yielding 3.2 g of the product. The structure is confirmed by $^1$H-NMR and $^{13}$C-NMR spectra. mp: 324: 329° C.

$^1$H NMR (DMSO) δ [ppm]: 7.88-7.86 (m, 3×4H arom.); 4.18 (s, 3×2H CH$_2$).

Example 35

Preparation of

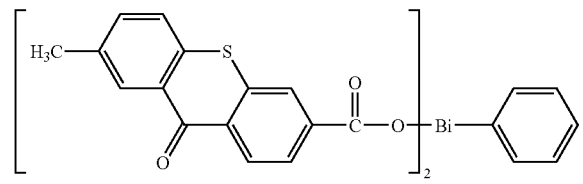

In a 50 ml dry three-neck-flask, 3.0 g (6.8 mmol) of triphenylbismuth dissolved in 15 ml toluene is added to a solution of 3.5 g (12.9 mmol) 7-methyl-9-oxo-9H-thioxanthene-3-carboxylic acid in 15 ml toluene at 60 C under argon and the resulting solution is heated to 100° C. for 2 hours. The mixture is cooled to room temperature, the product precipitated and filtered yielding a yellow solid (4.8 g). The structure is confirmed by $^1$H-NMR and $^{13}$C-NMR spectra. mp: 263-294° C.

$^1$H NMR (DMSO) δ [ppm]: 8.86-8.84 (d, 2H phenyl); 7.94-7.88 (t, 2H phenyl); 7.41-7.3 (m, (1H phenyl); 8.53-8.46 (d, 2H arom); 8.36 (s, 2H arom) 8.22 (s, 2H arom); 8.02-7.99 (d, 2H arom); 7.74-7.71 (d, 2H arom); 7.63-7.59 (d, 2H arom) 2.45 (s, 2×3H CH$_3$)

Example 36

Preparation of

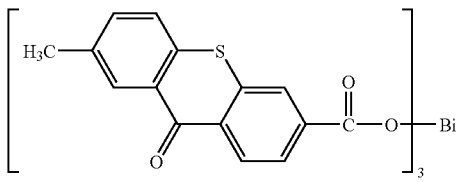

In a 25 ml dry three-neck-flask, 0.25 g (1.57 mmol) 2-ethylcaproic acid is added to a suspension of 1.3 g (1.57 mmol) of the compound of example 37 dissolved in 10 ml dioxane at 100° C. under argon and stirred for 1.5 hours. The mixture is cooled to room temperature and the title compound (1.0 g) is isolated by filtration as a yellow solid whose structure is confirmed by $^1$H-NMR and $^{13}$C-NMR. mp: >350° C. (decomposition, DSC).

Example 37

Preparation of

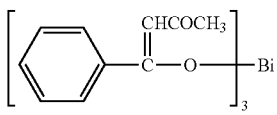

In a 50 ml dry three-neck-flask, 1.81 g (10.1 mmol) of a 30% sodium methanolate solution is added to a solution of 1.63 g (10.1 mmol) of benzoylacetone in 15 ml THF under argon at 0 C. After stirring for 0.5 h at 0 C, a suspension of 1.06 g (3.36 mmol) bismuth trichloride in 20 ml THF is added and stirring is continued for 2 h at 0 C. The mixture is filtered and concentrated yielding 2.0 g of the product. The structure is confirmed by $^1$H-NMR and $^{13}$C-NMR spectra. mp: 175:194° C.

Example 38

Preparation of

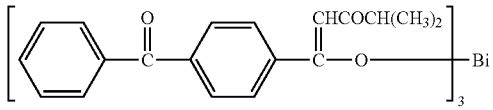

In a 25 ml dry three-neck-flask, 0.61 g (3.39 mmol) of a 30% sodium methanolate solution is added to a solution of 1.0 g (3.39 mmol) of the compound of example 31.1 in 5 ml THF under argon at 0 C. After stirring for 0.5 h at 0 C, a suspension of 0.36 g (1.13 mmol) bismuth trichloride in 10 ml THF is added. The mixture is stirred for 1 h at 0 C, slowly warmed up to 25 C and filtered. The clear filtrate is concentrated yielding 1.1 g of a yellow oil. The structure is confirmed by $^1$H-NMR and $^{13}$C-NMR spectra. mp: 254-345° C. (decomposition DSC)

$^1$H NMR (CDCl$_3$) δ [ppm]: 7.99-7.96 (d, 4×2H arom.); 7.86-7.79 (m, 4×4H arom.); 7.61-7.59 (t, 4H arom.); 7.52-7.49 (t, 4×2H arom.); 6.24 (s, 4H, CH); 2.60 (m, 4H, CH); 1.24-1.17 (d, 4×2×3H, CH$_3$).

Example 39

Preparation of

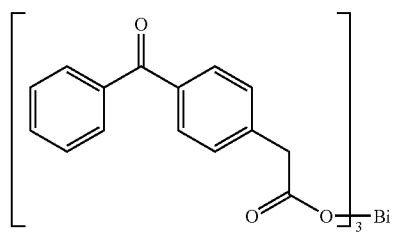

In a 25 ml dry three-neck-flask, 1.04 g (2.36 mmol) of triphenylbismuth in 8 ml of dioxan is added through a filter to 1.7 g (7.07 mmol) of 4-benzoylphenyl-acetic acid and the mixture is stirred for 2 h at 100° C. After cooling down to room temperature, the mixture is filtered and evaporated yielding 1.6 g of a white foam whose structure is confirmed by $^1$H- and $^{13}$C-NMR. mp=264-323° C. (DSC).

$^1$H NMR (CDCl$_3$) δ [ppm]: 7.66-7.60 (t, 3×4H arom.); 7.54-7.49 (t, 3×1H arom.); 7.40-7.35 (t, 3×2H arom.); 7.27-7.24 (t, 3×2H arom.); 3.52 (s, 3×2H, CH$_2$)

In the following preparation examples of compounds with Me=Zr (examples 40-46, 50.2, 52.2 and 53), the following general procedure is employed:

General Procedure A: Reaction of zirconium(IV) tetrabutoxid with 1) with alcohols or 2) with acids or 3) with 1,3-dicarbonyl compounds In a dry three-neck-flask, zirconium tetrabutoxid (Zr(OBu)$_4$) is dissolved in 5 ml of dioxane under argon. A 10 ml dioxane solution of 1) or 2) or 3) is added during 30 min. The reaction mixture is stirred under the reaction conditions noted in the example. The product is isolated by evaporation of the dioxane; when necessary, further purification is indicated for each compound. The structure is confirmed by $^1$H-NMR and $^{13}$C-NMR spectra.

Example 40

Preparation of

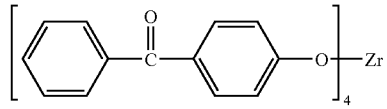

Prepared according to the general procedure A, using 2.0 g of Zr(OBu)$_4$ and 3.30 g of 4-hydroxybenzophenone. the reaction is stirred during 2 h at 25° C. and evaporated at 50° C. yielding 3.8 g of the product as an orange solid. mp: 337:367° C. (decomposition, DSC).

Example 41

Preparation of

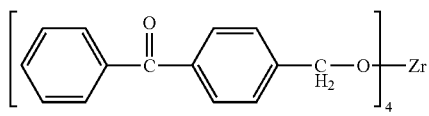

Prepared according to the general procedure A, using 1.55 g of Zr(OBu)$_4$ and 2.74 g of 4-(hydroxymethyl)-benzophenone, the reaction is stirred during 2 h at 40° C. and evaporated at 50° C. yielding 2.9 g of the product as yellow resin. mp: >151° C. (decomposition, DSC).

Example 42

Preparation of

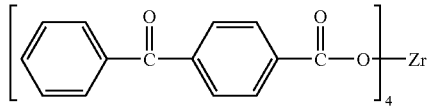

Prepared according to the general procedure A, using 1.59 g of Zr(OBu)$_4$ and 3.0 g of benzoylbenzoic acid, the reaction is stirred during 2 h at 25° C. and evaporated at 60° C. yielding 2.7 g of a white solid. mp: 189-204 C (DSC).

$^1$H-NMR (DMSO) δ [ppm]: 8.18-8.12 (d, 4×2H arom.); 7.84-7.82 (d, 4×2H arom.); 7.76-7.75 (d, 4×2H arom.); 7.74-7.69 (m, 4H arom.); 7.61-756 (m, 4×2H arom.);

Example 43

Preparation of

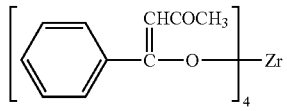

Prepared according to the general procedure A, using 1.48 g of Zr(OBu)$_4$ and 2.0 g of benzoyl-acetone, the reaction is stirred during 0.5 h at 45° C. and evaporated at 60° C. The residue is recrystallized from toluene yielding 1.44 g of white solid. mp: 214-223 C.

$^1$H-NMR (CDCl$_3$) δ [ppm]: 7.88-7.86 (d, 4×2H arom.); 7.41-7.36 (t, 4H arom.); 7.30-7.25 (t, 4×2H arom.); 6.19 (s, 4H, CH); 2.10 (s, 4×3H, CH$_3$);

Example 44

Preparation of

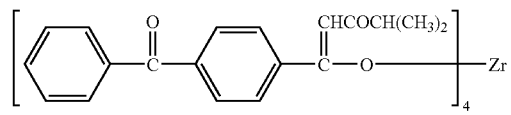

Prepared according to the general procedure A, using 1.45 g of Zr(OBu)$_4$ and 1.12 g of the compound of example 31.1, the reaction is stirred during 1 h at 25° C. and 0.5 h at 60° C. then evaporated at 60° C. yielding 1.3 g of yellow solid. mp: 217-221 C.

$^1$H-NMR (CDCl$_3$) δ [ppm]: 8.01-7.98 (d, 4×2H arom.); 7.79-7.73 (m, 4×4H arom.); 7.61-7.55 (t, 4H arom.); 7.49-7.44 (t, 4×2H arom.); 6.24 (s, 4H, CH); 2.62-2.53 (m, 4H, CH); 1.14-1.11 (d, 4×2×3H, CH$_3$);

Example 45

Preparation of

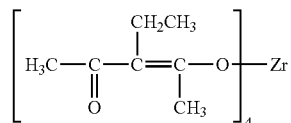

Prepared according to the general procedure A, using 1.60 g of Zr(OBu)$_4$ and 1.74 g of 3-ethyl-2,4-pentadione, the reaction is stirred during 1 h at 25° C. and 2 h at 40° C. then evaporated at 45° C. The residue is recrystallized from toluene yielding 0.7 g of white solid. mp: 191-197° C.

$^1$H-NMR (CDCl$_3$) δ [ppm]: 2.27 (q, 4×2H, CH$_2$.); 2.17 and 2.09 (2 s, 2 isomers, together 4×2×3H, CH$_3$.); 1.05 (m, 4×3H, CH$_3$.).

Example 46

Preparation of

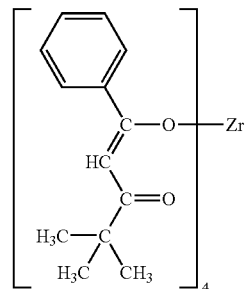

Prepared according to the general procedure A, using 3.52 g (7.34 mmol) of Zr(OBu)$_4$ and 6.1 g (29.37 mmol) of 2,2-dimethyl-5-phenyl-3,5-pentadione, the reaction is stirred for 0.5 h at 45° C. and evaporated under vacuum at 45° C. The residue is dissolved in 15 ml of cyclohexane and heated for 0.5 h to 45° C. Evaporation under vacuum yields 5.8 g of a sticky clear solid whose structure is confirmed by $^1$H- and $^{13}$C-NMR.

$^1$H-NMR (CDCl$_3$) δ [ppm]: 7.90 (d, 4×2H arom); 7.40-7.24 (m, 4×3H arom); 6.29 (m, 4H, CH); 1.25 and 1.13 (2 s, 2 isomers, together 4×3×3H, CH$_3$.);

Example 47

Preparation of

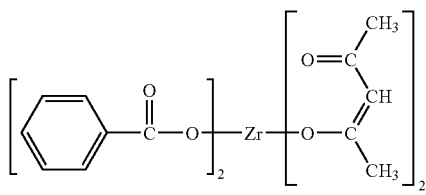

In a 50 ml dry three-neck-flask, 0.75 g (6.15 mmol) of benzoic acid in 5 ml of dioxan is added over 1 h to a solution of 1.5 g (3.1 mmol) of zirconium (IV) tetra-acetylacetonat in 20 ml dioxan at room temperature. The mixture is stirred 1 h at room temperature, evaporated at 60° C. The residue is recrystallized from toluene yielding a product composed of a mixture of 73% of title product, 14% of zirconium tetrabenzoate, 3% of zirconium (IV) tetra-acetylacetonat, 10% acetylacetonate (confirmed by $^1$H-NMR). mp=177-181° C. (DSC).

Example 48

Preparation of

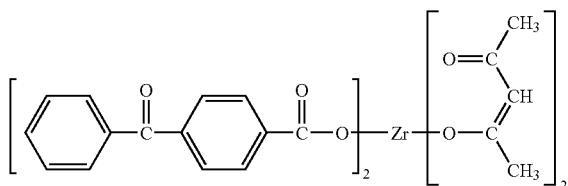

In a 50 ml dry three-neck-flask, 2.31 g (10.25 mmol) of benzoylbenzoic acid is added to a solution of 2.5 g (5.12 mmol) of zirconium (IV) tetra-acetylacetonat in 35 ml dichloroethan at room temperature. The mixture is heated in 3 h to 70° C. After 3.5 h, 2 ml of dioxan are added, the mixture is filtered and evaporated at 60° C. The product is isolated as a mixture of 69% of title product, 14% of zirconium tetrabenzoylbenzoate, 3% of zirconium (IV) tetra-acetylacetonat, 13% acetylacetonate (confirmed by $^1$H-NMR). mp=75-135° C. (DSC, decomposition).

Example 49

Preparation of

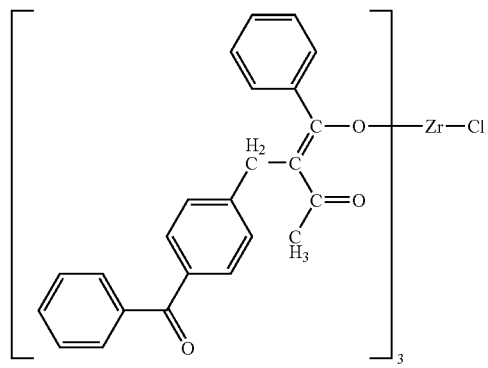

49.1 Preparation of the Ligand

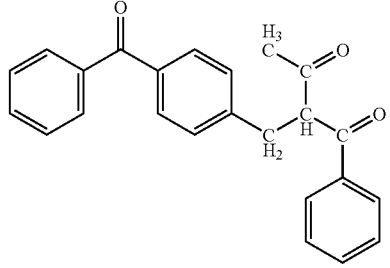

10.04 g (72.7 mmol) of anhydrous potassium carbonate are added to a solution of 17.7 g (109 mmol) of benzoylaceton in 100 ml of MEK. 58 mg of tetrabutylammonium bromide (cat.) is added. After stirring for 2 h at 100° C., the mixture is cooled to 60° C. and a solution of 10 g (36.3 mmol) of benzoylbenzylbromid in 10 ml of MEK is added. The reaction is stirred for 0.5 h at 100° C. then cooled to rt, filtered and evaporated. The crude product is distilled yielding 5.2 g of yellow oil. The structure is confirmed by $^1$H-NMR and $^{13}$C-NMR spectra. mp: >270° C. (decomposition, DSC).

$^1$H-NMR (CDCl$_3$) δ [ppm]: 7.93 (d, 2H arom); 7.73 (m, 4H arom); 7.59 (m, 1H arom); 7.48 (m, 5H arom); 7.32 (d, 2H arom); 4.83 (t, 1H, CH); 3.40 (m, 2H, CH$_2$); 2.16 (s, 3H, CH$_3$). MS CI (1-Butan): 357 (MH+)

49.2 Preparation of the Title Compound

In a 25 ml dry three-neck-flask, 0.76 g (4.2 mmol) of a 30% sodium methanolate solution is added to a solution of 1.5 g (4.2 mmol) of 3-(4-benzoyl-benzyl)-1-phenyl-2,4-pentadione in 15 ml THF under argon at 0 C. After stirring for 0.5 h at 0 C, a solution of 0.245 g (1.05 mmol) zirconium tetrachloride in 5 ml THF is added and stirring is continued for 2 h at room temperature and 3 h at 50° C. The mixture is filtered and concentrated yielding 1.65 g of an orange oil. Treatment with toluene and cyclohexane gives the title product as a yellow solid. The structure is confirmed by $^1$H-NMR and MS spectra. MS APCI (neg) 1191 (M-1H).

Example 50

Preparation of

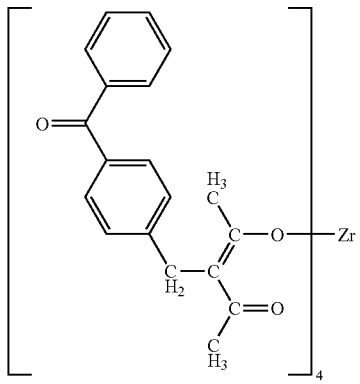

50.1 Preparation of the Ligand

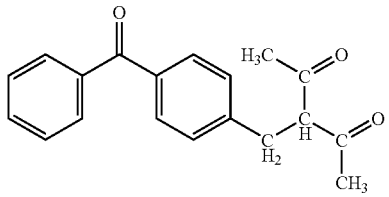

1.5 g (10.9 mmol) of anhydrous potassium carbonate are added to a solution of 2.31 g (21.8 mmol) of acetylacetone in 20 ml of 2-butanone. 13 mg of tetrabutylammonium bromide (cat.) is added. After stirring for 2 h at 100° C., the mixture is cooled to 35° C. and a solution of 2 g (36.3 mmol) of 4-benzoylbenzylbromid in 10 ml of 2-butanone is added. The reaction is stirred 5 h at 40° C., cooled to room temperature, filtered and evaporated. 2.1 g of the crude product is purified by chromatography (toluene/ethyl acetate 9/1) yielding 1.6 g of white solid. The structure is confirmed by $^1$H-NMR and $^{13}$C-NMR spectra. mp: 84:94° C.

$^1$H-NMR (CDCl$_3$) δ [ppm]: 7.76 (m, 4H arom); 7.59 (m, 1H arom); 7.47 (m, 2H arom); 7.28 (m, 2H arom); 4.05 (t, 1H, CH diketo); 3.75 (s, 2H, CH$_2$ enol); 3.23 (d, 2H, CH$_2$ diketo); 2.18 (s, 3H, CH$_3$diketo); 2.1 (s, 3H, CH$_3$enol)

50.2 Preparation of the Title Compound

In a 25 ml dry three-neck-flask, 0.51 (1.1 mmol) of Zr(OBu)$_4$ is added to a of 1.21 g (4.10 mmol) of 4-benzoyl-benzyl-2,4-pentadione in 3 ml of dioxane. The mixture is stirred for 1 h at room temperature and 1 h at 50° C. Evaporation gives 1.1 g of the title product as an orange solid that is recrystallized in toluene yielding 0.39 g of a white solid. The structure is confirmed by 1H-NMR mp=159-169° C. (DSC)

Example 51

Preparation of

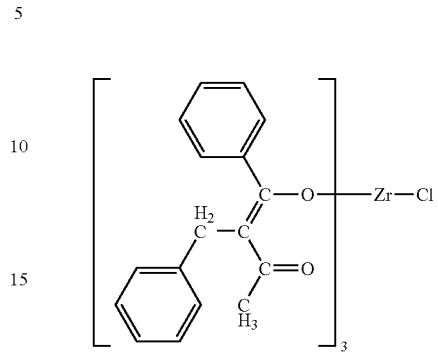

In a 50 ml dry three-neck-flask, 0.71 g (3.96 mmol) of a 30% sodium methanolate solution is added to a solution of 1 g (3.96 mmol) of 3-benzyl-1-phenyl-2,4-pentadione in 15 ml THF under argon at 0 C. After stirring for 0.5 h at 0 C, a solution of 0.23 g (0.99 mmol) of zirconium tetrachloride in 10 ml THF is added and stirring is continued for 2.5 h at room temperature. 80 mg of sodium methanolate are added and the mixture is stirred for 0.5 h. The mixture is filtered and concentrated yielding 1 g of an orange oil. Treatment with toluene and pentane gives 0.5 g of the title product as a yellow solid The structure is confirmed by $^1$H-NMR and MS APCI (neg) 879.1 (M-1H).

Example 52

Preparation of

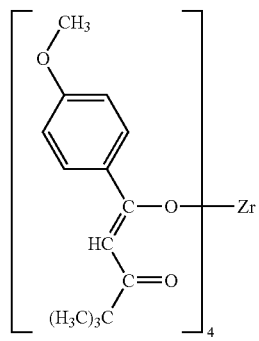

52.1 Preparation of the Ligand

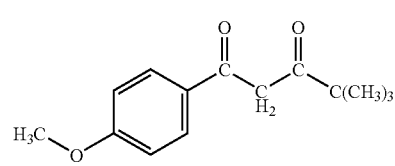

11.24 g (96.78 mmol) of methyl pivalate are added to a solution of 14.48 g (129 mmol) of potassium tert-butoxid in 60 ml of DMF at 40° C. under argon. 9.69 g (64.5 mmol) of 4-methoxyacetophenon dissolved in 10 ml of DMF are added in 1 h at 40-50° C. After 20 h at 40° C. the reaction mixture is poured in 200 ml ice water containing 30 ml $H_2SO_4$ 10%. The product is filtered and purified per crystallization in heptane yielding 6.6 g of a white solid. The structure is confirmed by $^1$H-NMR and $^{13}$C-NMR spectra. mp 55-60° C.

$^1$H-NMR (CDCl$_3$) δ [ppm]: 7.87 (d, 2H arom); 6.94 (d, 2H arom); 6.23 (s, 2H, CH$_2$); 3.86 (s, 3H, OCH$_3$); 1.24 (s, 3×3H, 3 CH$_3$). GC-MS: 357 (MH+)

52.1 Preparation of the Title Compound

In a 25 ml dry three-neck-flask, 1.28 g (2.66 mmol) of Zr(OBu)$_4$ in 1 ml of dioxan is added to a solution of 2.5 g (10.67 mmol) of 5-(4-methoxyphenyl)-2,2-dimethyl-3,5-pentadione in 15 ml of dioxane. After stirring for 2.5 h at room temperature, the mixture is concentrated under vacuum. The residue is treated with toluene and pentane and filtered. The filtrate is concentrated yielding 1.9 g of the title compound. The structure is confirmed by $^1$H- and $^{13}$C-NMR and by MS.

$^1$H-NMR (CDCl$_3$) δ [ppm]: 7.88 (d, 4×2H arom); 6.79 (d, 4×2H arom); 6.21 (s, 4H, CH) 1.16 and 1.13 (2 s, 2 isomers, together 4×3×3H, CH$_3$)

Example 53

Preparation of

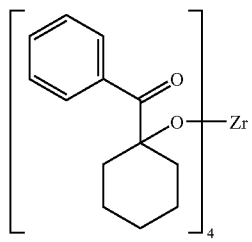

In a 50 ml dry three-neck-flask, 3.41 g (16.68 mmol) of (1-hydroxy-cyclohexyl)-phenylmethanone (IRGACURE® 184) in 15 ml dichloromethane is added to a solution of Zr(OBu)$_4$ in 15 ml of dichloromethane at room temperature and the mixture is stirred for 4 h. After concentration under vacuum, the residue is treated with heptane yielding 3.5 g of a white solid, mp. 318-326° C. (DSC).

Example 54

Preparation of

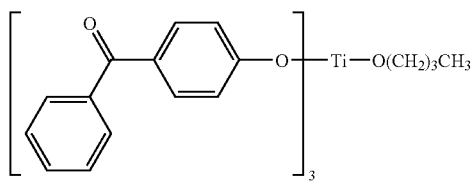

In a 25 ml dry three-neck-flask, 2 g (10.09 mmol) of 4-hydroxybenzophenon is added to 1.14 g (3.36 mmol) of titan (IV) tetra-butoxide. The mixture is heated to 80° C. under vacuum for 1 h. Toluene (4 ml) is added and the mixture is concentrated under vacuum at 45° C. yielding the title product as red foam. The structure is confirmed by 1H-NMR. mp=111-125° C. $^1$H-NMR (CDCl$_3$) δ [ppm]: 7.75 (m, 3×4H arom); 7.56 (m, 3H arom); 7.46 (m, 3×2H arom); 6.75 (d, 3×2H arom); 3.72 (m, 2H, CH$_2$); 1.60 (m, 2H, CH$_2$); 1.40 (m, 2H, CH$_2$) 0.90 (m, 3H, CH$_3$)

Example 55

Preparation of

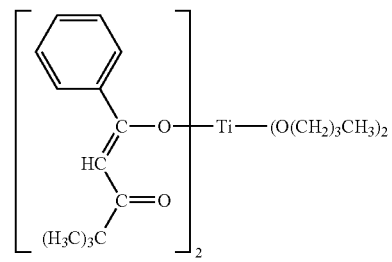

In a 25 ml dry three-neck-flask, 1.5 (7.34 mmol) of 2,2-dimethyl-5-phenyl-3,5-pentadione is added to 1.25 g (3.67 mmol) of titan (IV) tetrabutylat. The mixture is heated to 40° C. under vacuum for 2 h. Cooling to room temperature gives 1.6 g of an orange oil. The structure is confirmed by $_1$H- and $_{13}$C-NMR and by MS. mp=294-304° C. (DSC)

Example 56

Preparation of

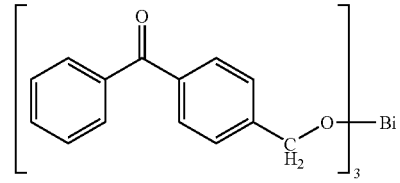

In a 50 ml dry three-neck-flask, 2.54 g (14.1 mmol) of a 30% sodium methanolate solution is added to a solution of 3.0 g (14.1 mmol) of 4-(hydroxymethyl)-benzophenone in 15 ml THF under argon at 0 C. After stirring for 0.5 h at 0 C, a suspension of 1.48 g (4.71 mmol) bismuth trichloride in 20 ml THF is added and stirring is continued for 2 h at 0 C and 1 h at 25 C. The mixture is filtered and concentrated yielding 2.0 g of the product. The structure is confirmed by $^1$H-NMR and $^{13}$C-NMR spectra.

$^1$H-NMR (CDCl$_3$) δ [ppm]: 7.80 (m, 3×4H arom); 7.59 (m, 3H arom); 7.49 (m, 3×4H arom); 4.79 (s, 3×2H, CH$_2$).

Example 57

Preparation of

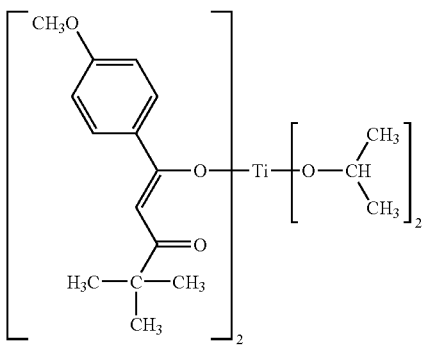

In a 25 ml dry three-neck-flask, 2.0 (8.53 mmol) of the compound of example 52.1 dissolved in 10 ml THF is added to 1.21 g (4.26 mmol) of titan (IV) tetra-isopropylat. The reaction mixture is stirred for 3 h at 25° C. and evaporated yielding 2.7 g of an orange solid. The structure is confirmed by $^1$H- and $^{13}$C-NMR and by MS APCI 573.19 (M-OCH$(CH_3)_2$). mp=252-303° C. (DSC).

Example 58

Preparation of

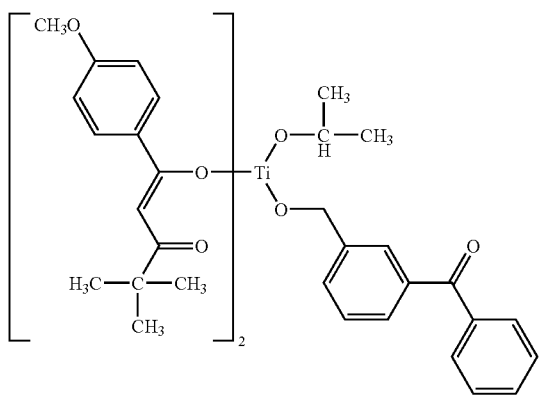

In a 25 ml dry three-neck-flask, 0.27 g (1.26 mmol) of 4-(hydroxymethyl)-benzophenone is added to 0.8 g (1.26 mmol) of the compound of example 57. The reaction mixture is stirred for 0.5 h at 25° C. and evaporated giving 1.0 g of an orange solid. The structure is confirmed by $^1$H-NMR, mp=253-295° C. (decomposition DSC).

Example 59

Preparation of

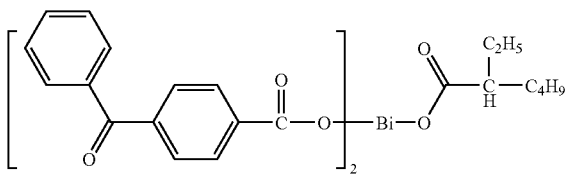

In a 50 ml dry three-neck-flask, 072 g (4.49 mmol) of 2 ethylhexanoic acid is added to a solution of 4.0 g (4.49 mmol) of product from example 19 dissolved in 50 ml toluene at 100° C. The mixture is stirred for 1 h at 110° C. Upon cooling to room temperature, a solid is formed and isolated through filtration. mp: 374-403° C. (DSC).

Application Examples

The polymerizable compositions generally comprise between 0.04% and 15% by weight of organometallic compounds based on solids.

/A/—Curing of a Two Pack Polyurethane System Based on a Polyacrylic Polyol and an Aliphatic Polyisocyanate:

The polyurethane is the reaction product of two basic components: a polyol (Component A) and a polyisocyanate (Component B). An organometallic photolatent catalyst is added to the total composition of A and B in order to speed up the reaction of A with B. If desired, a conventional sensitizer is added into the system to facilitate the activation of the photocatalysts. In the following examples Component A includes all ingredients other than the polyisocyanate. The photolatent catalyst and the sensitizer are mixed carefully into Component A prior to the addition of Component B.

Component A
73.1 parts of a polyol (Desmophen® A VP LS 2350; Bayer AG)
0.9 parts of a flow improver (Byk 355; Byk-Chemie)
0.7 parts of a defoamer (Byk 141; Byk-Chemie)
0.7 parts of a flow improver (Byk 333; Byk-Chemie)
24.6 parts of xylene/methoxypropylacetate/butylacetate (1/1/1)

Component B
Aliphatic polyisocyanate [(HDI-Trimer) Desmodur® N3390 BA; Bayer AG]

The basic testing formulations are composed of:

7.52 parts of component A
2.00 parts of component B

Example A1

The testing samples are prepared by adding 0.5 weight % of the organometallic catalyst and 0.5 weight % of a sensitizer (benzophenone; DAROCUR® BP, Ciba Inc.) to the basic testing formulation.

The mixtures are applied with a 76 µm split coater on two glass plates of 30 cm length. One plate is irradiated using a UV processor from IST Metz (2 mercury lamps operated at 80 W/cm) at a belt speed of 5 m/min, whereas a second one is not irradiated. The reactivity of the mixtures is determined by measuring the "tack free time". Therefore the samples are set up on a drying recorder from ByK Gardner, where a needle is moving with a constant speed on the coated substrate for 24 h. The recording is carried out in the dark, at room temperature. The "tack free time" is the period of time needed for the sample to cure in such a manner that no tack is left on the surface upon touch by the needle of the recorder. The lower the value of the "tack free time", the faster is the reaction of the polyol with the isocyanate.

The higher the difference between the value of the "tack free time" of the irradiated sample and the non-irradiated sample (with a tack free value of the irradiated sample, which is lower than the one of the non-irradiated one), the more "photolatent" is the catalyst.

The potlife of the formulation is monitored visually at room temperature. In other words, it corresponds to the time when the formulation is gelled in the flask.

The higher the value of potlife, the more stable is the mixture in the flask.

The catalysts which are used in the test as well as the results of the tests are collected in the following table 1.

TABLE 1

| catalyst | Tack free time (stage 3/4) in hrs. In the dark | Tack free time (stage 3/4) in hrs. 2 × 80 W at 5 m/min. | Visual Potlife (hrs.) |
|---|---|---|---|
| Without catalyst and sensitizer | 20.0 | — | >8.0 |
| dibutyl tin laurate (DBTL)*[1] | 1.0 | 1.0 | 0.33 |
| of example 13 | 5.0 | 5.5 | 0.33 |
| of example 14 | 13.2 | 7.0 | 6.0 |
| of example 15 | 3.0 | 1.0 | 0.33 |
| of example 1 | 11.5 | 3.5 | >8.0 |
| of example 4 | 21.0 | 3.0 | >8.0 |
| of example 5 | 1.75 | 1.75 | 0.33 |
| of example 2 | 16.0 | 3.0 | >8.0 |
| of example 3 | 1.25 | 0.5 | 0.33 |
| of example 6 | 6.0 | 4.0 | 0.33 |

*[1]$(C_4H_9)_2Sn[O(CO)-(CH_2)_{10}CH_3]_2$ CAS: 77-56-7; provided by Merck

Example A2

The samples are prepared by adding 0.01% weight of the organometallic catalyst and 0.01% weight of a sensitizer (benzophenone, DAROCUR® BP; Ciba Inc.).

The mixtures are applied with a 76 μm split coater on two glass plates of 30 cm length. One plate is irradiated using a UV processor from IST Metz (2 mercury lamps operated at 80 W/cm) at a belt speed of 5 m/min., whereas the second sample is not irradiated.

The reactivity of the mixtures is determined by measuring the "tack free time". Therefore the samples are set up on a drying recorder from ByK Gardner, where a needle is moving with a constant speed on the coated substrate for 24 h. The recording is carried out in the dark, at room temperature. The "tack free time" is the period of time needed for the sample to cure in such a manner that no tack is left on the surface upon touch by the needle of the recorder. The lower the value of the "tack free time", the faster is the reaction of the polyol with the isocyanate.

The higher the difference between the value of the "tack free time" of the irradiated sample and the non-irradiated sample (with a tack free value of the irradiated sample, which is lower than the non-irradiated one), the more "photolatent" is the catalyst.

The catalysts which are used in the test as well as the results are summarized in the following table 2.

TABLE 2

| catalyst | Tack free time (stage 3/4) in hrs. In the dark | Tack free time (stage 3/4) in hrs. 2 × 80 W at 5 m/min. |
|---|---|---|
| dibutyl tin laurate (DBTL)*[1] | 7.0 | 7.0 |
| of example 15 | 5.0 | 3.5 |
| of example 1 | 11.0 | 12.0 |
| of example 4 | 16.5 | 12.0 |
| of example 2 | 15.5 | 14.0 |

*[1]$(C_4H_9)_2Sn[O(CO)-(CH_2)_{10}CH_3]_2$ CAS: 77-56-7; provided by Merck

Example A3

The following samples are prepared for testing:

| Sample | Catalyst Composition |
|---|---|
| A3-1 | without catalyst |
| A3-2 | 0.01% dibutyl tin laurate (DBTL) [$(C_4H_9)_2Sn[O(CO)-(CH_2)_{10}CH_3]_2$ CAS: 77-56-7; provided by Merck] |
| A3-3 | 0.014% compound of example 4 0.1% benzophenone (DAROCUR® BP, Ciba Inc.) |
| A3-4 | 0.5% compound of example 4 0.1% benzophenone (DAROCUR® BP, Ciba Inc.) |

The mixtures are applied on $BaF_2$ lenses with a 12 μm calibrated wirewound bar coater. Samples 3 and 4 are exposed to a UV processor from IST Metz (2 mercury lamps operated at 80 W/cm) at a belt speed of 5 m/min., whereas the samples 1 and 2 are not irradiated.

In both cases, the disappearance of the NCO-signal is followed by means of an IR spectrophotometer Nicolet 380 from Thermo in combination with OMNIC® software. IR-measurements are carried out regularly for 240 min. During the test the lenses are stored in the dark at 60° C.

The faster the decrease in NCO contents, the higher the reactivity of the formulation.

The results are presented in the following table 3.

TABLE 3

| | NCO contents (%) | | | |
|---|---|---|---|---|
| Time (min) | Sample A3-1 | Sample A3-2 | Sample A3-3 | Sample A3-4 |
| Before irradiation | 100 | 100 | 100 | 100 |
| After irradiation | 100 | 100 | 93 | 90 |
| 10 | 98 | 89 | 93 | 73 |
| 20 | 92 | 80 | 86 | 62 |
| 40 | 79 | 69 | 75 | 51 |
| 60 | 73 | 61 | 65 | 44 |
| 240 | 37 | 28 | 30 | 19 |

Example A4

The following samples are prepared for testing:

| Sample | Catalyst Composition |
|---|---|
| A4-1 | 0.5% dibutyl tin laurate (DBTL) [$(C_4H_9)_2Sn[O(CO)-(CH_2)_{10}CH_3]_2$ CAS: 77-56-7; provided by Merck] |
| A4-2 | 0.01% DBTL |
| A4-3 | 0.5% compound of example 4 |
| A4-4 | 0.5% compound of example 4 0.1% benzophenone (DAROCUR® BP, Ciba Inc.) |

The mixtures are stored in the dark at room temperature. The potlife of each formulation is monitored by measuring the viscosity at 23° C. after 0, 10, 75 and 330 min. with a rheometer MCR 100 (CP 50-1/Q1). The viscosity increases with the time.

The slower the increase of the viscosity, the longer is the potlife of the formulation and consequently the larger is the working window. The results are given in table 4.

TABLE 4

| Time (min) | Viscosity (mPa · s) @ 23° C. | | | |
|---|---|---|---|---|
| | Sample A4-1 | Sample A4-2 | Sample A4-3 | Sample A4-4 |
| 0 | 155 | 127 | 115 | 130 |
| 10 | 653.2 | 129 | 116 | 135 |
| 75 | solid | 209 | 150 | 157 |
| 330 | solid | 1100 | 374 | 390 |

The polymerizable compositions generally comprise between 0.04% and 15% by weight of organometallic compounds based on solids.

In the following applications, i.e. examples AS until Cl included, the samples are prepared by adding the organometallic catalyst at a concentration that enables a comparison between the various organometallic catalysts at the same metal concentration.

Example A 5

The samples are prepared by adding the organometallic catalyst at 0.1% (on solids) metal and 0.5% weight (on solids) of a sensitizer (benzophenone, DAROCUR® BP; Ciba Inc).

The mixtures are applied with a 76 μm split coater on two glass plates of 30 cm length. One plate is irradiated using a UV processor from IST Metz (2 mercury lamps operated at 100 W/cm) at a belt speed of 5 m/min, whereas the second sample is not irradiated. The reactivity of the mixtures is determined by measuring the "tack free time". Therefore the samples are set up on a drying recorder from ByK Gardner, where a needle is moving with a constant speed on the coated substrate for 24 hrs. The recording is carried out in the dark, at room temperature. The "tack free time" is the period of time needed for the sample to cure in such a manner that no tack is left on the surface upon touch by the needle of the recorder. The lower the value of the "tack free time" the faster is the reaction of the polyol with the isocyanate.

The higher the difference between the value of the "tack free time" of the irradiated sample and the non-irradiated sample (with a tack free value of the irradiated sample, which is lower than the non-irradiated one), the more "photolatent" is the catalyst.

The catalysts which are used in the test as well as the results are summarized in the table 5.

TABLE 5

| catalyst | Tack free time (stage 3/4) in hrs. In the dark | Tack free time (stage 3/4) in hrs. 2 × 100 W at 5 m/min. |
|---|---|---|
| of example 2 | 10.5 | 3 |
| of example 4 | 8 | 4.5 |
| of example 59 | 1.5 | 0.5 |
| of example 19 | 3.5 | 1.5 |
| of example 17 | 4.5 | 2 |
| of example 33 | 3.5 | 2.5 |
| of example 34 | 3.5 | 1.75 |
| of example 38 | 5.5 | 2.75 |
| of example 37 | 6.5 | 3.5 |
| of example 39 | 2 | 1 |
| of example 44 | 0.75 | 0.5 |
| of example 46 | 0.5 | 0 |
| of example 42 | 8 | 6 |
| of example 45 | 5.5 | 3.25 |
| of example 41 | 16 | 8.25 |
| of example 55 | 4 | 1.75 |
| of example 54 | 5.75 | 4.3 |
| of example 26 | 6.25 | 5 |
| of example 25 | 11 | 7.25 |
| of example 24 | 8.75 | 7 |

Example A6

The following samples are prepared for testing:

| Sample | Catalyst Composition |
|---|---|
| A6-1 | 0.04 wt % (on solids) of compound of example 59 (0.01% Bi) 0.5% wt % (on solids)of benzophenone (DAROCUR ® BP [119-61-9]; Ciba Inc) |
| A6-2 | 0.04 wt % (on solids) of compound of example 59 (0.01% Bi) 0.5% wt % (on solids)of [4-(4-methylphenylthio)phenyl]-phenylmethanone (Speedcure ® BMS [83846-85-9]; Lambson Ltd) |
| A6-3 | 0.04 wt % (on solids) of compound of example 59 (0.01% Bi) 0.5% wt % (on solids)of isopropylthioxanthone (ITX; DAROCUR ® ITX [83846-86-0]; Ciba Inc) |
| A6-4 | 0.07 wt % (on solids) of compound of example 31(0.01% Sn) 0.5% wt % (on solids)of benzophenone (DAROCUR ® BP [119-61-9]; Ciba Inc) |
| A6-5 | 0.07 wt % (on solids) of compound of example 31 (0.01% Sn) 0.5% wt % (on solids)of [4-(4-methylphenylthio)phenyl]-phenylmethanone (Speedcure ® BMS [83846-85-9]; Lambson Ltd) |
| A6-6 | 0.07 wt % (on solids) of compound of example 31 (0.01% Sn) 0.5% wt % (on solids)of ITX (DAROCUR ® ITX [83846-86-0]; Ciba Inc) |

The mixtures are applied with a 76 μm split coater on two glass plates of 30 cm length. One plate is exposed under UVASPOT 400/T lamp from Dr. Hönle GmbH (gallium doped lamp), whereas the second sample is not irradiated. The reactivity of the mixtures is determined by measuring the "tack free time". Therefore the samples are set up on a drying recorder from ByK Gardner, where a needle is moving with a constant speed on the coated substrate for 24 hrs. The recording is carried out in the dark, at room temperature. The "tack free time" is the period of time needed for the sample to cure in such a manner that no tack is left on the surface upon touch by the needle of the recorder. The lower the value of the "tack free time" the faster is the reaction of the polyol with the isocyanate The higher the difference between the value of the "tack free time" of the irradiated sample and the non-irradiated sample (with a tack free value of the irradiated sample, which is lower than the non-irradiated one), the more "photolatent" is the catalyst.

The results are given in table 6.

TABLE 6

| Sample | Tack free time (stage 3/4) in hrs. In the dark | Tack free time (stage 3/4) in hrs. 6 min. under UVASPOT lamp |
|---|---|---|
| A6-1 | 7 | 4 |
| A6-2 | 6.5 | 3.25 |
| A6-3 | 6 | 2.5 |
| A6-4 | 6 | 3 |
| A6-5 | 6.75 | 4.5 |
| A6-6 | 5.75 | 4 |

/B/—Curing of a One Pack Polyurethane System:

The polyurethane is the reaction product of two basic components: a polyol (Component A) and a polyisocyanate (Component B). In the case of one pack polyurethane, the polyisocyanate is a blocked polyisocyanate. High temperature can unblock the blocking group and by this way allows the crosslinking. A photolatent organometallic catalyst is added to the formulation in order to speed up the reaction of A and B. If desired a conventional sensitizer is added into the system to facilitate the activation of the photocatalysts.

In the following example the catalyst and the sensitizer are mixed into the component A.

Component A 1 part of a polyol (Desmophen® 1100, i.e. a branched polyester polyol; Bayer M.S.)
1 part of butylacetate
0.1 part of a silicone additive for high surface tension reduction (Byk 306; Byk-Chemie)

Component B

Blocked isocyanate (Desmodur® BL 4265 SN, blocked aliphatic polyisocyanate based on IPDI; Bayer Material Science)

The basic testing formulations are composed of:

8.4 parts of component A
7.56 parts of component B

Example B1

The following samples are prepared for testing:

| Sample | Catalyst Composition |
|---|---|
| B1-1 | No catalyst |
| B1-2 | 0.2 wt % (on solids) of compound of example 4 (0.05% Sn on solid) + 0.5% wt % (on solids) of benzophenone (DAROCUR ® BP [119-61-9]; Ciba Inc.) |
| B1-3 | 0.4 wt % (on solids) of compound of example 4 (0.1% Sn on solid) + 0.5% wt % (on solids) of benzophenone (DAROCUR ® BP [119-61-9]; Ciba Inc) |

The mixtures are applied with 120 μm calibrated wirewound bar on two aluminium coil coats. One panel is irradiated using a UV processor from IST Metz (2 mercury lamps operated at 100 W/cm) at a belt speed of 5 m/min. and heated at 130° C. for 20 min., whereas the second one is only heated at 130° C. for 20 min.

The pendulum hardness (Koenig; DIN 53157) of the cured coating is measured 30 min after curing. The higher the value of the pendulum hardness measurement, the harder is the cured surface and the more efficient the polymerization. The results are given in table 7.

TABLE 7

| | Pendulum hardness (sec.) | | |
|---|---|---|---|
| Curing conditions | Sample B1-1 | Sample B1-2 | Sample B1-3 |
| 20 min. 130° C. | tacky/not measurable | tacky/not measurable | tacky/not measurable |
| UV + 20 min. 130° C. | tacky/not measurable | 24 | 28 |

/C/—Curing of a Two Pack Polyurethane System

The polyurethane is the reaction product of two basic components: a polyol (Component A) and a polyisocyanate (Component B). An organometallic photolatent catalyst is added in the composition of A and B (to speed up the reaction of A and B). If desired, a conventional sensitizer is added into the system to facilitate the activation of the photocatalysts.

In the following examples Component A includes ingredients other than polyols. The photolatent catalyst and the sensitizer are mixed into Component A.

Component A 8.18 parts of a polyester polyol (Setal ® 1606 BA-80; Nuplex Resins)
0.182 parts of a flow improver (Byk 331; Byk-Chemie) 10% in BuAc
5.1 parts of butylacetate Component B Aliphatic polyisocyanate [(HDI-Trimer) Tolonate® HDT LV 2D103; Rodia]

The basic testing formulations are composed of:

13.46 parts of component A
3.84 parts of component B

Example C1

The following samples are prepared for testing:

| Sample | Catalyst Composition |
|---|---|
| C1-1 | No catalyst |
| C1-2 | 0.44 wt % (on solids) of compound of example 4 (0.1% Sn) 0.5 wt % (on solids) of [4-(4-methylphenylthio)phenyl]-phenylmethanone (Speedcure ® BMS [83846-85-9]; Lambson Ltd) |
| C1-3 | 0.4 wt % (on solids) of compound of example 59 (0.1% Bi) 0.5 wt % (on solids) of [4-(4-methylphenylthio)phenyl]-phenylmethanone (Speedcure ® BMS [83846-85-9]; Lambson Ltd) |

The mixtures are applied on two $BaF_2$ lenses with a 12 μm calibrated wirewound bar coater. One lense is only exposed 6 min to UVA spot 400/T fron hönle (gallium doped lamp) and the other one is exposed 1 min to UVA spot lamp and dried 30 min at 60° C. In both cases, the disappearance of the NCO-signal is followed with an IR spectrophotometer Nicolet 380 from Thermo in combination with OMNIC® software. IR-measurements are carried out before and after curing. The lower the NCO content is, the better the polymerization is.

It is important to obtain a dried film at the end the curing process. It is monitored by "touch dry method" (a dried film is obtained if no tack is left on the surface upon touch of finger). For such evaluation, the formulations are applied by means of a 120 μm calibrated wirewound on aluminium coil coats.

The results are presented in the tables 13 and 14.

TABLE 13

| | C1-1 6 min UVA spot lamp | C1-2 6 min UVA spot lamp | C1-3 6 min UVA spot lamp |
|---|---|---|---|
| | Unreacted NCO (%) | | |
| Before curing | 100 | 100 | 100 |
| After irradiation | 72 | 21 | 50 |
| | Film appearance (Touch dry) | | |
| Before curing | Liquid | Liquid | Liquid |
| After irradiation | Liquid | Dried | tacky |

TABLE 14

| | C1-1<br>1 min UVA<br>spot lamp +<br>30 min 60° C. | C1-2<br>1 min UVA<br>spot lamp +<br>30 min 60° C. | C1-3<br>1 min UVA<br>spot lamp +<br>30 min 60° C. |
|---|---|---|---|
| | Unreacted NCO (%) | | |
| Before curing | 100 | 100 | 100 |
| After irradiation +<br>30 min 60° C. | 97 | 86 | 62 |
| | Film appearance (Touch dry) | | |
| Before curing | liquid | liquid | liquid |
| After irradiation +<br>30 min 60° C. | liquid | dried | dried |

The invention claimed is:

1. A polymerizable composition comprising
(a) at least one blocked or unblocked isocyanate or isothiocyanate component,
(b) at least one polyol; and
(c) at least one latent catalyst compound comprising
a photoactive moiety (PI) bound to a metal and capable of initiating a polyaddition or a polycondensation reaction by exposure to electromagnetic radiation of a wavelength range of 200-800 nm,
wherein the latent catalyst is a compound of the formula I or II, $$Me(PI)_{(m-x)}A_x \quad (I)$$

$$A_x(PI)_{(m-1-x)}Me\text{-}O\text{-}Me(PI)_{(m-1-x)}A_x \quad (II), \text{ wherein}$$

Me is Sn, Bi, Al, Zr or Ti;
m denotes an integer from 1 up to the coordination number of Me;
x is an integer from 0 to (m−1);
A is $C_1$-$C_{20}$alkyl, halogen, $C_7$-$C_{30}$arylalkyl, $C_1$-$C_{20}$alkoxy, $C_2$-$C_{20}$alkanoyloxy, $C_6$-$C_{18}$aryl or $C_6$-$C_{18}$aryl which is substituted by one or more $C_1$-$C_{20}$ alkyl; and provided that in case x is greater than one, the A are identical or different; and
PI independently of each other is selected from the group consisting of formulas (Z), (B), (C), (D), (E), (F), (G), (H), (J), (K), (L) and (M)

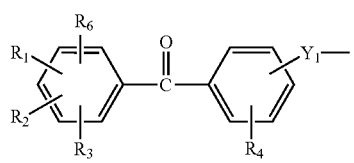
(Z)

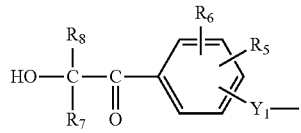
(B)

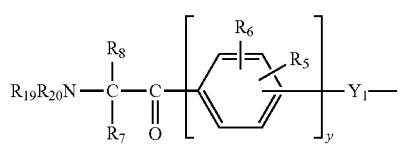
(C)

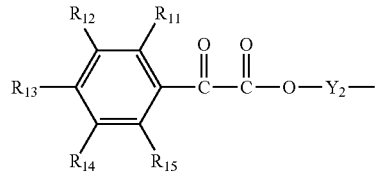
(D)

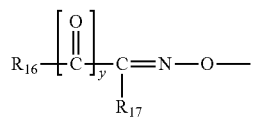
(E)

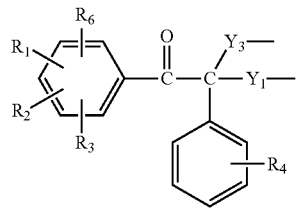
(F)

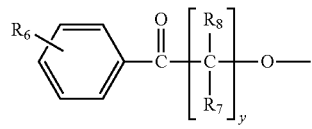
(G)

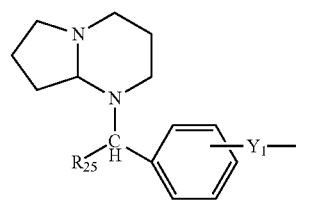
(H)

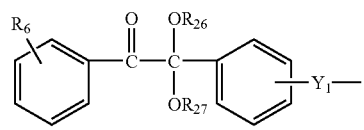
(J)

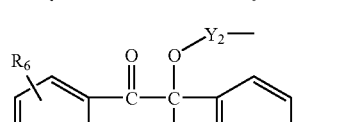
(K)

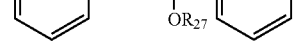
(L)

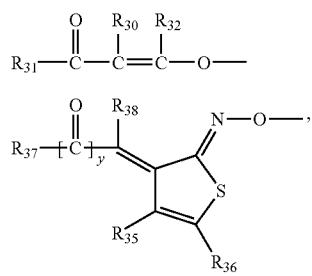
(M)

wherein
Y is 0 or 1;
$R_1$, $R_2$ and $R_3$ independently of one another are hydrogen, $C_1$-$C_6$-alkyl, $C_1$-$C_4$-halogenalkyl, $C_8$-$C_{18}$aryl, $C_7$-$C_{30}$aralkyl, $C_1$-$C_4$-alkoxy, $C_1$-$C_4$alkylthio, halogen, $N(C_1$-$C_4$-alkyl$)_2$, or $N(C_4$-$C_7$-cycloalkyl which optionally is interrupted by —O— or $NR_{10}$;

$R_4$ is hydrogen, $C_1$-$C_4$-alkyl, $C_1$-$C_4$-halogenalkyl, phenyl, $N(C_1$-$C_4$-alkyl$)_2$, $COOCH_3$,

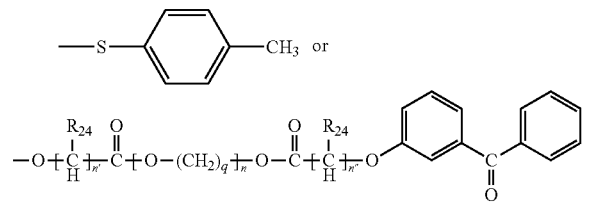

or $R_3$ and $R_4$ together are S, O, $NR_{10}$, $CH_2$ or $CHCH_3$; and n, n' and n" independently of each other are 1-10;

q is 1-4;

$R_5$ is hydrogen or $C_1$-$C_{18}$-alkoxy;

$R_6$ is hydrogen, $C_1$-$C_{18}$-alkyl, $C_1$-$C_{12}$hydroxyalkyl, $C_1$-$C_{18}$-alkoxy, OH, —$OCH_2CH_2$—$OR_{18}$, morpholino, $C_1$-$C_{18}$alkyl-S—, HS—, —$NR_{19}R_{20}$, $H_2C$=CH—, $H_2C$=C(CH$_3$)—, $H_2C$=CH—CO—, $H_2C$=CH—(CO)O—, $H_2C$=C(CH$_3$)—CO—, $H_2C$=C(CH$_3$)—(CO)O—

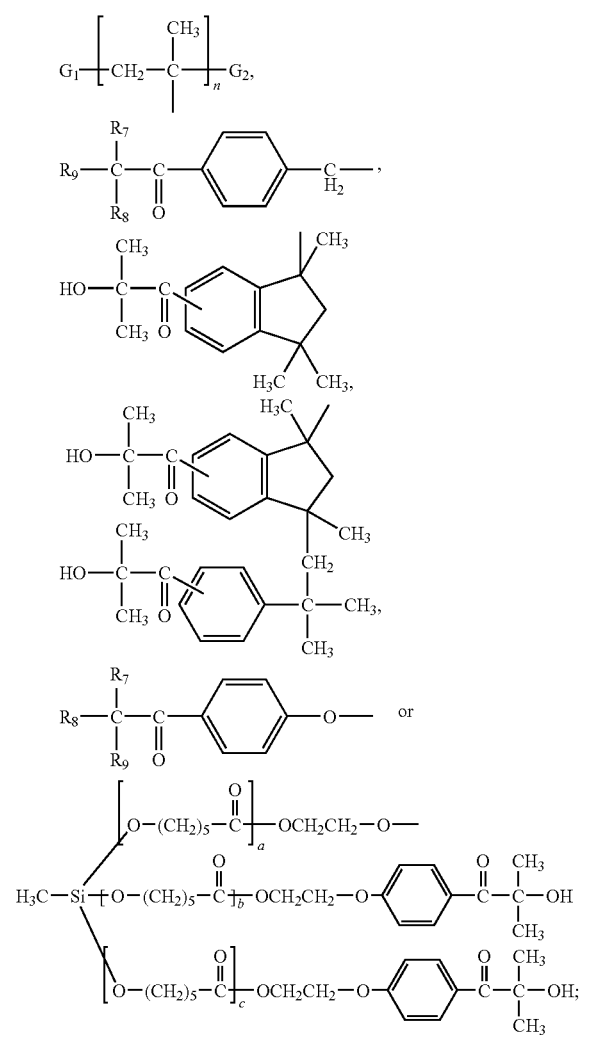

a, b and c independently of one another are 1-3;

$G_1$ and $G_2$ independently of one another are end groups of the polymeric structure, preferably hydrogen or methyl;

$Y_1$ and $Y_3$ independently of one another are a direct bond, O, (CO)O, $NR_{10}$, $C_1$-$C_{20}$alkylene, $C_1$-$C_{20}$alkylene-O—, $C_1$-$C_{20}$alkylene-(CO)O— or

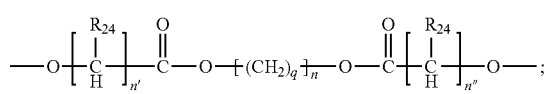

$Y_2$ is a direct bond or $C_1$-$C_{20}$alkylene;

$R_7$ and $R_8$ independently of one another are hydrogen, $C_1$-$C_6$-alkyl, unsubstituted phenyl or benzyl; or phenyl or benzyl substituted by $C_1$-$C_{12}$-alkyl; or $R_7$ and $R_8$ together with the carbon atom to which they are attached form a cyclohexyl ring;

$R_9$ is OH or $NR_{19}R_{20}$;

$R_{10}$ is hydrogen, $C_1$-$C_{18}$-alkyl, $C_2$-$C_{18}$alkenyl, $C_1$-$C_{12}$hydroxyalkyl or $C_1$-$C_{12}$halogenoalkyl;

$R_{11}$, $R_{12}$, $R_{13}$, $R_{14}$ and $R_{15}$ independently of one another are hydrogen, unsubstituted $C_1$-$C_{12}$-alkyl or $C_1$-$C_{12}$-alkyl substituted by OH, $C_1$-$C_4$-alkoxy, phenyl, naphthyl, halogen or CN; wherein the alkyl chain optionally is interrupted by one or more O; or $R_{11}$, $R_{12}$, $R_{13}$, $R_{14}$ and $R_{15}$ independently of one another are $C_1$-$C_4$-alkoxy, $C_1$-$C_4$-alkylthio, $NR_{19}R_{20}$, $H_2C$=CH—CO—, $H_2C$=CH—(CO)O—, $H_2C$=C(CH$_3$)—CO— or $H_2C$=C(CH$_3$)—(CO)O—;

$R_{16}$ is phenyl or naphthyl, both are unsubstituted or substituted 1 to 7 times by halogen, $C_1$-$C_{12}$alkyl, $C_3$-$C_8$cycloalkyl, benzyl, phenoxycarbonyl, $C_2$-$C_{12}$alkoxycarbonyl, $OR_{21}$, $SR_{22}$, $SOR_{22}$, $SO_2R_{22}$ and/or $NR_{19}R_{20}$, wherein the substituents $OR_{21}$, $SR_{22}$ and $NR_{19}R_{20}$ optionally form 5- or 6-membered rings via the radicals $R_{21}$, $R_{22}$, $R_{19}$ and/or $R_{20}$ with further substituents on the phenyl or naphthyl ring; or each of which is substituted by phenyl or by phenyl which is substituted by one or more $OR_{21}$, $SR_{22}$ and/or $NR_{19}R_{20}$;

or $R_{16}$ is thioxanthyl or

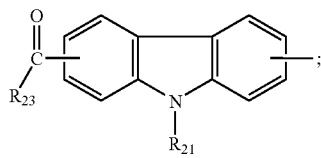

$R_{17}$ is hydrogen; unsubstituted $C_1$-$C_{20}$alkyl or $C_1$-$C_{20}$alkyl substituted by one or more halogen, $OR_{21}$ or phenyl; or is $C_3$-$C_8$cycloalkyl; or is phenyl which is unsubstituted or substituted by one or more $C_1$-$C_6$alkyl, phenyl, halogen, $OR_{21}$, $SR_{22}$ and/or $NR_{19}R_{20}$; or is $C_1$-$C_{20}$alkanoyl or benzoyl which is unsubstituted or substituted by one or more $C_1$-$C_6$alkyl, phenyl, $OR_{21}$, $SR_{22}$ and/or $NR_{19}R_{20}$; or is $C_2$-$C_{12}$alkoxycarbonyl, phenoxycarbonyl, CN, —$CONR_{19}R_{20}$, $NO_2$, $C_1$-$C_4$haloalkyl, $S(O)_d$—$C_1$-$C_6$alkyl; $S(O)_d$-phenyl, d is 1 or 2;

$R_{18}$ is hydrogen,

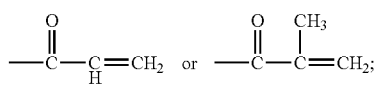

$R_{19}$ and $R_{20}$ independently of one another are hydrogen, $C_1$-$C_{20}$alkyl, $C_2$-$C_4$hydroxyalkyl, $C_2$-$C_{10}$alkoxyalkyl, $C_2$-$C_5$alkenyl, $C_3$-$C_8$cycloalkyl, phenyl-$C_1$-$C_3$alkyl, $C_1$-$C_8$alkanoyl, $C_3$-$C_{12}$alkenoyl, benzoyl; or are phenyl or naphthyl, each of which is unsubstituted or substituted by $C_1$-$C_{12}$alkyl, benzoyl or $C_1$-$C_{12}$alkoxy; or $R_{19}$ and $R_{20}$ together are $C_2$-$C_6$alkylene optionally interrupted by O or $NR_{21}$ and/or optionally substituted by OH, $C_1$-$C_4$alkoxy, $C_2$-$C_4$alkanoyloxy or benzoyloxy, or, together with the N-atom to which they are attached, are

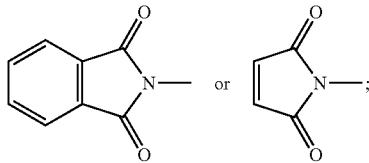

$R_{21}$ and $R_{22}$ independently of one another are hydrogen, $C_1$-$C_{20}$ alkyl, $C_2$-$C_{12}$alkenyl, $C_3$-$C_8$cycloalkyl, phenyl-$C_1$-$C_3$alkyl; or are $C_1$-$C_8$alkyl which is substituted by OH, SH, CN, $C_1$-$C_8$alkanoyl, benzoyl, which is unsubstituted or substituted by one or more $C_1$-$C_6$alkyl, halogen, OH, $C_1$-$C_4$alkoxy or $C_1$-$C_4$alkylsulfanyl; or are phenyl or naphthyl, each of which is unsubstituted or substituted by halogen, $C_1$-$C_{12}$alkyl, $C_1$-$C_{12}$alkoxy, phenyl-$C_1$-$C_3$alkyloxy, phenoxy, $C_1$-$C_{12}$alkylsulfanyl, phenylsulfanyl, —N($C_1$-$C_{12}$alkyl)$_2$, diphenylamino;

$R_{23}$ is $C_1$-$C_{12}$alkyl, phenyl, 4-morpholinophenyl, $C_1$-$C_{12}$alkylphenyl or phenyl substituted with $C_3$-$C_8$cycloalkyl which optionally is interrupted by O; and $R_{24}$ is hydrogen, methyl or ethyl;

$R_{25}$ is hydrogen or $C_1$-$C_4$alkyl;

$R_{26}$ and $R_{27}$ independently of each other are $C_1$-$C_{20}$ alkyl which is unsubstituted or is substituted by $C_1$-$C_4$alkoxy or phenyl, or $R_{26}$ and $R_{27}$ together are $C_2$-$C_4$alkylene;

$R_{30}$ is hydrogen, $C_1$-$C_4$alkyl, $C_2$-$C_5$alkanoyl, ($C_1$-$C_4$alkoxy)carbonyl, or is alkyl which is substituted by phenyl, benzoyl or by benzoylphenyl; or is phenyl or phenyl substituted by one or more $R_{34}$;

$R_{31}$ is $C_1$-$C_{12}$alkyl, $C_1$-$C_4$alkoxy, N($C_1$-$C_4$alkyl)$_2$, phenyl or phenyl substituted by one or more $R_{33}$;

$R_{32}$ is $C_1$-$C_{12}$alkyl, $C_1$-$C_4$alkoxy, phenyl or phenyl substituted by one or more $R_{33}$;

$R_{33}$ is $C_1$-$C_4$alkyl, $C_1$-$C_8$alkoxy, $C_1$-$C_6$thioalkyl, N($C_1$-$C_4$alkyl)$_2$, benzoyl or benzoyl substituted by one or more $R_{34}$; and $R_{34}$ is $C_1$-$C_4$alkyl, $C_1$-$C_4$alkoxy, $C_1$-$C_4$thioalkyl or N($C_1$-$C_4$alkyl)$_2$;

$R_{35}$ and $R_{36}$ independently of each other are hydrogen, halogen, $C_1$-$C_4$alkyl, $C_1$-$C_4$alkoxy, $C_1$-$C_4$thioalkyl, $C_1$-$C_4$haloalkyl, CN, $NO_2$, $C_2$-$C_6$alkanoyl, benzoyl, phenyl, —S-phenyl, phenoxy, $C_2$-$C_6$alkoxycarbonyl, phenoxycarbonyl, or $R_{35}$ and $R_{36}$ together are —C($R_{39}$)=C($R_{40}$)—C($R_{41}$)=C($R_{42}$)—;

$R_{37}$ is phenyl, naphthyl, anthracyl, phenanthryl or $C_4$-$C_{20}$heteroaryl, wherein the phenyl, naphthyl, anthracyl, phenanthryl or $C_4$-$C_{20}$heteroaryl are unsubstituted or are substituted by one or more $C_1$-$C_{12}$alkyl, $C_1$-$C_4$haloalkyl, halogen, phenyl, $OR_{21}$, $SR_{22}$ and/or $NR_{19}R_{20}$ and/or —S-phenyl, it being possible for the substituents $OR_{21}$, $SR_{22}$ and/or $NR_{19}R_{20}$ to form 5- or 6-membered rings, via the radicals $R_{21}$, $R_{22}$, $R_{20}$ and/or $R_{19}$, with further substituents on the phenyl, naphthyl, anthracyl, phenanthryl or $C_4$-$C_{20}$heteroaryl ring or with one of the carbon atoms of the phenyl, naphthyl, anthracyl, phenanthryl or $C_4$-$C_{20}$heteroaryl ring, or, if y is 0, $R_{37}$ additionally is $C_2$-$C_6$alkoxycarbonyl, phenoxycarbonyl or CN;

or $R_{37}$ is hydrogen or $C_1$-$C_{12}$alkyl, provided that $R_{38}$ is not simultaneously hydrogen or $C_1$-$C_{12}$alkyl;

$R_{38}$ has one of the meanings of $R_{37}$ or is unsubstituted or CN-substituted phenyl, $C_2$-$C_6$alkanoyl, benzoyl that is unsubstituted or substituted by $C_1$-$C_6$alkyl, phenyl, $OR_{21}$, $SR_{22}$ and/or $NR_{19}R_{20}$, or $R_{38}$ is phenoxycarbonyl, $NO_2$, $C_1$-$C_4$haloalkyl, or $R_{37}$ and $R_{38}$ together with the CO group, form a 5- or 6-membered ring which is unsubstituted or substituted by $C_1$-$C_6$alkyl, phenyl, $OR_{21}$, $SR_{22}$ and/or $NR_{19}R_{20}$, and said ring optionally is interrupted by O, S, $NR_{10}$ and/or by CO, and optionally to said ring one or more benzo radicals are fused;

$R_{39}$, $R_{40}$, $R_{41}$ and $R_{42}$ independently of each another are hydrogen, $C_1$-$C_4$alkyl, halogen, phenyl, $C_1$-$C_4$alkkoxy, $C_1$-$C_4$thioalkyl, —S-phenyl, phenoxy, $C_2$-$C_6$alkoxycarbonyl, phenoxycarbonyl, CN, $NO_2$ or $C_1$-$C_4$haloalkyl.

2. The polymerizable composition according to claim 1, wherein the latent catalyst compound of formula I or II Me is Sn, Bi, Al, Zr or Ti;

m denotes an integer from 1 up to the coordination number of Me;

x is an integer from 0 to (m−1);

A is $C_1$-$C_{20}$ alkyl, halogen, $C_1$-$C_{20}$ alkoxy, $C_2$-$C_{20}$ alkanoyloxy or $C_6$-$C_{18}$aryl;

PI independently of each other is selected from the group consisting of formulas (Z), (B), (C), (D), (E), (F), (G), (L) and (M);

y is 0 or 1;

$R_1$, $R_2$ and $R_3$ independently of one another are hydrogen or $C_1$-$C_6$-alkyl;

$R_4$ is hydrogen, or $R_3$ and $R_4$ together are S;

$R_5$ is hydrogen;

$R_6$ is hydrogen;

$Y_1$ and $Y_3$ independently of one another are O, (CO)O, $C_1$-$C_{20}$alkylene, $C_1$-$C_{20}$alkylene-O— or $C_1$-$C_{20}$alkylene-(CO)O—;

$Y_2$ is a direct bond;

$R_7$ and $R_8$ independently of one another are $C_1$-$C_6$-alkyl; or $R_7$ and $R_8$ together with the carbon atom to which they are attached form a cyclohexyl ring;

$R_{11}$, $R_{12}$, $R_{13}$, $R_{14}$ and $R_{15}$ are hydrogen;

$R_{16}$ is phenyl;

$R_{17}$ is CN;

$R_{19}$ and $R_{20}$ together with the N-atom to which they are attached, are

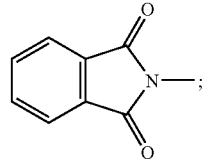

$R_{30}$ is hydrogen, $C_1$-$C_4$alkyl, or is alkyl which is substituted by phenyl or by benzoylphenyl;

$R_{31}$ is $C_1$-$C_{12}$alkyl, phenyl or phenyl substituted by one or more $R_{33}$;

$R_{32}$ is $C_1$-$C_{12}$alkyl, $C_1$-$C_4$alkoxy, phenyl or phenyl substituted by one or more $R_{33}$;

$R_{33}$ is $C_1$-$C_8$alkoxy or benzoyl;

$R_{37}$ is phenyl, unsubstituted or are substituted by one or more $C_1$-$C_{12}$alkyl, or, if y is 0, $R_{37}$ additionally is CN; and $R_{38}$ has one of the meanings of $R_{37}$.

3. A polymerizable composition according to claim 1, comprising in addition to components (a), (b) and (c) a further additive (d).

4. A polymerizable composition according to claim 3, wherein the further additive (d) is a photosensitizer compound.

5. A polymerizable composition according to claim 1, which comprises 0.001 to 15% by weight of the latent catalyst compound based on the total composition.

6. The polymerizable composition according to claim 1, wherein Me is Sn.

7. The polymerizable composition according to claim 1, wherein Me is Bi.

8. The polymerizable composition according to claim 1, wherein Me is Al.

9. The polymerizable composition according to claim 1, wherein Me is Zr.

10. The polymerizable composition according to claim 1, wherein Me is Ti.

11. A coated substrate, comprising: on at least one surface, the polymerized or crosslinked composition according to claim 1.

12. A polymerized or crosslinked composition obtained by a process comprising curing a polymerizable composition according to claim 1.

13. A latent catalyst compound, which is of the formula I or II, $$Me(PI)_{(m-x)}A_x \quad (I)$$

$$A_x(PI)_{(m-1-x)}Me-O-Me(PI)_{(m-1-x)}A_x \quad (II), \text{ wherein}$$

Me is Sn, Bi, Al, Zr or Ti;

m denotes an integer from 1 up to the coordination number of Me;

x is an integer from 0 to (m−1);

A is $C_1$-$C_{20}$ alkyl, $C_7$-$C_{30}$ arylalkyl, $C_1$-$C_{20}$alkoxy, $C_2$-$C_{20}$alkanoyloxy, $C_6$-$C_{18}$aryl or $C_6$-$C_{18}$aryl which is substituted by one or more $C_1$-$C_{20}$alkyl; or, if x is 1, A additionally is halogen;

provided that in case x is greater than one, the A are identical or different.

PI independently of each other is selected from the group of formulas (Z), (B), (C), (D), (F), (G), (H), (J), (K) and (M)

y is 0 or 1;

$R_1$, $R_2$ and $R_3$ independently of one another are hydrogen, $C_1$-$C_6$-alkyl, $C_1$-$C_4$-halogenalkyl, $C_6$-$C_{18}$aryl, $C_7$-$C_{30}$aralkyl, $C_1$-$C_4$-alkoxy, $C_1$-$C_4$alkylthio, halogen, $N(C_1$-$C_4$-alkyl$)_2$, or $N(C_4$-$C_7$-cycloalkyl which optionally is interrupted by —O— or $NR_{10}$;

$R_4$ is hydrogen, $C_1$-$C_4$-alkyl, $C_1$-$C_4$-halogenalkyl, phenyl, $N(C_1$-$C_4$-alkyl$)_2$, COOCH$_3$,

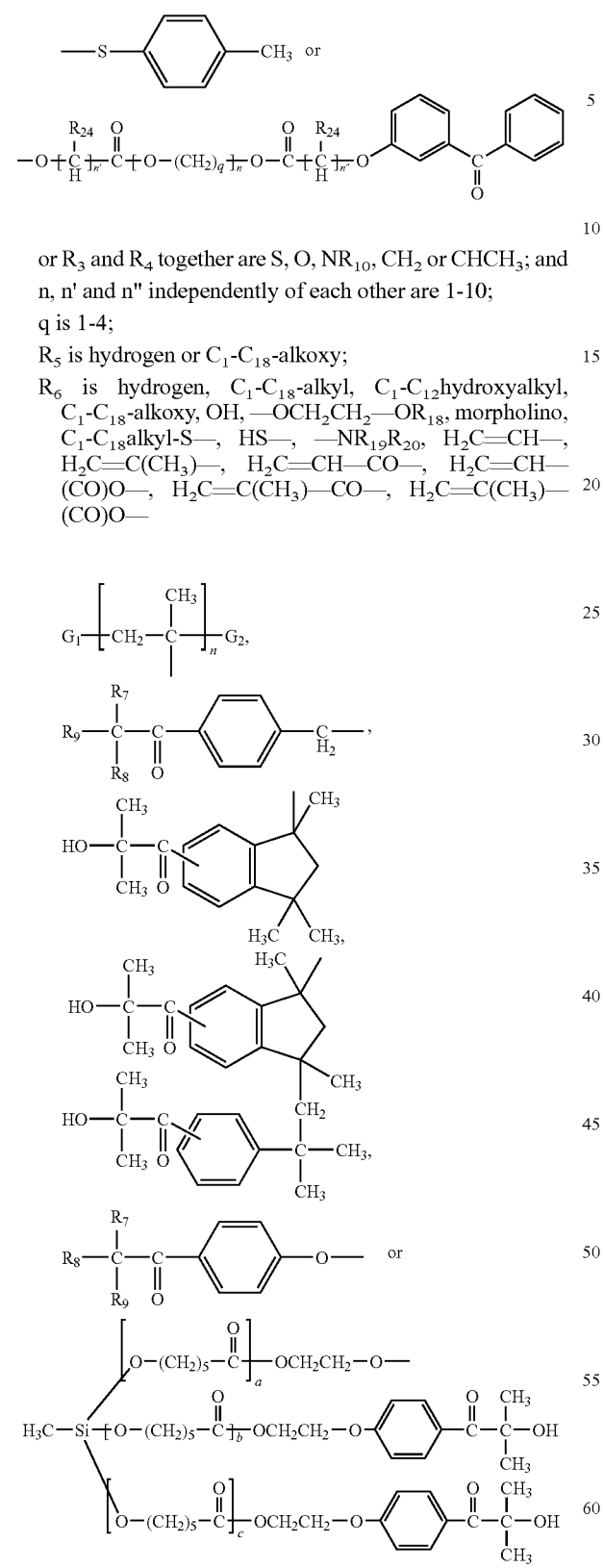

or R₃ and R₄ together are S, O, NR$_{10}$, CH$_2$ or CHCH$_3$; and
n, n' and n" independently of each other are 1-10;
q is 1-4;
R$_5$ is hydrogen or C$_1$-C$_{18}$-alkoxy;
R$_6$ is hydrogen, C$_1$-C$_{18}$-alkyl, C$_1$-C$_{12}$hydroxyalkyl, C$_1$-C$_{18}$-alkoxy, OH, —OCH$_2$CH$_2$—OR$_{18}$, morpholino, C$_1$-C$_{18}$alkyl-S—, HS—, —NR$_{19}$R$_{20}$, H$_2$C═CH—, H$_2$C═C(CH$_3$)—, H$_2$C═CH—CO—, H$_2$C═CH—(CO)O—, H$_2$C═C(CH$_3$)—CO—, H$_2$C═C(CH$_3$)—(CO)O— a, b and c independently of one another are 1-3;
G$_1$ and G$_2$ independently of one another are end groups of the polymeric structure, preferably hydrogen or methyl;

Y$_1$ and Y$_3$ independently of one another are a direct bond, O, (CO)O, NR$_{10}$, C$_1$-C$_{20}$alkylene, C$_1$-C$_{20}$alkylene-O—, C$_1$-C$_{20}$alkylene-(CO)O— or

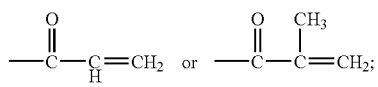

Y$_2$ is a direct bond or C$_1$-C$_{20}$alkylene;
R$_7$ and R$_8$ independently of one another are hydrogen, C$_1$-C$_6$-alkyl, unsubstituted phenyl or benzyl; or phenyl or benzyl substituted by C$_1$-C$_{12}$-alkyl; or R$_7$ and R$_8$ together with the carbon atom to which they are attached form a cyclohexyl ring;
R$_9$ is OH or NR$_{19}$R$_{20}$;
R$_{10}$ is hydrogen, C$_1$-C$_{18}$-alkyl, C$_2$-C$_{18}$alkenyl, C$_1$-C$_{12}$hydroxyalkyl or C$_1$-C$_{12}$halogenoalkyl;
R$_{11}$, R$_{12}$, R$_{13}$, R$_{14}$ and R$_{15}$ independently of one another are hydrogen, unsubstituted C$_1$-C$_{12}$-alkyl or C$_1$-C$_{12}$-alkyl substituted by OH, C$_1$-C$_4$-alkoxy, phenyl, naphthyl, halogen or CN; wherein the alkyl chain optionally is interrupted by one or more O; or R$_{11}$, R$_{12}$, R$_{13}$, R$_{14}$ and R$_{15}$ independently of one another are C$_1$-C$_4$-alkoxy, C$_1$-C$_4$-alkylthio, NR$_{19}$R$_{20}$, H$_2$C═CH—CO—, H$_2$C═CH—(CO)O—, H$_2$C═C(CH$_3$)—CO—, r H$_2$C═C(CH$_3$)—(CO)O—;
R$_{18}$ is hydrogen,

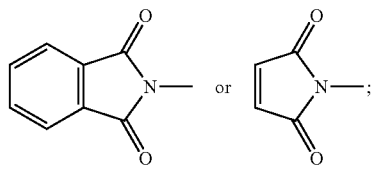

R$_{19}$ and R$_{20}$ independently of one another are hydrogen, C$_1$-C$_{20}$ alkyl, C$_2$-C$_4$hydroxyalkyl, C$_2$-C$_{10}$alkoxyalkyl, C$_2$-C$_5$alkenyl, C$_3$-C$_8$cycloalkyl, phenyl-C$_1$-C$_3$alkyl, C$_1$-C$_8$alkanoyl, C$_3$-C$_{12}$alkenoyl, benzoyl; or are phenyl or naphthyl, each of which is unsubstituted or substituted by C$_1$-C$_{12}$alkyl, benzoyl or C$_1$-C$_{12}$alkoxy; or R$_{19}$ and R$_{20}$ together are C$_2$-C$_6$alkylene optionally interrupted by O or NR$_{21}$ and/or optionally substituted by OH, C$_1$-C$_4$alkoxy, C$_2$-C$_4$alkanoyloxy or benzoyloxy, or, together with the N-atom to which they are attached, are

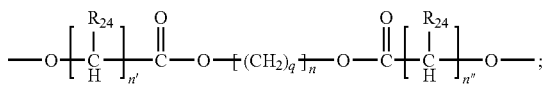

R$_{21}$ and R$_{22}$ independently of one another are hydrogen, C$_1$-C$_{20}$ alkyl, C$_2$-C$_{12}$alkenyl, C$_3$-C$_8$cycloalkyl, phenyl-C$_1$-C$_3$alkyl; or are C$_1$-C$_8$alkyl which is substituted by OH, SH, CN, C$_1$-C$_8$alkanoyl, benzoyl, which is unsubstituted or substituted by one or more C$_1$-C$_6$alkyl, halogen, OH, C$_1$-C$_4$alkoxy or C$_1$-C$_4$alkylsulfanyl; or are phenyl or naphthyl, each of which is unsubstituted or substituted by halogen, C$_1$-C$_{12}$alkyl, C$_1$-C$_{12}$alkoxy, phenyl-C$_1$-C$_3$alkyloxy, phenoxy, C$_1$-C$_{12}$alkylsulfanyl, phenylsulfanyl, —N(C$_1$-C$_{12}$alkyl)$_2$, diphenylamino;
R$_{23}$ is C$_1$-C$_{12}$alkyl, phenyl, 4-morpholinophenyl, C$_1$-C$_{12}$alkylphenyl or phenyl substituted with C$_3$-C$_8$cycloalkyl which optionally is interrupted by O; and $R_{24}$ is hydrogen, methyl or ethyl;

$R_{25}$ is hydrogen or $C_1$-$C_4$alkyl;

$R_{26}$ and $R_{27}$ independently of each other are $C_1$-$C_{20}$alkyl which is unsubstituted or is substituted by $C_1$-$C_4$alkoxy or phenyl, or $R_{26}$ and $R_{27}$ together are $C_2$-$C_4$alkylene;

$R_{35}$ and $R_{36}$ independently of each other are hydrogen, halogen, $C_1$-$C_4$alkyl, $C_1$-$C_4$alkoxy, $C_1$-$C_4$thioalkyl, $C_1$-$C_4$haloalkyl, CN, $NO_2$, $C_2$-$C_6$alkanoyl, benzoyl, phenyl, —S-phenyl, phenoxy, $C_2$-$C_6$alkoxycarbonyl, phenoxycarbonyl, or $R_{35}$ and $R_{36}$ together are —C($R_{39}$)=C($R_{40}$)—C($R_{41}$)=C($R_{42}$)—;

$R_{37}$ is phenyl, naphthyl, anthracyl, phenanthryl or $C_4$-$C_{20}$heteroaryl, wherein the phenyl, naphthyl, anthracyl, phenanthryl or $C_4$-$C_{20}$heteroaryl are unsubstituted or are substituted by one or more $C_1$-$C_{12}$alkyl, $C_1$-$C_4$haloalkyl, halogen, phenyl, $OR_{21}$, $SR_{22}$, $NR_{19}R_{20}$ and/or —S-phenyl, it being possible for the substituents $OR_{21}$, $SR_{22}$ and/or $NR_{19}R_{20}$ to form 5- or 6-membered rings, via the radicals $R_{21}$, $R_{22}$, $R_{20}$ and/or $R_{19}$, with further substituents on the phenyl, naphthyl, anthracyl, phenanthryl or $C_4$-$C_{20}$heteroaryl ring or with one of the carbon atoms of the phenyl, naphthyl, anthracyl, phenanthryl or $C_4$-$C_{20}$heteroaryl ring, or, if y is 0, $R_{37}$ additionally is $C_2$-$C_6$alkoxycarbonyl, phenoxycarbonyl or CN;

or $R_{37}$ is hydrogen or $C_1$-$C_{12}$alkyl, provided that $R_{38}$ is not simultaneously hydrogen or $C_1$-$C_{12}$alkyl;

$R_{38}$ has one of the meanings of $R_{37}$ or is unsubstituted or CN-substituted phenyl, $C_2$-$C_6$alkanoyl, benzoyl that is unsubstituted or substituted by $C_1$-$C_6$alkyl, phenyl, $OR_{21}$, $SR_{22}$ and/or $NR_{19}R_{20}$, or $R_{38}$ is phenoxycarbonyl, $NO_2$, $C_1$-$C_4$haloalkyl, or $R_{37}$ and $R_{38}$ together with the CO group, form a 5- or 6-membered ring which is unsubstituted or substituted by $C_1$-$C_6$alkyl, phenyl, $OR_{21}$, $SR_{22}$ and/or $NR_{19}R_{20}$, and said ring optionally is interrupted by O, S, $NR_{10}$ and/or by CO, and optionally to said ring one or more benzo radicals are fused;

$R_{39}$, $R_{40}$, $R_{41}$ and $R_{42}$ independently of each another are hydrogen, $C_1$-$C_4$alkyl, halogen, phenyl, $C_1$-$C_4$alkkoxy, $C_1$-$C_4$thioalkyl, —S-phenyl, phenoxy, $C_2$-$C_6$alkoxycarbonyl, phenoxycarbonyl, CN, $NO_2$ or $C_1$-$C_4$haloalkyl.

14. A process for polymerizing compounds, which are capable to crosslink in the presence of a Lewis acid, wherein a latent catalyst compound as defined in claim 13 is added to said compounds and the resulting mixture is irradiated with electromagnetic radiation of a wavelength range of 200-800 nm.

15. A process according to claim 14, wherein the component which is capable to crosslink in the presence of a Lewis acid is a mixture of (a) a blocked or unblocked isocyanate or isothiocyanate component and (b) a polyol.

16. A process for polymerizing compounds, which are capable to crosslink in the presence of a Lewis acid, wherein a latent catalyst composition as defined in claim 13 is added to said compounds and the resulting mixture is subjected to a heat treatment, or the mixture is irradiated with electromagnetic radiation and simultaneously with or after the irradiation subjected to a heat treatment.

17. A process according to claim 14 for the preparation of adhesives, sealings, coatings, potting components, printing inks, printing plates, foams, moulding compounds, or photostructured layers.

\* \* \* \* \*